US010457357B2

(12) United States Patent
Roodenburg et al.

(10) Patent No.: US 10,457,357 B2
(45) Date of Patent: Oct. 29, 2019

(54) SUBSEA WELLBORE OPERATIONS VESSEL

(71) Applicant: ITREC B.V., Schiedam (NL)

(72) Inventors: Joop Roodenburg, Delft (NL); Diederick Bernardus Wijning, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 16/374,379

(22) Filed: Apr. 3, 2019

(65) Prior Publication Data
US 2019/0225306 A1 Jul. 25, 2019

Related U.S. Application Data
(60) Division of application No. 15/865,821, filed on Jan. 9, 2018, now Pat. No. 10,293,896, which is a
(Continued)

(30) Foreign Application Priority Data

Mar. 12, 2013 (NL) .................................. 2010627
Mar. 3, 2014 (NL) .................................. 2012348

(51) Int. Cl.
| | |
|---|---|
| B63B 35/44 | (2006.01) |
| E21B 15/02 | (2006.01) |
| E21B 19/14 | (2006.01) |
| E21B 17/01 | (2006.01) |
| E21B 19/00 | (2006.01) |
| F16L 1/15 | (2006.01) |

(52) U.S. Cl.
CPC .......... *B63B 35/4413* (2013.01); *E21B 15/02* (2013.01); *E21B 17/01* (2013.01); *E21B 19/004* (2013.01); *E21B 19/143* (2013.01); *F16L 1/15* (2013.01)

(58) Field of Classification Search
CPC ... B63B 335/4413; E21B 15/02; E21B 17/01; E21B 19/004; E21B 19/143
USPC ......................................................... 166/352
See application file for complete search history.

(56) References Cited

U.S. PATENT DOCUMENTS

| | | |
|---|---|---|
| 2003/0159654 A1 | 8/2003 | Simpson et al. |
| 2011/0036287 A1 | 2/2011 | Wijning et al. |

FOREIGN PATENT DOCUMENTS

| | | |
|---|---|---|
| WO | WO 99/31346 A1 | 6/1999 |
| WO | WO 00/38977 A1 | 7/2000 |

(Continued)

*Primary Examiner* — Matthew R Buck
*Assistant Examiner* — Patrick F Lambe
(74) *Attorney, Agent, or Firm* — Birch, Stewart, Kolasch & Birch, LLP

(57) ABSTRACT

A method for assembly of a riser string onboard a vessel for performing subsea wellbore related operations involving said riser string, the riser string extending between a subsea wellbore and the vessel in a wellbore related operation, wherein the vessel includes a hull, a riser storage storing therein, in horizontal orientation, multiple pre-assembled riser stands and/or multiple individual riser stand, a deck structure having an elongated transfer opening above said riser storage, a transfer elevator, wherein multiple pre-assembled riser stands, each being pre-assembled from multiple riser sections connected end-to-end and each having a length of at least 150 ft. (45.72 m), and/or multiple individual riser sections each having a length of at least 150 ft. (45.72 m), are stored, in said horizontal orientation, in the riser storage.

16 Claims, 32 Drawing Sheets

Related U.S. Application Data continuation of application No. 14/783,623, filed as application No. PCT/NL2014/050201 on Apr. 2, 2014, now Pat. No. 9,896,167.

(56) References Cited

FOREIGN PATENT DOCUMENTS

| WO | WO 2007/035113 A1 | 3/2007 |
| WO | WO 2009/048319 A2 | 4/2009 |
| WO | WO 2009/048322 A1 | 4/2009 |
| WO | WO 2009/102196 A2 | 8/2009 |
| WO | WO 2009/102197 A2 | 8/2009 |
| WO | WO 2012/168428 A1 | 12/2012 |

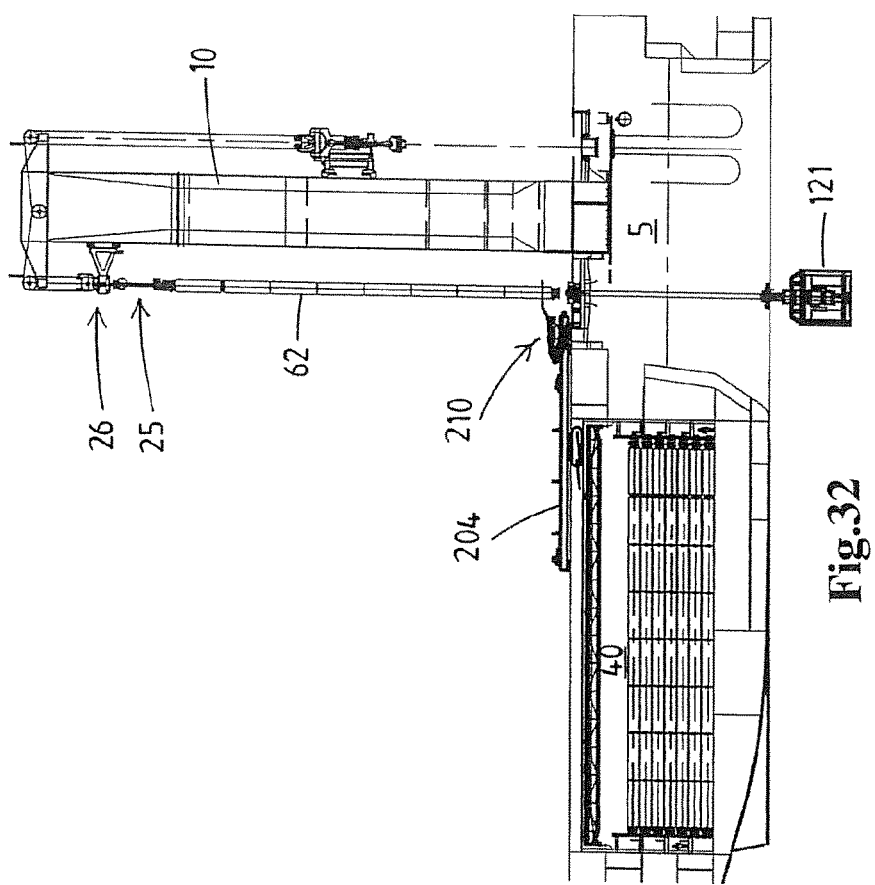

SUBSEA WELLBORE OPERATIONS VESSEL

CROSS-REFERENCE TO RELATED APPLICATIONS

This application is a Divisional of U.S. patent application Ser. No. 15/865,821, filed on Jan. 9, 2018, which is a Continuation of U.S. patent application Ser. No. 14/783,623, filed on Oct. 9, 2015 (now U.S. Pat. No. 9,896,167, issued on Feb. 20, 2018), which was filed as the National Phase of PCT International Application No. PCT/NL2014/050201 on Apr. 2, 2014, which claims priority to Dutch Application Nos. 2012348, filed on Mar. 3, 2014, and U.S. Pat. No. 2,010,627, filed on Apr. 12, 2013, all of which are hereby expressly incorporated by reference into the present application.

FIELD OF THE INVENTION

A first aspect of the present invention relates to vessel adapted to perform subsea wellbore related operations involving a riser string between the subsea wellbore and the vessel, e.g. drilling and/or wellbore intervention.

BACKGROUND OF THE INVENTION

In a prior art vessel it is common to store multiple riser sections from which the subsea riser string is composed in a riser storage of the vessel.

Commonly a riser section comprises a riser pipe and in many known embodiments additionally one or more satellite or peripheral pipes on the outside of and along the riser pipe. The satellite pipes are e.g. used as fluid lines to a BOP or other subsea equipment, e.g. choke lines, kill lines, hydraulic lines, booster lines, injection lines (e.g. for glycol), etc. Each riser section comprises a connector fitting arrangement at each end thereof. For example the connector fitting arrangement includes a flange having bolt holes, with riser section being joined by interconnecting flanges by means of bolts and nuts. A satellite pipe may have an individual connector fitting, e.g. a bayonet fitting, or be designed to fit sealingly into the satellite pipe of an adjoining riser section without direct axial securing of the satellite pipes. In many practical embodiments a riser section is provided with one or more buoyancy and/or thermal insulation members, e.g. of plastic foam material, but so-called bare joints are also employed.

Riser sections come in different lengths. Commonly riser sections have lengths between 50 ft. (15.24 meters) and 90 ft. (27.43 meters), e.g. 75 ft. (22.86 meters).

Riser sections are commonly heavy; far heavier than other tubulars used in the offshore drilling industry. For example a single 75 ft. subsea riser section may weigh between 20 and 25 tonnes, which is incomparable to the weight of an equally long drill pipe. Therefore riser handling is subject to different considerations than drill pipe handling, mainly in view of their size (diameter) and weight.

For example WO2009/102196 discloses a mono-hull vessel having a hull and a riser storage hold within the hull. In the riser storage hull riser sections are stacked in their horizontal orientation. A gantry crane is provided to raise and lower the riser sections out of and into the storage hold and to place each individual riser section onto a riser catwalk machine or to pick up a riser section from the catwalk machine. The leading end of the riser section is in practice connected to a riser string lifting tool which connects the riser section to a riser string handling capacity hoisting device of the vessel. By raising the lifting tool and operation of the catwalk machine the riser section is brought into a vertical orientation, or upended, in line with a firing line along which the riser string is suspended into the sea. The already launched portion of the riser string is then temporarily held by a riser string hanger, often referred to as a riser spider, of the vessel. The new riser section is then held in alignment above the launched riser string and the connector fitting arrangements are interconnected to join the new riser section to the riser string. Then the riser string is released by the riser string hanger and lowered over the length of the newly attached section. The riser string is then suspended again from the riser string hanger and the process of joining a new riser section is repeated.

It has been found that this known process to assembly a riser string is time-consuming. In particular a great deal of effort has to be made to properly make up the connections between the connector fitting arrangements of the riser sections. In particular in view of desired or required testing of each connection that has been made up the known process is undesirably slow.

OBJECT OF THE INVENTION

The first aspect of the present invention aims to propose measures that allow for improvements over the known approach, in view of pace with which the riser string can be assembled and/or disassembled, as well as in view of the actual storing and/or handling of riser sections on board a vessel.

SUMMARY OF THE INVENTION

The first aspect of the invention proposes a vessel adapted to perform subsea wellbore related operations involving a riser string between the subsea wellbore and the vessel, e.g. drilling and/or wellbore intervention, the vessel comprising a hull and a riser storage adapted to store therein multiple risers in horizontal orientation.

According to the first aspect the riser storage is adapted to store therein, or has stored therein, multiple pre-assembled riser stands, e.g. at least 25 riser stands, each riser stand being assembled from multiple riser sections connected end-to-end, so that in a riser stand the connector fitting arrangement of one riser section is connected to a connector fitting arrangement of another riser section. For example, and as preferred, each riser stand consists of two riser sections, preferably equally long riser sections. Each riser section comprises a riser pipe and optionally one or more satellite pipes on the outside of and along the riser pipe. Each riser section comprises a connector fitting arrangement at each end thereof. Preferably each riser section comprises one or more buoyancy members.

The first aspect of the invention is based on the insight that the storage of pre-assembled riser stands in horizontal orientation allows to make up the connection between the riser sections that form a riser stand at a very early stage, preferably even before loading the riser stands in the storage or even before loading them onto the vessel. This allows, as in a preferred embodiment, that the connections in the riser stand are also pre-tested, e.g. as to tensioning of any bolts in the connection when present and/or in view of leakage. This pre-testing is preferably also done before loading the riser stands into the storage. This approach greatly reduces, e.g. by a factor two, the amount of work to be done in the firing line when actually assembling a riser string, and thus significantly reduces time for deployment of a riser string.

The reduced time for deployment of a riser string for example allows to bring up the blow-out preventer or a module thereof attached to the lower end of the riser string without causing undue delay of the drilling process. The blow out preventer or module thereof can then, e.g., be subject to inspection and/or maintenance, which enhances safety of subsea drilling, e.g. in great water depths.

The horizontal storage of riser stands is beneficial compared to any vertical storage of pre-assembled riser stands in view of the stability of the stored riser stand (given their enormous weight) and vessel stability, in particular when the invention is implemented in a mono-hull vessel.

In order to benefit optimally from the first aspect of the invention it is envisaged that the main storage of riser sections onboard the vessel is embodied as storage for pre-assembled riser stands according to the first aspect of the invention, so that a majority, e.g. at least 75%, of the riser string length that is stored onboard the vessel, is stored as these pre-assembled riser stands. Of course some single length riser sections can be stored as well onboard the vessel, and possibly also some so-called pup sections of very limited length that are commonly employed in the industry. Further riser string items like a telescopic joint, hang-off joint, etc. can also be stored onboard the vessel.

In an embodiment it is envisaged that a riser stand comprises two riser sections which are interconnected by means of an intermediate pup section, e.g. the pup section having a length of a few feet, e.g. at most 4 feet. The pre-assembled riser stand may additionally, or alternatively, have a pup section at one end thereof, so that in the riser string adjacent riser stand are connected via a pup section. An advantage of using a pup section between adjoining riser sections and/or pre-assembled riser stands over at least a major portion of the riser length is that pup sections can be seen as easily replaceable spare parts, e.g. allowing there exchange when showing undesirable wear due to repeated tightening and releasing of connection bolts with heave wrenching tools.

In an embodiment the riser storage for pre-assembled riser stands is embodied as a riser storage hold within the hull of the vessel, which is most preferred in a mono-hull vessel.

In a preferred embodiment the riser storage hold has a floor, side walls, and a roof, wherein—preferably—the roof is a structural part of the vessel, e.g. formed by a deck structure, e.g. the main deck structure, of the vessel. The riser storage hold is provided with an elongated riser stand transfer opening having a length and a width so as to allow for transfer of a single riser stand in horizontal or substantially horizontal orientation via this riser stand transfer opening out of and into the riser storage. For example the riser stand transfer opening has a width between 1.5 and 4.0 meters.

In an embodiment the riser storage comprises one or more riser storage racks that are adapted to store therein multiple pre-assembled riser stands in horizontal orientation, e.g. each storage rack being embodied with vertical columns between which riser stands are stacked in vertical stacks.

The riser storage may include at opposed ends of the space for storage of pre-assembled riser stands a platform assembly with personnel accessible platforms at multiple levels so as to allow access of personnel to the connector fitting arrangements at the ends of the riser stands.

In an embodiment the pre-assembled riser stands storage is adapted to store therein multiple, e.g. at least 25, pre-assembled riser stands in horizontal orientation, each riser stand having a length of between 100 ft. (30.48 m) and 180 ft. (54.86 m), e.g. of 120 ft. (36.57 m) or 150 ft. (45.72 m), e.g. each riser stand being pre-assembled from two equal length riser sections.

In an embodiment the riser storage for pre-assembled riser stands is embodied as a riser storage hold, e.g. within the hull of a mono-hull vessel, and a riser stand handling crane is provided, which is arranged within the riser storage hold e.g. as an overhead travelling beam crane, along a roof of the hold.

The riser stand handling crane is adapted to lift and lower a riser stand within the hold, e.g. for removing a riser stand from a storage rack and for placing a riser stand into a storage rack respectively.

The riser stand handling crane is adapted for transverse transportation of a riser stand within the riser storage hold, to a transfer station of the riser storage. The transfer station is provided with one or more riser supports adapted to support thereon the riser stand, preferably in a position aligned with the riser stand transfer opening. This allows to pick up a riser stand by means of the riser stand handling crane, then displace the riser stand towards the transfer station, and then to place the riser stand onto the one or more riser supports.

Preferably the riser stand handling crane is adapted to engage the riser stand at least at or near its ends and at least at one or two intermediate positions, e.g. at or near the pre-made connection between the riser sections of the riser stand. This avoids undue tension in the riser stand at the connection(s) therein.

In an embodiment the vessel is a monohull vessel and the riser storage is embodied to store the riser stands therein parallel to a longitudinal axis of the vessel.

In an embodiment of the riser storage hold the riser stand transfer opening is above the one or more riser supports of the riser transfer station, e.g. vertically above so that the riser stand is to be moved generally upwards, e.g. whilst in horizontal orientation, out of the hold.

In an embodiment the transfer station comprises a transfer elevator that is adapted to raise and lower a riser stand, e.g. whilst maintaining a horizontal or substantially horizontal orientation, e.g. so as to pass the riser stand through the riser stand transfer opening and/or to align the riser stand with a strongback as will be discussed below.

In an embodiment of the riser transfer station the riser supports are integrated with the transfer elevator, e.g. the riser supports being mobile between a lowered position wherein a riser stand can be placed thereon by the riser stand handling crane within the hold and a raised position wherein the riser stand has passed through the riser stand transfer opening and/or is aligned with a strongback as will be discussed below is In an embodiment the vessel has a moonpool and a tower is arranged at the moonpool, e.g. at a side of the moonpool or above the moonpool, e.g. as in WO2009/102196.

In an embodiment the vessel is provided with a riser string hanger that is adapted to suspended therefrom a riser string in a firing line into the sea.

In an embodiment a hoisting device is provided, the hoisting device comprising a hanger device that is movable up and down relative to the tower. Preferably the hanger device is embodied as a travelling hanger device that is movable up and down along one or more vertical rails mounted on the tower, e.g. a wheeled travelling hanger device having wheels engaging one or more vertical rails. Preferably the hoisting device comprises at least one winch and at least one cable, wherein the hanger device is suspended from the at least one cable.

In an embodiment the moonpool has lateral sides, a front side and a rear side, and the tower is embodied as a hollow construction mast having a top and having a base that is integral with the hull, the base extending between sections of the hull on opposed lateral sides of the moonpool, the base being spaced from each of the front side and the rear side of the moonpool, thereby forming a front moonpool area forward of the mast and a rear moonpool area rearward of the mast, wherein the mast has a front side and an opposed rear side as well as opposed lateral sides. At one of said moonpool areas, preferably the rear moonpool area, the vessel is provided with a riser string assembly hanger that is adapted to suspended therefrom a riser string in a firing line into the sea during the riser assembly and disassembly process.

In a preferred embodiment the vessel has a riser string handling capacity hoisting device including a riser string lifting tool which is movable up and down relative to the mast and that is adapted to connect to an end of a riser section, preferably of a pre-assembled riser stand, and is embodied to support the weight of a riser string in the firing line when released from the riser string assembly hanger.

In a preferred embodiment the vessel has a second hoisting device, having a load attachment device which is movable up and down relative to the mast at a side opposed from the riser firing line, so as to allow for handling of items passing through the other moonpool area along a second firing line distinct and spaced from the first firing line where the riser string assembly takes place. Preferably said second hoisting device is embodied as a drilling drawworks, and is provided with a topdrive suspended from the load attachment device to perform drilling operations.

Preferably the vessel is provided with a riser string support cart that is displaceable within the moonpool between the two firing lines allowing to assembly a riser string in a riser string assembly firing line, e.g. at the rear moonpool area, and then to transfer the riser string to a drilling firing line, e.g. at a front moonpool area. For example this cart is embodied as a skid cart that can be skidded over a pair of associated skid rails which extend in longitudinal direction along the moonpool, allowing to displace the cart in longitudinal direction of the moonpool while supporting a riser string (and preferably with a BOP attached to the lower end of the riser string) lowered into the sea, generally between the one moonpool area and the other moonpool area, so underneath the base of the mast.

In an embodiment the riser string support cart is also embodied to support a blow-out preventer or blow-out preventer module thereon, so with the cart underneath the blow-out preventer or module thereof.

Preferably one or both of the riser string handling capacity hoisting device and—if present—the second hoisting device comprises one or more cables and one or more associated winches.

Preferably one or both of the riser string handling capacity hoisting device and—if present—the second hoisting device comprises a heave compensation mechanism.

It is envisaged that—if present—the riser stand transfer opening is oriented with its length towards the moonpool, preferably along or parallel to a central axis of the vessel if the vessel is a monohull vessel. E.g. the vessel has a riser storage hold for pre-assembled riser stands aft of the moonpool.

In an embodiment the vessel has a moonpool. At the moonpool a tower, e.g. a hollow construction mast, is arranged. The vessel is provided with a riser string hanger that is adapted to suspended therefrom a riser string in a firing line through the moonpool into the sea. A hoisting device is provided having a hanger device that is movable up and down relative to the tower, e.g. the hanger device being suspended from a cable connected to one or more winches.

In an embodiment the vessel is further provided with a riser stand strongback assembly comprising:
   a strongback having an elongated strongback frame provided with riser stand retaining members adapted to retain a riser stand relative to the strongback frame, wherein the strongback frame has a leading end and a trailing end,
wherein the strongback frame is provided with a lifting member at the leading end thereof, and wherein the hanger device is provided with a lifting member adapted to be connected to the lifting member at the leading end of the strongback frame,
wherein the strongback frame—if its lifting member is connected to the lifting member of the hanger device—is movable between a substantially horizontal transfer position and a vertical firing line position by operation of the hoisting device,
wherein in said transfer position of the strongback frame, the strongback frame is positioned so as to bring a riser stand in horizontal orientation thereof from the riser storage to the strongback frame and so as to release the riser stand from the strongback frame and return the riser stand in horizontal orientation thereof into the riser storage, e.g. aligned with the riser stand transfer opening when present,
wherein in said vertical firing line position of the strongback frame, the riser stand retained by the strongback is aligned with the firing line so as to allow for interconnection of said riser stand to a riser string suspended from the riser string hanger in said firing line.

In a preferred embodiment the hanger device is embodied as a travelling hanger device that is movable up and down along one or more vertical rails mounted on the tower, e.g. a wheeled travelling hanger device having wheels engaging said one or more vertical rails.

As is preferred the hoisting device to which the strongback frame is connected by its lifting member is a riser string handling capacity hoisting device, wherein the hanger device thereof is—in addition to the lifting member thereof for the strongback frame—also provided with a riser string lifting tool that is adapted to connect to an end of a riser section, preferably allowing to connect to a riser stand whilst the riser stand is retained by the strongback. The riser string lifting tool is embodied to support the weight of a riser string in the firing line when released by the riser string hanger.

In an embodiment the strongback assembly further comprises:
   one or more substantially horizontal rails, e.g. extending along the riser stand transfer opening if present,
   a travelling carriage, e.g. a wheel travelling carriage, that travels over said one or more substantially horizontal rails and that supports the strongback frame, preferably at or near the trailing end thereof, possibly a carriage drive motor being provided to drive the travelling carriage along the one or more substantially horizontal rails,
so that upon raising the hanger device of the hoisting device, the leading end of the strongback is lifted whilst the strongback remains supported by the travelling carriage which then travels over said one or more substantially horizontal rails towards the tower, until the strongback frame and riser stand retained thereby are upended into the vertical firing line position with the riser stand aligned with the firing line.

The provision of a carriage drive is preferred in particular in view of the last stage of the upending of the strongback and riser stand. As the vertical position is neared, the lifting of the leading end becomes less effective in view of the lower end moving towards the firing line. Exerting higher lift forces may e.g. cause damage of the strongback or engagement of the carriage with the rails.

It is preferred that a control unit is provided that synchronizes the lifting of the leading end of the strongback with the operation of the carriage drive motor in dependency of the angular position of the strongback relative to the tower. In this manner the vertical position can be reached in a controlled manner. The same drive motor can also be operated to initiate the motion of the carriage away from the firing line during motion of the strongback towards the transfer position thereof.

The carriage drive motor may e.g. drive one or more carriage wheels. Other drives, e.g. including a cable drive, skid type drive, are also possible.

In an embodiment the lifting member of the hanger device and the cooperating lifting member of the strongback frame are embodied to remain connected to one another whilst then allowing for the interconnection and disconnection of the riser string lifting tool and an end of a riser section belonging to a riser stand retained by the strongback.

In an embodiment the strongback frame defines a receiving cavity for the riser stand which cavity is open at a bottom side thereof when in transfer position to allow for passage of the riser stand into and out of the receiving cavity. In an embodiment in the transfer position the strongback frame is positioned above a riser stand transfer opening, preferably of a riser storage hold in the hull of the vessel. This means that the riser stand can be lifted out of a riser storage hold, e.g. by the transfer elevator, and moved into the receiving cavity so as to be aligned with the retaining members thereof.

It is noted that the retaining members of the strongback may be any members that allow for suitable securing of the riser stand relative to the strongback frame, e.g. including mobile, e.g. hydraulic operated, retention arms or clamp members, but also eyes or hooks for the fastening of securing slings with which a riser stand can be suitably secured, etc.

In an embodiment—in the transfer position thereof—the strongback frame is offset from the riser stand transfer opening towards the moonpool when seen in longitudinal direction of the riser stand transfer opening. A transfer elevator is provided that is adapted to raise and lower a riser stand in horizontal orientation thereof so as to pass the riser stand through the riser stand transfer opening into the receiving cavity of the strongback frame with a portion of the riser stand extending rearward beyond the trailing end of the strongback frame. A riser stand linear displacement device is provided, e.g. as part of the strongback or integrated with the transfer elevator, this riser stand linear displacement device allowing to displace the riser stand in longitudinal direction whilst in the receiving cavity of the strongback so as to compensate the offset of the strongback frame in the transfer position thereof.

In an embodiment the strongback frame, preferably provided with travelling carriage and in combination with said travelling carriage, is dimensioned so as to be movable into a riser stand transfer opening and to remain therein in a docking position. As the strongback frame is a lengthy structure due to its capacity to handle pre-assembled riser stands, the frame can now be stored when not in use, clearing valuable deck space for other operations. As indicated it is envisaged that the strongback frame is placed into the riser stand transfer opening along with the associated carriage, but one can also foresee that the strongback frame is disconnected from the carriage, and only the lengthy frame is stored in the transfer opening.

In a preferred embodiment the riser stand transfer opening is provided in a deck of the vessel, e.g. in the main deck, e.g. aft of the moonpool if present, and the strongback frame, preferably provided with the travelling carriage and in combination with said travelling carriage, is dimensioned so as to be lowered into the riser stand transfer opening and to remain therein in a docking position.

In an even more preferred embodiment the strongback frame comprises a topside and sidewalls defining a receiving cavity for the riser stand, wherein the topside is embodied as a deck portion that is flush with an adjacent deck area when the strongback frame is lowered into the riser stand transfer opening into its the docking position.

It is envisaged that the vessel may be equipped with a mobile catwalk machine that is embodied to handle single riser sections and possibly also other drilling tubulars, e.g. drill pipes, as is known in the art. It is envisaged that, e.g. for handling a first riser section to be connected to the top of a blow-out preventer, in an embodiment this catwalk machine can be positioned on top of the topside of the strongback frame in its docking position, so that the riser section or other tubular can be supplied to the firing line.

It is envisaged that the vessel has a transfer elevator adapted to lift and lower pre-assembled riser stands, this transfer elevator also being adapted to engage on the strongback frame, preferably also on the travelling carriage when present, and this transfer elevator being adapted to raise and lower said strongback frame and possible travelling carriage through the riser stand transfer opening between the transfer position and the docking position.

In an embodiment two parallel rails for the travelling carriage of the strongback are mounted along opposite longitudinal sides of a riser stand transfer opening.

In an embodiment the strongback frame is embodied so as to allow for adjustment of the length thereof, e.g. assembled from modules interconnected in series or having a telescopic strongback frame, e.g. allowing to adjust the length thereof to handle a single riser section.

In an embodiment, as known in the art, the riser string lifting tool comprises a riser section end engaging portion that is connected via a hinge to a hanger device engaging portion of the lifting tool. This allows to connect this lifting tool to the riser stand or riser section whilst the stand or riser section is in horizontal position.

In an embodiment the vessel is a monohull vessel and—in transverse cross-section of the hull of the vessel—a riser storage hold is arranged in majority to one side of the vessel, with a blow-out preventer BOP storage hold on the other side of the vessel adjacent the riser storage hold and with a separating longitudinal bulkhead of the hull in between forming a sidewall of the riser storage hold. As explained the pre-assembled riser stand are very heavy and may, e.g., each weigh about 40-50 tonnes leading to a very significant total weight of a hold filled with such riser stand. This embodiment envisages that the vessel also carries one or more blow-out preventers or modules from which blow-out preventers are composed. Blow-out preventers are very heavy and very large; in particular have a great height. This embodiment envisages to position the one or more blow-out preventers in a dedicate hold so that their weight basically forms a balance for the weight of riser stands stored in the riser storage hold.

In an embodiment, the vessel is provided with a blow-out preventer BOP storage which has a floor and a roof that includes one or more hatches, e.g. liftable, sliding, and/or pivotal hatches, wherein the BOP hold has a height between the floor and the roof thereof of at least 15 meters, preferably between 15 and 25 meters. Preferably the roof is formed by the main deck of the vessel, so that the BOP storage is below the main deck. Preferably an adjacent—seen in transverse cross-section—riser storage hold has a roof that is also formed by the main deck, providing a significant main deck area that may be used for several purposes.

In an embodiment the BOP storage hold has on the floor thereof a skid rail system with one or more skid rails, and one or more skiddable blow-out preventer supports are provided, each adapted to support thereon a blow-out preventer or module thereof and skiddable over said skid rails system whilst supporting a blow-out preventer or blow-out preventer module, e.g. said skid rail system comprising rails extending in longitudinal direction of the vessel.

For example the BOP storage hold has one or more work stations provided with equipment or tooling associated with a blow-out preventer, e.g. hydraulic test equipment to test hydraulic systems of the blow-out preventer. As is preferred a skid rail system allows to transport a BOP or module thereof to such a work station.

In an embodiment the vessel has a BOP storage hold and has a moonpool, e.g. in a monohull vessel, and the vessel is provided with a gantry crane which travels over gantry crane rails, e.g. in longitudinal direction of the vessel, at least into a position above the moonpool and into a position above the BOP storage hold, so as to allow for transfer of a blow-out preventer or blow-out preventer module between the BOP storage hold and the moonpool. As explained a BOP may weigh well above 100 tonnes, e.g. the lifting capacity of this gantry crane being at least 100 tonnes, e.g. 200 tonnes or more.

As an alternative to such a BOP handling gantry crane one can envisage the presence of an above deck skid rail system with one or more skid rails that lead towards the moonpool, and with one or more skiddable blow-out preventer supports are provided, each adapted to support thereon a blow-out preventer or module thereof and skiddable over said skid rails system whilst supporting a blow-out preventer or blow-out preventer module. Lifting a blow-out preventer from the hold and lowering it into the hold can then e.g. be done by a stationary mounted crane onboard the vessel.

In an embodiment the vessel has a moonpool, e.g. a monohull vessel with a moonpool, and a first blow our preventer docking station is present at a first, e.g. port, side of moonpool and a second blow out preventer docking station is present at an opposed second, e.g. starboard, side of moonpool. A BOP preventer capacity gantry crane is provided that is adapted to transfer a blow-out preventer or blow-out preventer module between the BOP storage hold and each of said BOP docking stations as well as between said BOP docking stations. This allows for great versatility in case, for example, a blow-out preventer is composed of multiple stacked modules. For example the gantry crane can place on module a portside docking station, and another module at the starboard side docking station, and then place on module on top of the other.

In an embodiment, e.g. as shown in WO2009102197, a BOP support cart is provided that is adapted to support a blow-out preventer and to transfer said blow-out preventer between a docking position at one side of the moonpool and a firing line that is located centrally between said docking positions. Preferably the support cart is supported on rails extending between the docking positions so that the support cart can be brought in each of said docking positions.

In an embodiment, e.g. as shown in WO2009102197, the vessel has a moonpool, and the vessel is provided with a riser string support cart that is displaceable within the moonpool, e.g. between two firing lines at opposed sides of a mast having its base above the moonpool.

Preferably the riser support cart is embodied to support a blow-out preventer or blow-out preventer module thereon.

In an embodiment, e.g. as shown in WO2009102197, the vessel comprises a working deck, e.g. a mobile working deck, extending above the moonpool, said working deck being provided with a riser spider device adapted to support a riser string there from in the firing line, e.g. the working deck being guided along one or more vertical rails mounted on the tower so as to allow for vertical translatory motion of the working deck. In another embodiment the working deck is pivotally mounted on the hull of the vessel, e.g. pivotal about an axis transverse to the longitudinal axis of the vessel, preferably said pivot axis extending on one transverse side of a moonpool or moonpool area with a mast being arranged on the other transverse side of the moonpool or moonpool area.

In an embodiment, in particular in a mono-hull vessel, e.g. as shown in WO2009048322, the vessel comprises a ballast device, e.g. allowing to compensate for mass of riser stands stored in a riser storage and/or for mass of blow out preventers stored in a BOP storage hold when present. The ballast device may include one or more ballast tanks to be filled with water for balancing. In a preferred embodiment the ballast device may include a solid ballast which is movable in the transverse direction of the hull, e.g. in an embodiment with the riser storage and BOP storage holds side by side in transverse direction of the hull.

The solid ballast may have a total mass of at least 100 ton, preferably between 100 and 750 tons, e.g. a mass of between 200 and 400 tons.

The ballast may be formed by one or more solid masses that are mounted on and guided along rails transverse to the hull of the vessel. The masses may then be positioned to compensate for the weight of riser stands and/or blow-out preventer (modules) during assembly of a riser string.

In an embodiment the same solid mass ballast device may be embodied to act—if desired—as active roll damping mechanism, the device further including:
 a sensor detecting the rolling motion of the hull, and
 a drive and control system operable to cause and control the movements of the solid ballast in response to the detections of the sensor to provide roll stabilization. For example a winch and cable arrangement is provided to move the ballast masses, either continuously in synchronization with sea-motion of the vessel or to a desired position to obtain a balancing moment.

In an embodiment the riser storage and BOP storage are arranged aft of the moonpool of the vessel and the solid ballast device is arranged in the hull between the riser storage and the moonpool.

According to a second aspect of the invention a vessel according to the preamble of clause 34 is provided, which vessel is adapted to perform subsea wellbore related operations involving a riser string between the subsea wellbore and the vessel, e.g. drilling and/or wellbore intervention, said vessel comprising:
 a hull;
 a riser storage adapted to store therein multiple riser sections or pre-assembled riser stands,
 a moonpool in said hull, and a tower arranged at said moonpool,
wherein a riser handling capacity hoisting device is provided having a riser hanger device and adapted to raise and lower relative to said tower a riser string that is suspended from said riser hanger device in a firing line.

Such a vessel is for example disclosed in WO2009/102196.

As explained above subsea drilling operations require large and heavy blow-out preventers, sometimes embodied in modules that are stacked onto one another to form a complete BOP. These BOP's and BOP modules are complex machinery, which require extensive testing and maintenance. Commonly BOP's of great height are stored on deck, closely adjacent the moonpool.

The second aspect of the invention aims to provide for enhanced storage and handling of BOP's and/or BOP modules on a vessel, in particular on a mono-hull drilling vessel.

The second aspect of the invention achieves this aim by providing a vessel according to the preamble of clause 34, which is characterized in that
the vessel has a BOP storage hold, preferably within the hull, the BOP storage hold being adapted to store therein one or more blow-out preventers, which BOP storage hold has a floor and a roof that includes one or more hatches, wherein the hold has a height between said floor and the roof of at least 15 meters, preferably between 15 and 25 meters,
and in that the vessel is provided with a crane, e.g. a gantry crane which travels over gantry crane rails, said crane at least being adapted to raise and lower a blow-out preventer or blow-out preventer module out of and into the BOP storage hold.

In an embodiment the crane is embodied to move a blow-out preventer or blow-out preventer module at least between a position above the moonpool and a position above the BOP storage hold, so as to allow for transfer of a blow-out preventer between said storage hold and the moonpool.

In an embodiment the BOP storage hold has on the floor thereof a skid rail system with one or more skid rails, and one or more skiddable blow-out preventer supports are provided, each adapted to support thereon a blow-out preventer and skiddable over said skid rails system whilst supporting said blow-out preventer, e.g. said skid rail system comprising rails extending in longitudinal direction of the vessel.

In an embodiment a first blow out preventer docking station is present at a first, e.g. port, side of moonpool and second blow out preventer docking station is present at an opposed second, e.g. starboard, side of moonpool, wherein the crane is adapted to transfer a blow-out preventer or blow-out preventer module between the BOP storage hold and each of said BOP docking stations as well as between said BOP docking stations.

In an embodiment, at the moonpool, a BOP support cart is provided that is adapted to support a blow-out preventer and to transfer said blow-out preventer between a docking position and a firing line that is located centrally between said docking positions, preferably said support cart being supported on rails extending between the docking positions so that the support cart can be brought in each of said docking positions.

In an embodiment the vessel is provided with a riser string support cart that is displaceable within the moonpool, e.g. between two firing lines, and wherein, preferably, the riser support cart is embodied to support a blow-out preventer or blow-out preventer module thereon.

In an embodiment the BOP handling gantry crane is adapted to lower and raise a blow-out preventer or blow-out preventer module between a position thereof supported on the riser string support cart and a raised position.

In an embodiment the vessel is a monohull vessel, and—seen in transverse cross-section of the hull of the vessel—a riser storage hold, preferably according to the first aspect of the invention, is arranged in majority to one side of the vessel, with the BOP storage hold on the other side of the vessel adjacent the riser storage hold and with a separating longitudinal bulkhead of the hull in between forming a sidewall of the riser storage hold.

A third aspect of the invention relates to a vessel according to clause 42. This vessel is provided with a riser handling capacity hoisting device having a riser hanger device and adapted to raise and lower relative to said tower a riser string that is suspended from said riser hanger device in a firing line. In addition the vessel is provided with a strongback hoisting device, comprising a strongback hanger device that is movable up and down relative to the tower and that is distinct from the riser hanger device.

The vessel is further provided with a riser stand strongback assembly comprising a strongback having an elongated strongback frame provided with one or more retaining members adapted to retain a riser section, e.g. with the strongback designed to handle a single riser section, or riser stand relative to the strongback frame, wherein the strongback frame has a leading end and a trailing end.

The strongback frame is provided with a lifting member at the leading end thereof, and the strongback hanger device is provided with a lifting member adapted to be connected to the lifting member at the leading end of the strongback frame.

The strongback frame—if its lifting member is connected to the lifting member of the strongback hanger device—is movable between a substantially horizontal transfer position and a vertical firing line position by operation of the strongback hoisting device.

In the transfer position of the strongback frame, the strongback frame is positioned so as to bring a riser section or a pre-assembled stand in horizontal orientation thereof from the riser storage to the strongback frame and so as to release the riser stand from the strongback frame and return the riser stand in horizontal orientation thereof into the riser storage, e.g. aligned with the riser stand transfer opening when present.

In the vertical firing line position of the strongback frame, the riser section or riser stand retained by the strongback is aligned with the firing line so as to allow for interconnection of said riser stand to a riser string suspended from a riser string hanger in said firing line.

A fourth aspect of the invention relates to a vessel according to clause 44. The vessel has a riser storage hold within the hull of the vessel, wherein riser sections or, as is preferred, pre-assembled riser stands, are stored. The roof of the storage hold has an elongated riser transfer opening having a length and a width so as to allow for transfer of a single riser section or a single riser stand in horizontal orientation via the riser transfer opening out of and into the riser storage hold.

The vessel further has a moonpool and a tower is arranged at the moonpool. A riser string hanger is provided in order to suspended therefrom a riser string in a firing line, e.g. a firing line where assembly and disassembly of the riser string is performed distinct from a second firing line wherein drilling activities are performed. The riser transfer opening is orientated with its length towards the moonpool.

A hoisting device with a hanger device is provided that is movable up and down relative to the tower.

The vessel of the fourth aspect of the invention is further provided with a riser section or riser stand strongback assembly comprising:
- a strongback having an elongated strongback frame provided with one or more retaining members adapted to retain a riser section or riser stand relative to the strongback frame, wherein the strongback frame has a leading end and a trailing end.

The strongback frame is provided with a lifting member at the leading end thereof, and the hanger device of the hoisting device is provided with a lifting member adapted to be connected to the lifting member at the leading end of the strongback frame.

The strongback frame—if its lifting member is connected to the lifting member of the hanger device—is movable between a substantially horizontal transfer position and a vertical firing line position by operation of the hoisting device.

In the transfer position of the strongback frame, the strongback frame is positioned above the roof of the storage hold, preferably vertically above the riser transfer opening in the roof of the storage hold, so as to bring a riser section or a riser stand in horizontal orientation thereof from the riser storage hold to the strongback frame and so as to release the riser section or riser stand from the strongback frame and return the riser section or riser stand in horizontal orientation thereof into the riser storage hold.

In the vertical firing line position of the strongback frame, the riser section or riser stand retained by the strongback is aligned with the firing line so as to allow for interconnection of said riser stand to a riser string suspended from the riser string hanger in said firing line.

A fifth aspect of the invention relates to a vessel as in clause 45. The vessel has a moonpool and a tower arranged at said moonpool. A deck extends adjacent the moonpool, e.g. aft of the moonpool.

A riser handling capacity hoisting device is provided having a riser hanger device and adapted to raise and lower relative to said tower a riser string that is suspended from said riser hanger device in a firing line.

A mobile working deck is arranged in operative position above at least a portion of the moonpool, e.g. liftable to such a height that a blow-out preventer can be brought and held underneath the working deck in raised position thereof at an elevated position relative to the tower or slidable sideways to uncover the moonpool.

A riser string assembly hanger is adapted to suspended therefrom a riser string in a firing line into the sea during the riser assembly and disassembly process, preferably said riser string hanger being mounted on the working deck.

The vessel has a BOP storage hold within the hull below said deck adjacent the moonpool. The BOP storage hold is adapted to store therein one or more blow-out preventers and has a floor and a roof, preferably forming said deck, that includes one or more hatches. The BOP storage hold has a height between said floor and the roof of at least 15 meters, preferably between 15 and 25 meters, allowing to store complete BOP's or very sizable BOP modules.

The vessel is provided with a crane, e.g. a gantry crane which travels over gantry crane rails, said crane at least being adapted to raise and lower a blow-out preventer or blow-out preventer module out of and into the BOP storage hold, preferably adapted to transport said BOP or BOP module to a position above the moonpool, e.g. to a position underneath a lifted mobile working deck when present. In case of a pivotal working deck one can also envisage that the crane places the BOP or module on a cart that is arranged at a lateral side of the working deck, with the working deck then being pivoted upward allowing the cart with BOP or module thereon to be moved into the firing line.

A sixth aspect of the invention relates to a vessel according to clause 47.

From the prior art a vessel is known that is adapted to perform subsea wellbore related operations involving a riser string between the subsea wellbore and the vessel, e.g. drilling and/or wellbore intervention. The known vessel has a hull, e.g. a mono-hull type hull or the hull of a semi-submersible and is equipped with a riser storage that is adapted to store therein multiple risers, usually individual riser sections. The vessel has a moonpool in the hull and a tower is arranged at the moonpool, e.g. embodied as a mast or a derrick. The vessel can have a single firing line, or can be equipped with a dual firing line arrangement. The latter e.g. allows, as is known in the art, to perform drilling along one firing line, whereas riser string assembly and disassembly can be performed at the other firing line.

In order to assemble and disassemble a riser string, which commonly supports the BOP at the lower end thereof, known vessels are equipped with a riser handling capacity hoisting device that is provided with a riser string lifting tool which is releasably connectable to a riser section. The riser handling capacity hoisting device is adapted to raise and lower relative to the tower a riser string that is suspended from the riser handling capacity hoisting device in a firing line. For example the riser handling capacity hoisting device includes a trolley suspended from cables, which trolley is guided along vertical rails, e.g. said rails extending along a side of a mast type tower.

In the prior art it is known to provide the vessel with a riser handling system, which comprises a catwalk machine. Commonly a catwalk machine includes:
- a pair of horizontal catwalk machine rails,
- an elongated catwalk machine frame having a rear end and a front end, wherein the frame is movable over the catwalk machine rails at least in a rearward loading position and a forward riser release position, wherein—in the rearward loading position—a riser in horizontal orientation can be loaded onto the catwalk machine, and wherein—in the forward riser release position—a riser lifted is connectable to the riser string lifting tool,
- a skate which is supported by the frame and is movable by a drive motor along the length of the frame between a rearward skate position and a forward skate position, wherein the skate comprises a riser end support to support thereon a rearward end of a riser.

As indicated here above, common risers have a length of up to 90 ft. (27.43) meters.

In view of increase efficiency of the process of assembly and disassembly of a riser string it is desirable to increase the length of each riser that joined to the suspended riser string or removed from the string upon disassembly. In particular any making or breaking of the connection between risers takes up and undesirable amount of time and effort. Also the connectors between the risers are critical components.

It is therefore an aim of the sixth aspect of the invention to provide measures that allow to enhance the process efficiency.

The sixth aspect of the invention provides a vessel wherein, in addition to the catwalk machine, the riser handling system further comprises a riser forward section auxiliary support device, that is distinct from the catwalk machine, which riser forward section auxiliary support device is arranged at a location along the catwalk machine rails between the moonpool and the catwalk machine frame, when in its rearward loading position,
which riser forward section auxiliary support device is movable between an operative position and a retracted position,
which riser forward section auxiliary support device is adapted to support—in the operative position thereof—a forward section of a riser that rests with its rear end on the skate and that extends beyond the front end of the catwalk machine frame when loaded in horizontal orientation onto the catwalk machine whilst in the rearward loading position thereof,
so that—with a riser loaded onto the catwalk machine and also supported by the riser forward section auxiliary support device—the catwalk machine frame is movable along said catwalk machine rails towards the auxiliary support device in order to bring the forward riser end, preferably whilst maintaining its horizontal orientation, near the riser string lifting tool and allow for connection thereof to the forward riser end, in which advancing motion the forward riser section is supported by said auxiliary support device,
and so that—after connecting the forward riser end to the riser string lifting tool—the riser forward section auxiliary support device is movable to the retracted position thereof thereby disengaging from the riser and allowing the catwalk machine frame to move further towards its forward position in the process of bringing the riser vertically into the firing line wherein the forward end of the riser is lifted by the riser handling capacity hoisting device.

The sixth aspect of the invention, e.g. allows for the provision of a catwalk machine having a length suitable to handle 90 ft. (27.43 meters) risers on its own, and then—with the benefit of the riser forward section auxiliary support device—employ this catwalk machine and auxiliary support device to handle risers of a length e.g. up to 180 ft., e.g. 150 ft. This means that the forward riser section of a length of e.g. 60 ft. or 90 ft. extends forward of the catwalk machine, which extending section is then supported—temporarily—by the retractable auxiliary support device.

If a "common length riser" of e.g. up to 90 ft. has to be handled, it is envisaged that only the catwalk machine is used in its ordinary manner, with the riser forward section auxiliary support device remaining in its retracted position. So the system of the invention allows for great versatility when it comes to handling different riser lengths, including lengths beyond the common maximum length of 90 ft. as seen nowadays.

In a practical embodiment the riser forward section auxiliary support device is arranged at a location between the catwalk machine rails and is movable between a raised operative position and a lowered retracted position so that the catwalk machine frame can pass above the retracted auxiliary support device. In another design the retraction is e.g. sideways, but a downward retraction is favored in view of the use of deck space and practical design of the retractable chassis of the auxiliary support device. For example the chassis includes pivotal parallel beams supporting the device at the front and rear end, e.g. with a hydraulic drive for the pivoting motion. As an alternative the chassis is built to move in a pure vertical direction, e.g. with one or more hydraulic jacks in vertical arrangement.

In a practical embodiment the riser forward section auxiliary support device comprises one or more mobile riser guide members allowing the riser—in its horizontal orientation—to slide over the auxiliary support device as it is advanced forward by the forward advancing catwalk machine frame. For example the auxiliary support device comprises one or more endless tracks that are adapted to support the riser thereon, e.g. an endless belt. In another design the device comprises rollers but as commonly the riser have fragile buoyancy elements one or more tracks, e.g. motor driven tracks synchronized with the motion of the catwalk machine, are preferred.

In an embodiment a hatch is provided to cover the (downward) retracted riser forward section auxiliary support device, e.g. the retracted position is below a deck of the vessel.

In a preferred embodiment the catwalk machine is provided with a tailing-in arm device that is mounted at the forward end of the catwalk machine frame. This causes the tailing-in arm device to move along with the catwalk machine, and thus it forms no obstacle near the firing line when the catwalk machine is retracted, e.g. when not in use. In an alternative the tailing-in arm device is supported on the vessel in a different manner, e.g. mobile in the tower.

In a preferred embodiment the vessel has a riser storage hold within the hull of the vessel which is adapted to store risers therein, which hold has a roof, wherein the catwalk machine is arranged on a deck above the roof. The riser storage hold is adapted to store risers therein in horizontal orientation with the length of the risers parallel to the catwalk machine rails. A riser handling crane, e.g. as an overhead travelling beam crane moving along the roof of the hold, is provided in the hold and is adapted for transverse transportation of a riser within the riser storage hold, to a transfer station of the riser storage. Above the transfer station an elongated riser transfer opening is provided between the deck and the hold, which opening has a length and a width so as to allow for transfer of a single riser in horizontal orientation via the riser transfer opening out of and into the riser storage hold. The riser transfer opening is located alongside the rails of the catwalk machine so that a riser can be moved easily, e.g. by yet another riser handling crane (e.g. a gantry type crane) between the catwalk machine and the transfer opening.

It is envisaged that the measures according to the sixth aspect of the invention allow for handling of risers having a length of between 100 ft. (30.48 m) and 180 ft. (54.86 m), e.g. of 120 ft. (36.57 m) or 150 ft. (45.72 m). The riser (62) can be a pre-assembled riser stand, e.g. assembled from two equal length riser sections, or a single riser section of such length. In the latter embodiment the riser forward section auxiliary support device is operated to support the portion of the single riser section that extends beyond the catwalk machine, for example the remaining 60 ft. if a 150 ft. (45.72 m) single length riser section is handled by a 90 ft. capacity catwalk machine. It will be appreciated that such single length riser sections can be stored and handled, e.g. within the riser storage hold and/or between the deck and the hold, as explained herein with reference to the first and other aspects of the invention.

A seventh aspect of the invention relates to a vessel according to clause 56.

The seventh aspect of the invention relates to a vessel adapted to perform subsea wellbore related operations involving a riser string between the subsea wellbore and the vessel, e.g. drilling and/or wellbore intervention.

From the prior art vessels are known having a hull and a riser storage, wherein the riser storage has one or more riser storage racks that are adapted to store therein multiple risers in horizontal orientation, each storage rack being embodied with vertical columns between which risers are stacked in vertical stacks.

Commonly the risers stored in the racks are individual riser sections. This application also envisages the storage of greater length pre-assembled riser stands, e.g. composed of two interconnected riser sections, or of greater length individual riser sections, e.g. single riser sections having a length of 150 ft. (45.72 m) or even more.

It is known to equip the vessel with a riser handling crane, which is adapted for removing a riser from a storage rack and for placing a riser into a storage rack respectively, and for transverse transportation of a riser above the one or more storage racks. Many of such cranes are gantry cranes.

Risers are critical components in an offshore drilling process. Therefore high demands are placed on the quality of the risers and maintenance is performed in case any defect is suspected.

At present risers are taken from board the vessel and shipped to an onshore facility for maintenance. This is time consuming and expensive. If risers become longer any on-road transportation of risers also becomes a major problem in itself. The present application envisages individual riser sections have a length between 100 ft. and 180 ft. (54.86 m), e.g. 150 ft. (45.72 m) which are very difficult to convey on any road.

The seventh aspect of the present invention aims to provide an improved vessel in order to overcome and/or reduce the problems addressed above with respect to riser maintenance and/or inspection.

The seventh aspect of the invention provides a vessel, which is characterized in that the vessel is provided with a riser workshop having a floor, preferably also walls and a possibly also a roof, the workshop being adapted to accommodate at least one riser in horizontal orientation, and the workshop providing a space, preferably an enclosure, for personnel performing work on the riser, e.g. maintenance and/or inspection of the riser.

In an embodiment the riser handling crane is adapted to place a riser in the workshop and remove a riser from the workshop, e.g. the workshop having a roof with a riser transfer opening therein, preferably said opening being provided with a mobile roof cover, e.g. one or more hatches or a tarpaulin. If, as is preferred, the workshop is located below an overhead deck structure of the vessel, the roof may be dispensed with or can be very simple, e.g. as tarpaulin, e.g. to avoid noise and/or to maintain a favorable climate in the workshop.

In an embodiment the riser storage is a riser storage hold within the hull of the vessel, e.g. wherein the hold has a roof, wherein the vessel has a deck and above said roof, and wherein the riser workshop is within the riser storage hold.

In an embodiment the riser handling crane is an overhead travelling beam crane travelling above the one more racks within the hold, e.g. along the roof of the hold.

In an embodiment the hold comprises two riser storage racks, each with multiple columns to store therein multiple stacks of risers side-by-side, and wherein the riser workshop is arranged between said two riser storage racks.

It will be appreciated that a vessel according to one of the aspects of the invention may also include one or more other features discussed herein with reference to another aspect of the invention.

The present invention also relates to a method for performing one or more subsea wellbore related operations, e.g. riser string assembly and/or disassembly, subsea drilling, well intervention, etc., wherein in use is made of a vessel according to any aspect or combination of aspects of the invention.

The present invention also relates to a strongback assembly as described herein.

The present invention also relates to the combination of a tower and strongback assembly as described herein.

The vessel can be of different embodiments, yet a monohull vessel is in particular contemplated. The vessel could however also be, for example, a semi-submersible vessel with parallel pontoons and columns supporting a deck box structure or with an annular pontoon, e.g. for arctic environments. The vessel could also be a jack-up type drilling rig, with extendible legs, e.g. the tower and moonpool being present on a cantilever onboard the jack-up type vessel. For example a storage hold for riser sections and/or riser stands is present within the body of the cantilever.

The invention will now be described in more detail with reference to the drawings.

BRIEF DESCRIPTION OF THE DRAWINGS

In the drawings:

FIG. 32 illustrates a further step in the assembly process of a riser string with the vessel of FIG. 25.

DETAILED DESCRIPTION OF EMBODIMENTS

Figure 1:
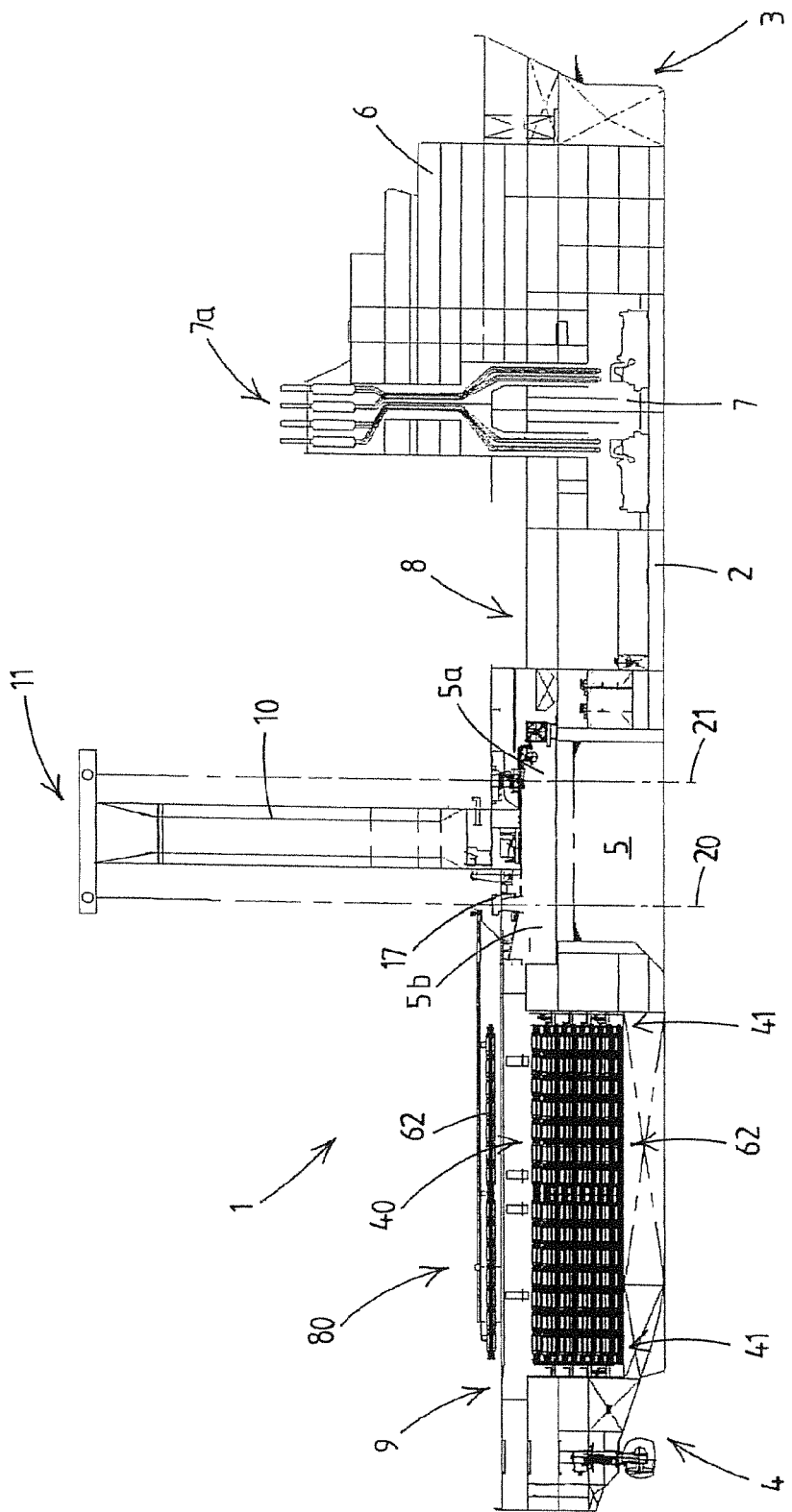
FIG. 1 shows in longitudinal view a vessel according to the invention.

FIG. 1 shows a mono-hull vessel 1 having a hull 2 with a bow 3, a stern 4, and a moonpool 5 that extends through the hull 1.

The vessel 1 is adapted to perform subsea wellbore related operations involving a riser string between the subsea wellbore and the vessel, in particular drilling operations, e.g. for exploratory drilling. The vessel can also perform other subsea wellbore related operations, e.g. wellbore intervention.

In this example, the vessel 1 has an accommodation topside 6 at the bow 3, including crew quarters and a bridge.

The vessel 1 has an engine room 7, generally below the accommodation topside, with exhausts 7a extending at the rear of the topside 6, above the topside 6.

The moonpool 5 has, as is preferred, a rectangular shape with opposed lateral sides, a front side and a rear side.

A front main deck 8 extends between the moonpool 5 and the topsides.

A rear main deck 9 extends between the moonpool 5 and the stern of the vessel 4.

The vessel is equipped with a tower 10, which is, as is preferred, embodied as a hollow construction mast having a top 11 and having a base 12 that is integral with the hull 2. The base 12 extends between sections of the hull on opposed lateral sides of the moonpool 5 and the base 12 is spaced from each of the front side and the rear side of the moonpool, thereby forming a front moonpool area 5a forward of the mast 10 and a rear moonpool area 5b rearward of the mast 10.

The mast 10 has a front side 10a and an opposed rear side 10b as well as opposed lateral sides 10c, 10d.

In this example, drill pipe racks, here embodied as carrousel type racks 14, are located adjacent the lateral sides of the mast 10, as is known in the art.

At the rear moonpool area 5b, the vessel is provided with a working deck 15 arranged above the rear moonpool area 5b. As is preferred the working deck 15 is a mobile working deck, here liftable along the mast 10 to such a height that a blow-out preventer can be brought and held underneath the working deck 15 in raised position thereof at an elevated position relative to the mast 10. In a lowered, operative position, the working deck 15 preferably, as here, is level with the adjacent main deck area.

In view of assembly and disassembly of a riser string along a firing line 20 through the rear moonpool area 5b the vessel is equipped with a riser string assembly hanger 17 that is adapted to suspended therefrom a riser string in the firing line 20 into the sea during the riser assembly and disassembly process. As preferred, this hanger 17 is mounted on the working deck 15, e.g. embodied as a riser spider, e.g. provided with a gimballing support so as to allow for angular variation between the riser string and the working deck, e.g. due to sea motion of the vessel.

The vessel 1 has a riser string handling capacity hoisting device including a riser string lifting tool 25 which is movable up and down relative to the mast 10 and that is adapted to connect to an end of a riser section, preferably of a pre-assembled riser stand as will be explained below, and is embodied to support the weight of a riser string in the firing line 20 when released from the riser string assembly hanger 17.

The riser string lifting tool 25 here is suspended from a travelling hanger device 26 that is movable up and down along the rear side of the mast 10 along one or more vertical rails 27.

Figure 11:
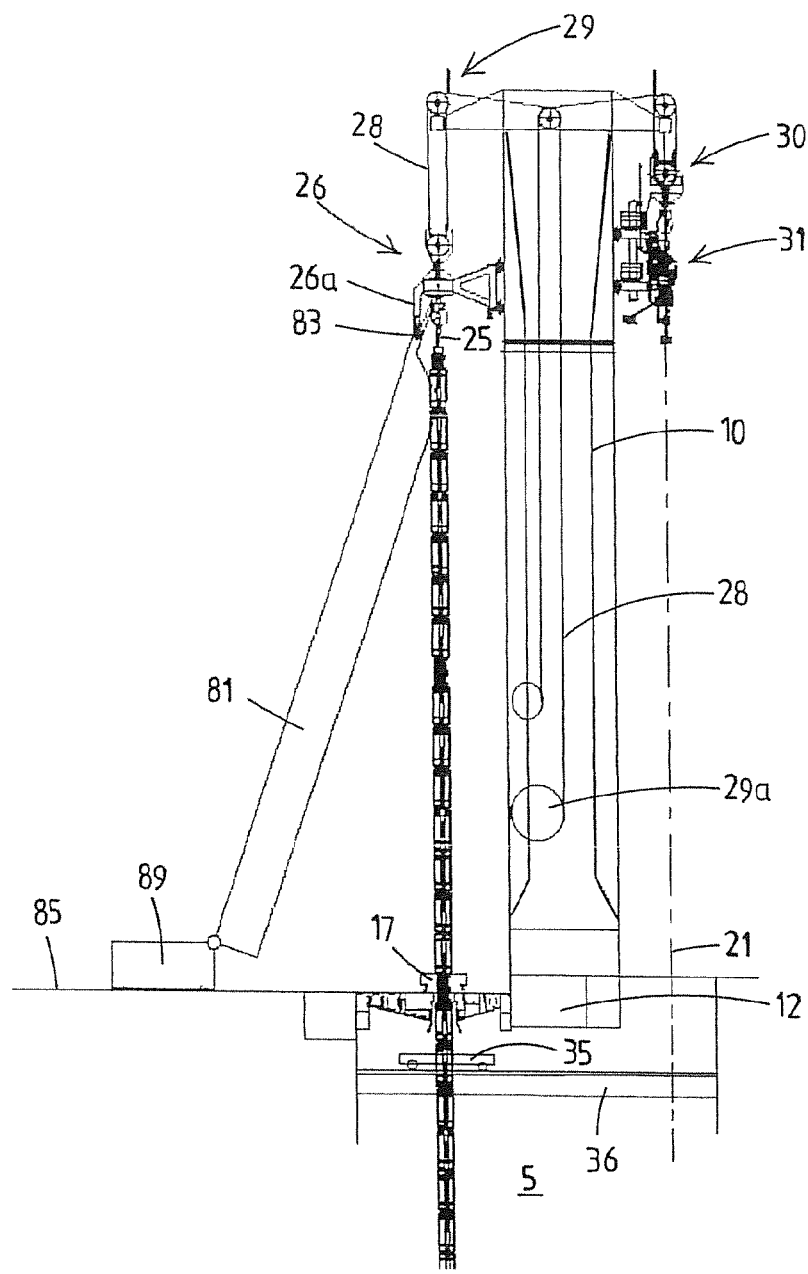
FIG. 11 shows schematically an eight step in a riser stand upending process of the vessel of FIG. 1.

The hanger device 26 is suspended by one or more cables 28 from a sheave arrangement 29 at the top of the mast, which one or more cables 28 are connected to one or more winches 29a, e.g. arranged within the mast 10 (see FIG. 11).

It is noted that the firing line 20 is outside of the rear side 10b of the mast 10 so that the firing line 20 can be reached without hindrance in the process of upending a riser section or riser stand from the rear of the vessel.

In an alternative embodiment, the mast 10 is replaced by a derrick type tower having a latticed frame with corner posts that forms a frame extending over the moonpool. It is then envisaged that the riser storage is outside of the derrick type tower and the derrick is provided with a V-door or similar to allow passage of a riser section or riser stand into and out of the derrick.

The vessel also has a second hoisting device having a load attachment device 30 which is movable up and down relative to the mast at a side opposed from the riser firing line 20, so as to allow for handling of items passing through the other moonpool area along a second firing line 21 distinct and spaced from the first firing line 20 where the riser string assembly takes place.

The second firing line 21 extends through the front moonpool area 5a. Along this firing line 21 primarily drilling operations are performed.

The second hoisting device is embodied as a drilling drawworks, and is provided with a topdrive 31 suspended from the load attachment device 30 to perform drilling operations. The load attachment device 30 is preferably embodied similar as the travelling hanger device 26.

A working deck 32 is arranged above the moonpool area 5a and may include a rotary table, iron roughneck machine, etc.

The vessel 1 is thus capable of assembly of a riser string in firing line 20. For transfer of the riser string to the other firing line 21 a riser string support cart 35 is provided that is displaceable within the moonpool, e.g. skiddable over rails 36 along the lateral sides of the moonpool 5 (see FIG. 11).

Figure 2:
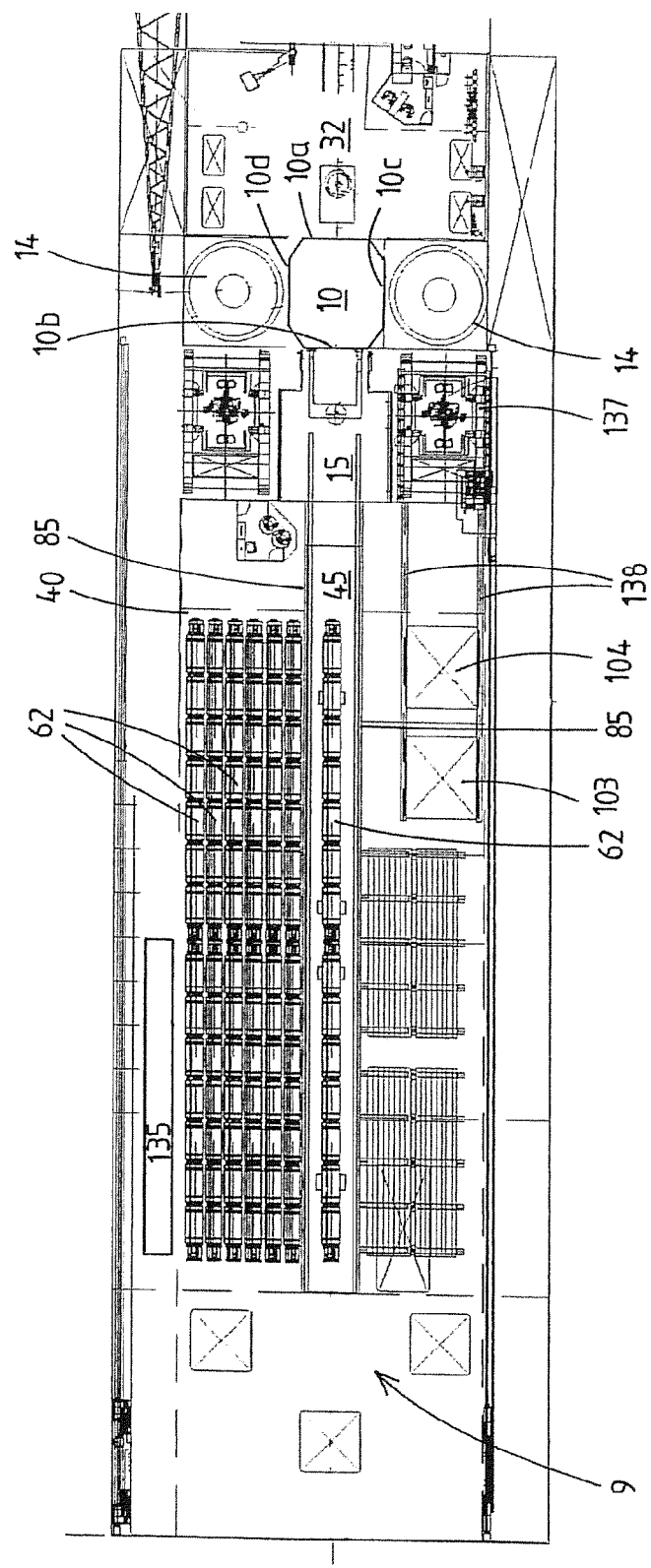
FIG. 2 shows a plan view of the aft part of the vessel of FIG. 1.

The vessel has a riser storage hold 40, here as is preferred, within the hull 2 aft of the moonpool 5. The riser storage hold 40 is embodied to store the riser stands therein in horizontal position and parallel to a longitudinal axis of the vessel 1. In FIG. 2 the riser stands are visible to illustrate the location of the hold 40. As will be explained the hold 40 is covered in this design by a roof that is formed by the rear main deck 9 so that in practice the riser stand in the hold 40 are not visible from above.

The riser storage hold 40 is adapted to store therein, or has stored therein, multiple pre-assembled riser stands 62, e.g. at least 25 riser stands 62. Each riser stand 62 is assembled from multiple riser sections 60, 61 connected end-to-end. As is shown here, and as preferred, each riser stand 62 consists of two riser sections 60, 61. Each riser section comprises a riser pipe and optionally one or more satellite pipes on the outside of and along the riser pipe as is known in the art. Each riser section 60, 61 comprises a connector fitting arrangement, e.g. including a flange, at each end thereof. Preferably, and as common in this field, each riser section comprises one or more buoyancy members. In an individual riser stand 62 the connector fitting arrangement of one riser section is connected to a connector fitting arrangement of another riser section, e.g. (as is common) by connector bolts and nuts screwed thereon.

The riser storage hold 40 comprises one or more riser storage racks 41 adapted to store therein multiple riser stands 62 in horizontal orientation, e.g. each storage rack being embodied to support a riser stand at end portions thereof as well as at an intermediate portion thereof at or near each connection between riser sections of the riser stand.

In this example the riser stands 62 each have a length of 150 ft. (45.72 m).

The riser storage hold 40 has a floor 42, side walls 43a, 43b, and a roof 44. This roof 44, as is preferred, is formed by the structure of the main deck 9.

The riser storage hold 40 is provided with an elongated riser stand transfer opening 45 having a length and a width so as to allow for transfer, e.g. by lifting, of a single riser stand 62 in horizontal or substantially horizontal (e.g. less than 30 degrees inclination) orientation via said riser stand transfer opening 45 out of and into the riser storage hold 40.

Within the hold 40 a riser stand handling crane 50 is provided, here embodied as a travelling overhead beam crane with crane rails 51 transverse to the vessel and with a crane beam 52 from which riser grippers 53 or the like are suspended by means of winched cables.

The riser stand handling crane 50 is adapted to lift and lower a riser stand 62, e.g. for removing a riser stand from a stack and placing a riser stand back into the stack.

The crane 50 allows for transverse transportation of a lifted riser stand 62 within the hold 40 to a transfer station 55 of the riser storage. This transfer station 55 is provided with one or more riser supports 56 that are adapted to support thereon the riser stand 62 in horizontal orientation.

As can be seen the riser stand 62 is then in a position aligned with the riser stand transfer opening 45, which is vertically above the location of the riser supports 56.

The riser supports 56 form part of a transfer elevator 57 that is adapted to raise and lower a riser stand 62 in horizontal orientation thereof so as to pass the riser stand 62 through the riser stand transfer opening 45. For example the supports 56 are guided on vertical guides and connected to winches so as to allow the supports 56 and any riser stand 62 thereon to be lifted and lowered.

The riser stand transfer opening 45 here is made in the main aft deck area.

The opening 45 is oriented with its length towards the moonpool 5, here, as preferred, along a central axis of the vessel 1.

As the elevator 57 allows to bring a riser stand 62 above the main deck, further technical equipment is needed to bring the riser stand 62 in a vertical or upended position, aligned with the firing line 20 so as to allow the connection of the riser stand to the launched portion of the riser string that is held by the device 17. An embodiment and advantageous details of such equipment will be discussed below.

For transportation of the riser stand 62 between the raised position resting on the supports 56 of the elevator 57 and an upended position aligned with the firing line 20 a riser stand strongback assembly 80 is provided.

This assembly comprises a strongback having an elongated strongback frame 81 provided with retaining members 82 adapted to retain a riser stand 62 relative to the strongback frame. The strongback frame has a leading end 81a and a trailing end 81a.

The strongback frame 81 is provided with a lifting member 83 at the leading end thereof. The hanger device 26 is provided with a lifting member 26a adapted to be connected to the lifting member 83 at the leading end of the strongback frame 81.

The strongback frame 81—if its lifting member 83 is connected to the lifting member 26a of the hanger device 26—is, by operation of the winch, movable between a substantially horizontal transfer position, wherein the riser stand 62 is received from the elevator 57, and a vertical firing line position aligned with the firing line 20 above the riser string portion held by device 17.

As is practical, two substantially horizontal rails 85 extend along the opposed sides of the riser stand transfer opening 45.

The strongback assembly further includes a travelling carriage 89, here a wheeled travelling carriage, that travels over the rails 85 and that supports the strongback frame 81. In this embodiment the rear end of the frame 81 is pivotally connected to the carriage 89.

Possibly a carriage drive motor is provided to drive the travelling carriage along the one or more substantially horizontal rails 85.

Upon raising the hanger device 26 the leading end of the strongback frame 81 is lifted whilst the strongback remains supported by the travelling carriage 90 which then travels over the rails towards the mast 10, until the strongback frame 81 and riser stand 62 retained thereby are upended into the vertical firing line position with the riser stand 62 aligned with the firing line 20.

The rails 85 may extend onto the working deck 15 when such is required for the carriage 90 in view of the desired aligned position of the upended riser stand 62 in the firing line 20. A portion of the rails 85 may be inclined when desired, e.g. a portion close to the mast.

In the lowered or transfer position of the strongback frame 81, the strongback frame is positioned so as to bring a riser stand 62 in horizontal orientation thereof from the riser storage hold 40 to the strongback frame 81 and so as to release the riser stand from the strongback frame and return the riser stand in horizontal orientation thereof into the riser storage.

In the vertical firing line position of the strongback frame 81, the riser stand 62 retained by the strongback is aligned with the firing line so as to allow for interconnection of the riser stand to a riser string suspended from the riser string hanger in the firing line. No further mechanism for any displacement of the upended riser stand towards the firing line is required.

It is envisaged that the hanger device is also provided with a riser string lifting tool 25 that is adapted to connect to an end of a riser section forming part of the riser stand 62 whilst retained by the strongback 81. This tool 25 is embodied to support the weight of a riser string 62 in the firing line 20 when released by the riser string hanger 17. Such tools 25 are known in the art, and may e.g. include hydraulic operated clamps engaging on the connector fitting arrangement or within the riser pipe.

As is preferred the lifting member 26a of the hanger device and the lifting member 83 of the strongback frame 81 are embodied to remain connected to one another whilst then allowing for the interconnection and disconnection of the riser string lifting tool 25 and an end of a riser section belonging to a riser stand 62 retained by the strongback.

The strongback frame 81 here is embodied with an inverted U-shaped cross-section. The frame 81 defines a receiving cavity for the riser stand which cavity is open at a bottom side thereof when in the transfer position to allow for passage of the riser stand into and out of the receiving cavity. In other words, at the transfer station loading and unloading of the frame takes place via the open bottom of the frame. In another embodiment one can envisage that the frame is open to a side, but a lower opening is preferred.

In the embodiment shown here, the strongback frame 81—in its transfer position—is not exactly above the riser stand transfer opening 45 but is offset from the riser stand transfer opening 45 in a direction towards the moonpool 5 when seen in longitudinal direction of the opening 45. This is because, as is preferred, during the process of assembly or disassembly of a riser string, the strongback remains attached to the travelling hanger device 26.

The transfer elevator 57 is adapted to raise and lower the riser stand 62 in horizontal orientation thereof so as to pass the riser stand 62 through the opening 45 into the receiving cavity of the frame 81 with a portion of the riser stand 62 extending rearward beyond the trailing end of the strongback frame.

A riser stand linear displacement device is provided as part of the strongback, which linear displacement device here includes a subframe 87 that is slidable, e.g. on rollers, relative to the frame 81 by a drive 88. The subframe 87 is provided with the retaining member 84 for the riser stand and so allows to displace the riser stand 62 in longitudinal direction whilst in the receiving cavity of the strongback 81 so as to compensate the offset of the strongback frame in the transfer position thereof.

The carriage 89 has a structure that allows the subframe to move as explained and allow the riser stand to be brought in position relative to the subframe. For example the carriage 89 has an inverted U-shape, open from below.

The carriage 89 may have wheels engaging the rails 85. The wheels may be retractable or otherwise to allow for docking of the strongback as explained herein, e.g. wheels being mounted on pivotal bogies.

It will be appreciated that the strongback, due to the length and weight of the riser stands to be handled thereby, is a massive and bulky piece of equipment. When not in use, the strongback would normally take up expensive and scarce deck space. In order to avoid the undue usage of deck space it is envisaged that the strongback frame 81, here as preferred with the travelling carriage 89, is dimensioned so as to be movable into the riser stand transfer opening 45 and to remain therein in a docking position. So the opening 45 is dimensioned not only for the passage of the riser stands 62 but also to allow introduction of the strongback in order to clear the deck of the vessel when no riser string assembly or disassembly is performed.

In the embodiment shown the strongback frame 81 together with the travelling carriage 89 of is dimensioned so as to be lowered into the riser stand transfer opening and to remain therein in a docking position. Whilst this can be done by a separate device, e.g. a gantry crane or other crane above the deck, it is preferred that the transfer elevator 57 is adapted to engage on the strongback frame, here also on the travelling carriage 89, and adapted to raise and lower them through the opening 45 between the transfer position and the docking position.

As the desire is to not only clear deck space, but also to provide for usable deck space, it is envisaged that the topside of the strongback frame is embodied as a deck portion that is flush with an adjacent deck area when the strongback frame is lowered into the opening 45 into its the docking position.

As explained, the storage of pre-assembled and preferably pre-tested riser stands in the hold greatly benefits the operation of assembly of a riser string. However sometimes a single riser section will need to be added to the string. It is envisaged that such may be done with the strongback assembly disclosed herein, possibly the frame being embodied to adjust the length thereof, e.g. assembled from modules interconnected in series or having a telescopic strongback frame, e.g. allowing to adjust the length thereof to handle a single riser section.

Figure 14:
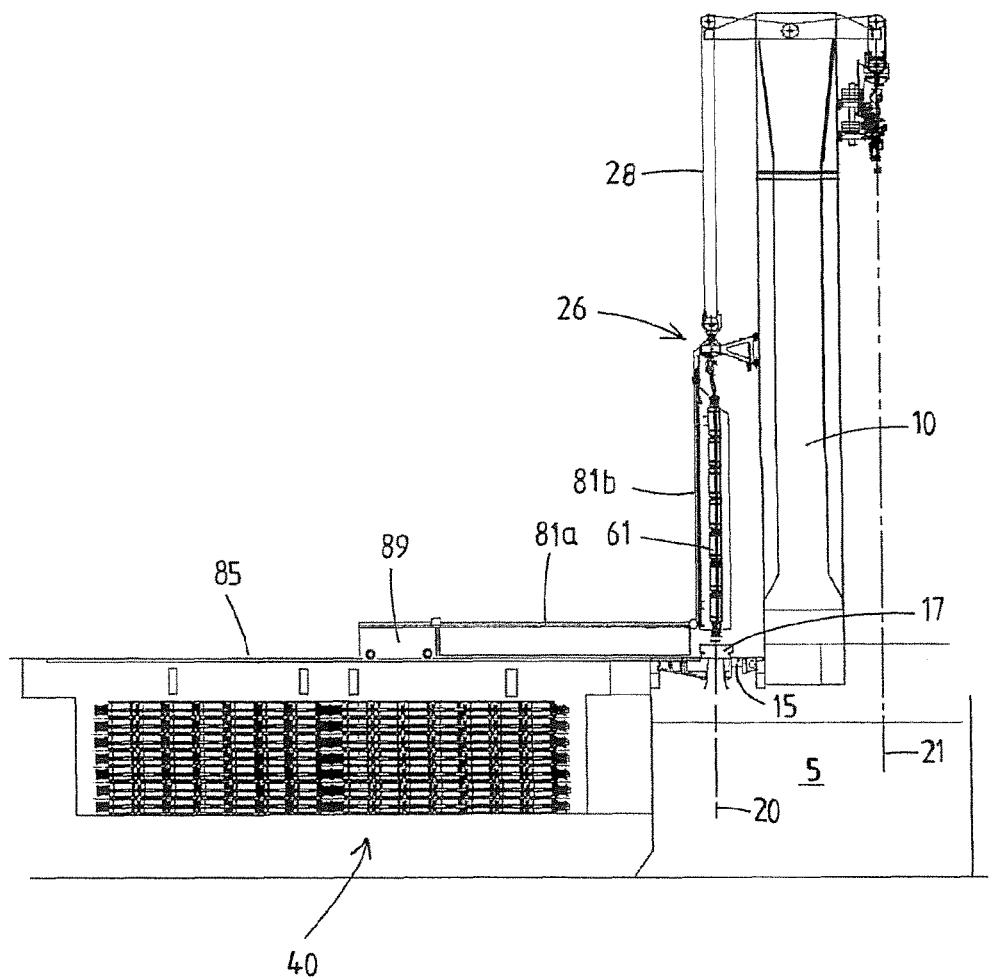
FIG. 14 shows schematically the upending of a single riser section with an alternative version of the strongback frame.

In another approach, shown in FIG. 14, the strongback frame comprises two frame halves 81a, 81b connected by a hinge so that the single riser section 61 can be placed in a forward half of the frame 81 in order to be upended whilst the rearward half remains in horizontal position.

The connection of the riser string lifting tool 25 to the riser stand 62 held in the strongback 81 is preferably made whilst the strongback frame is in its transfer position, so with the riser stand 62 substantially horizontal. In order to then make the connection, in addition to the connection between the frame 81 and the hanger device, the lifting tool 25 comprises a riser section end engaging portion that is connected via a hinge to a hanger device engaging portion of the lifting tool.

The operation of the vessel according to the invention during the process of assembly of a riser string along the firing line 20 is depicted in a series of figures.

Figure 3:
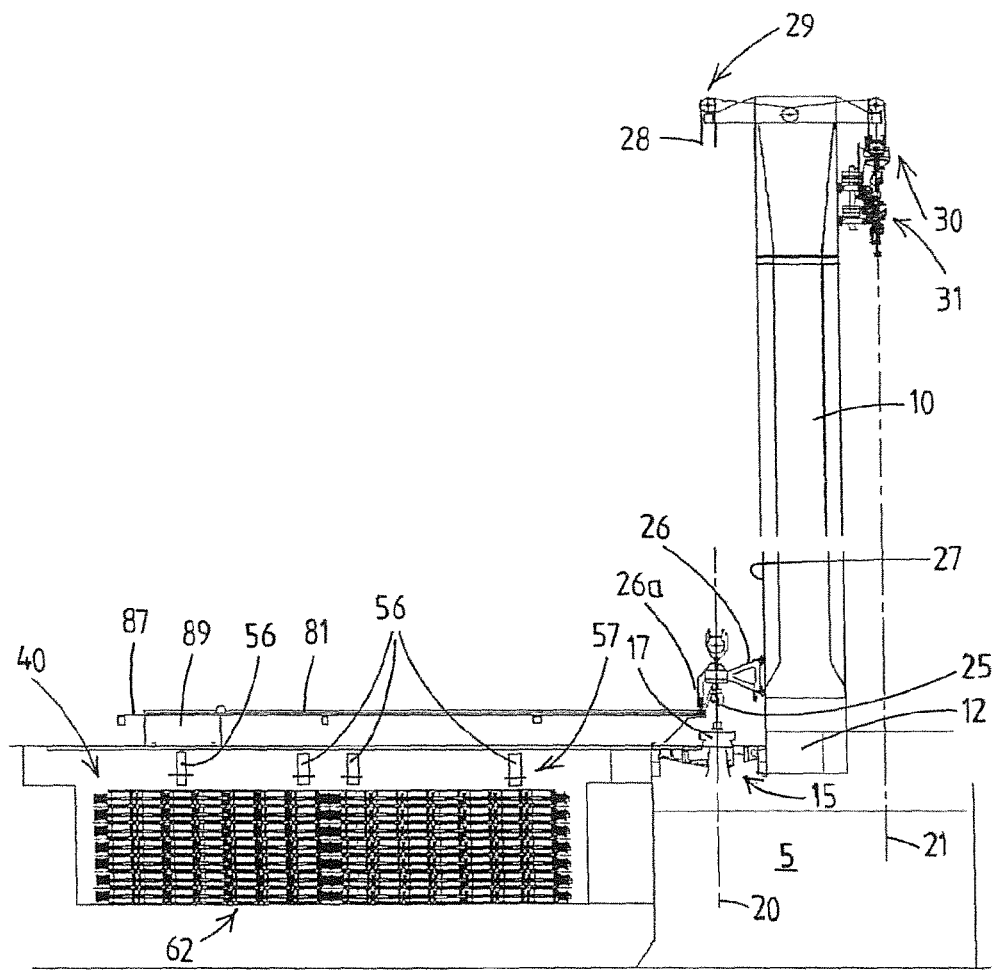
FIG. 3 shows schematically a first step in a riser stand upending process of the vessel of FIG. 1.
Figure 4:
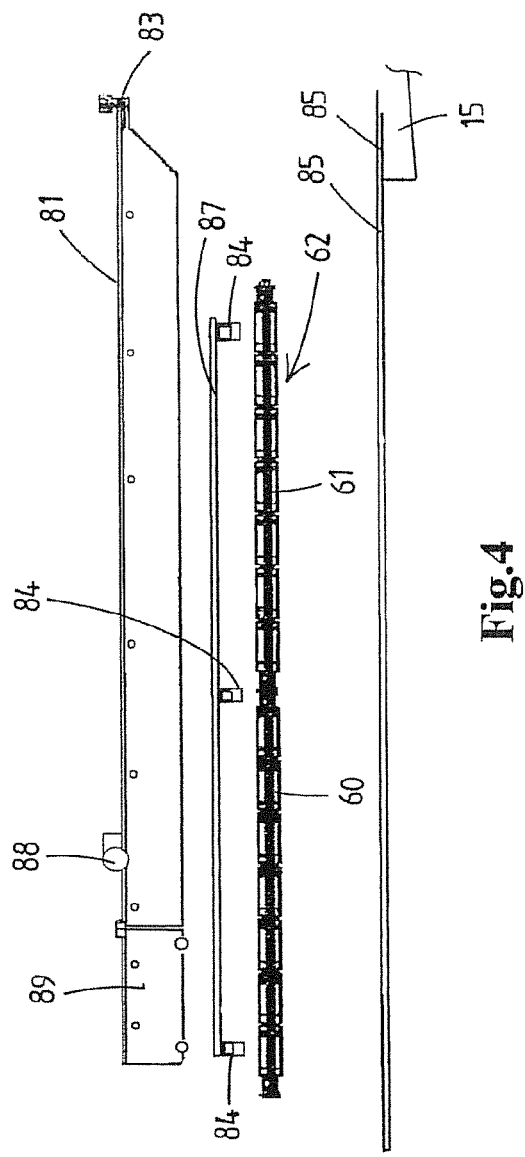
FIG. 4 shows schematically main components of the strongback assembly of the vessel of FIG. 1, and a riser stand to be handled by said assembly.

In FIG. 3 the riser stands 62 are stored within the hold 40. The strongback frame is attached to the hanger device and is in its transfer position. The subframe 87 with retaining members 84 has been slided rearward to a position vertically above the elevator 57.

Figure 5:
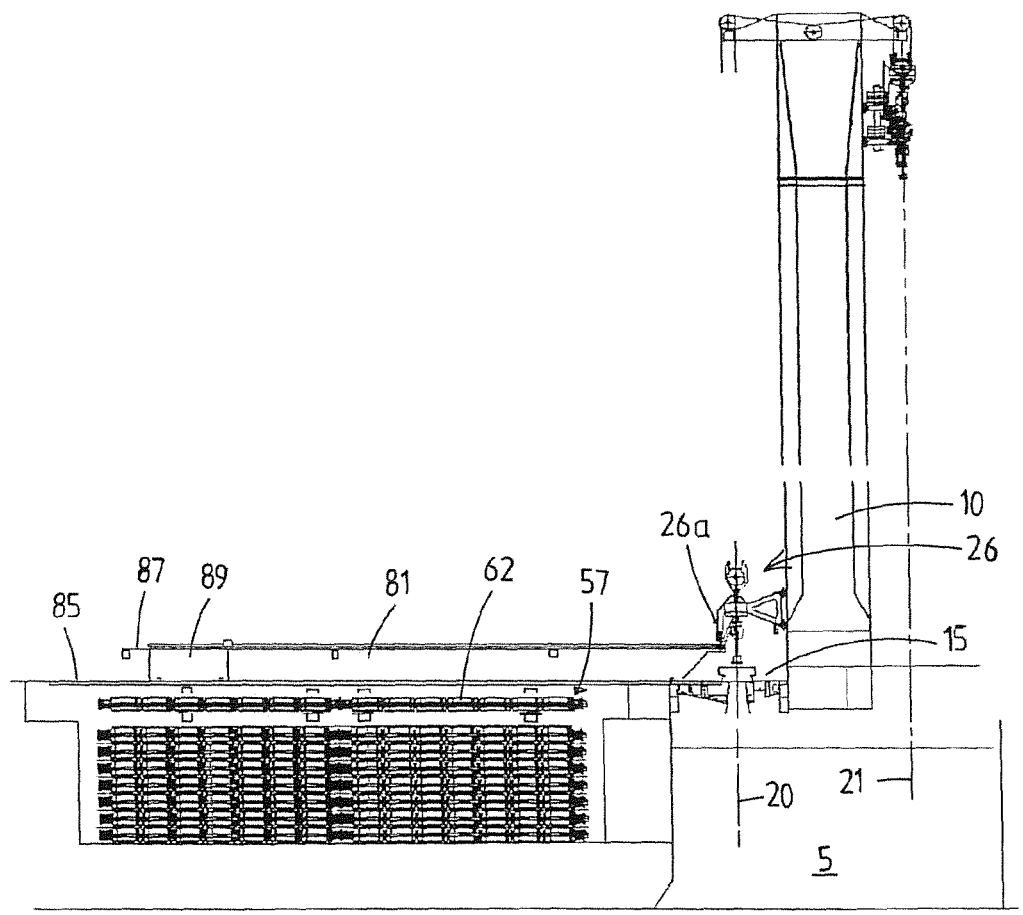
FIG. 5 shows schematically a second step in a riser stand upending process of the vessel of FIG. 1.

In FIG. 5 a riser stand 62 has been taken from the stack in the hold 40 by means of crane 50 and placed onto the supports 56 of the elevator 57.

Figure 6:
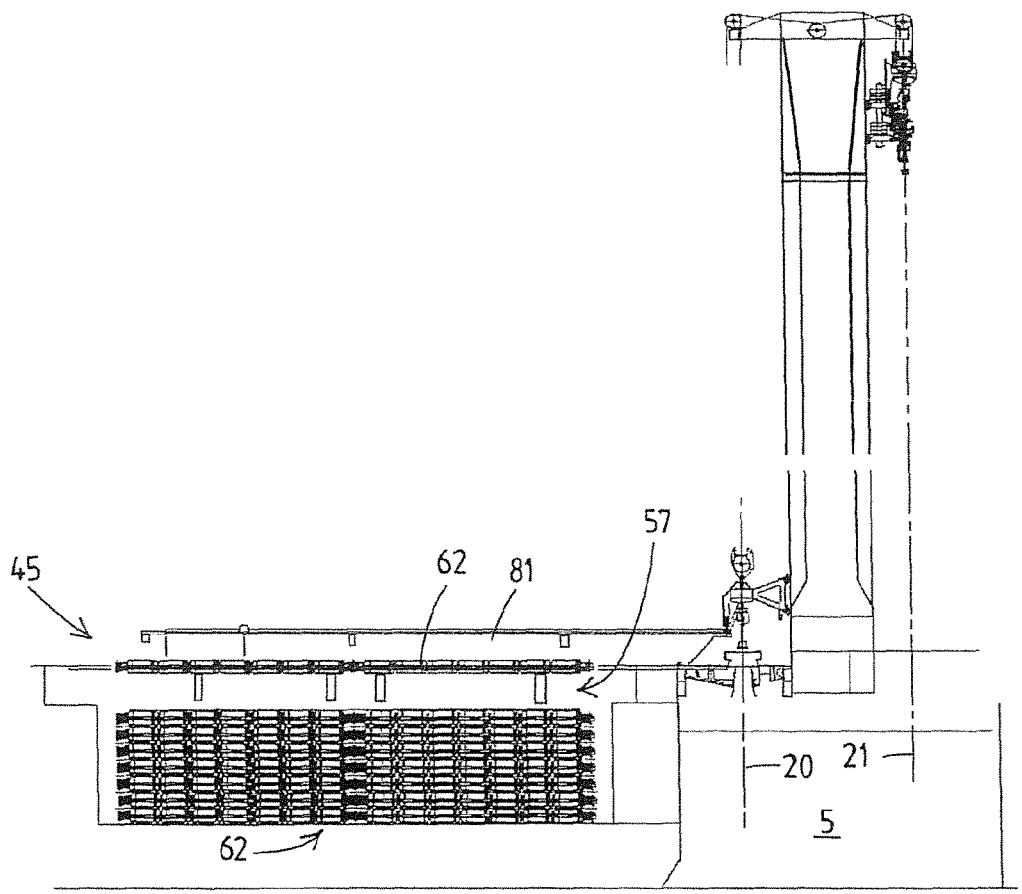
FIG. 6 shows schematically a third step in a riser stand upending process of the vessel of FIG. 1.

In FIG. 6 the riser stand 62 passes through the riser stand transfer opening 45 in the main deck of the vessel.

Figure 7:
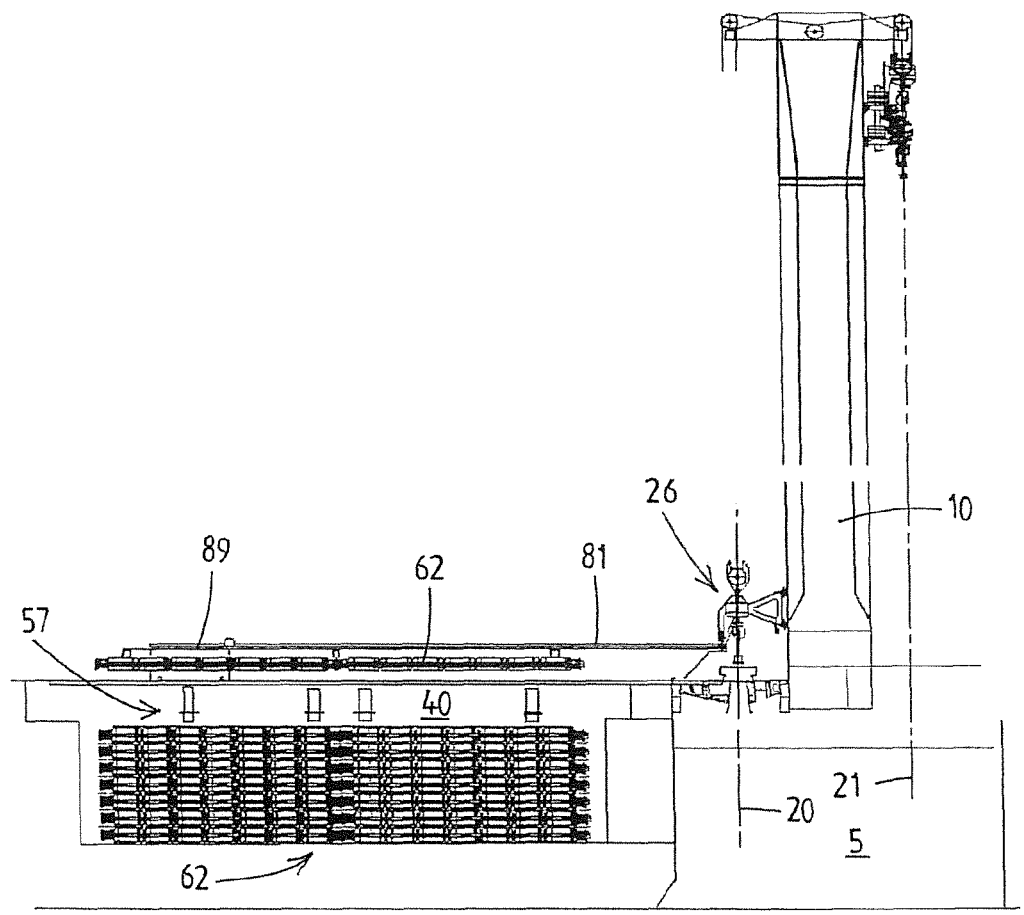
FIG. 7 shows schematically a fourth step in a riser stand upending process of the vessel of FIG. 1.

In FIG. 7 the riser stand 62 is brought in alignment with the retaining members 84 on the subframe 87 and suitably secured to the subframe by means of the members 84, possibly with the help of additional securing materials. (here through the also inverted U-shaped carriage 89).

Figure 8:
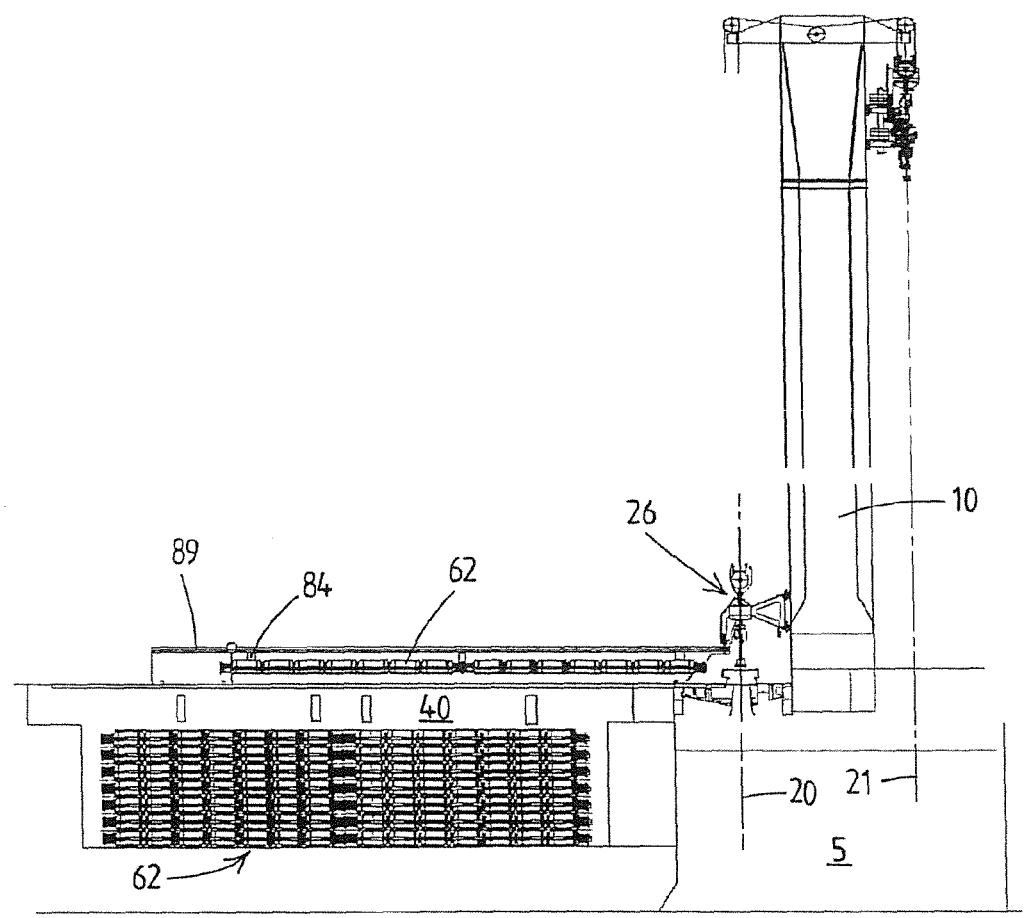
FIG. 8 shows schematically a fifth step in a riser stand upending process of the vessel of FIG. 1.

In FIG. 8 it is illustrated that the riser stand 62 has been conveyed forward relative to the frame 81 as the drive 88 has moved the subframe 87 forward. Now the riser stand 62 is suitably positioned within the frame 81 for its upending.

Figure 9:
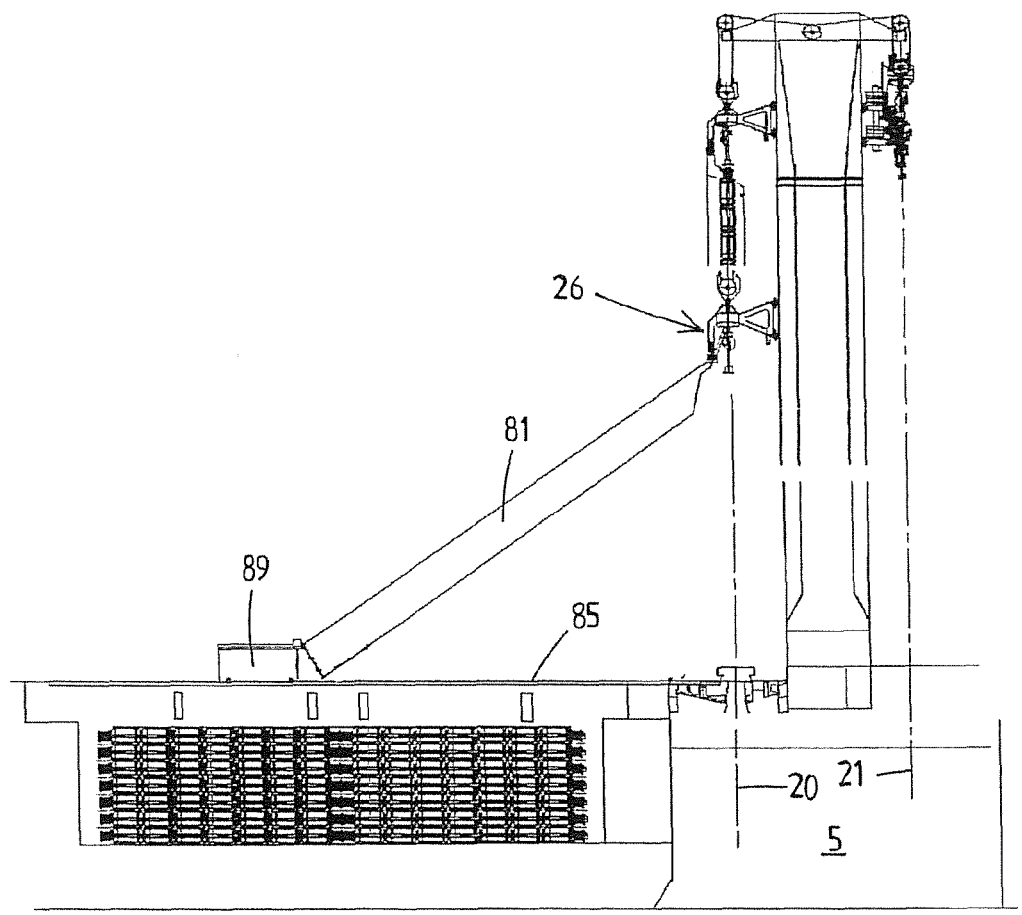
FIG. 9 shows schematically a sixth step in a riser stand upending process of the vessel of FIG. 1.

In FIG. 9 the frame 81 has been lifted to about 45 degrees by means of the riser handling capacity hoisting device. The carriage 89 has moved over the rails 85 towards the moonpool 5.

Figure 10:
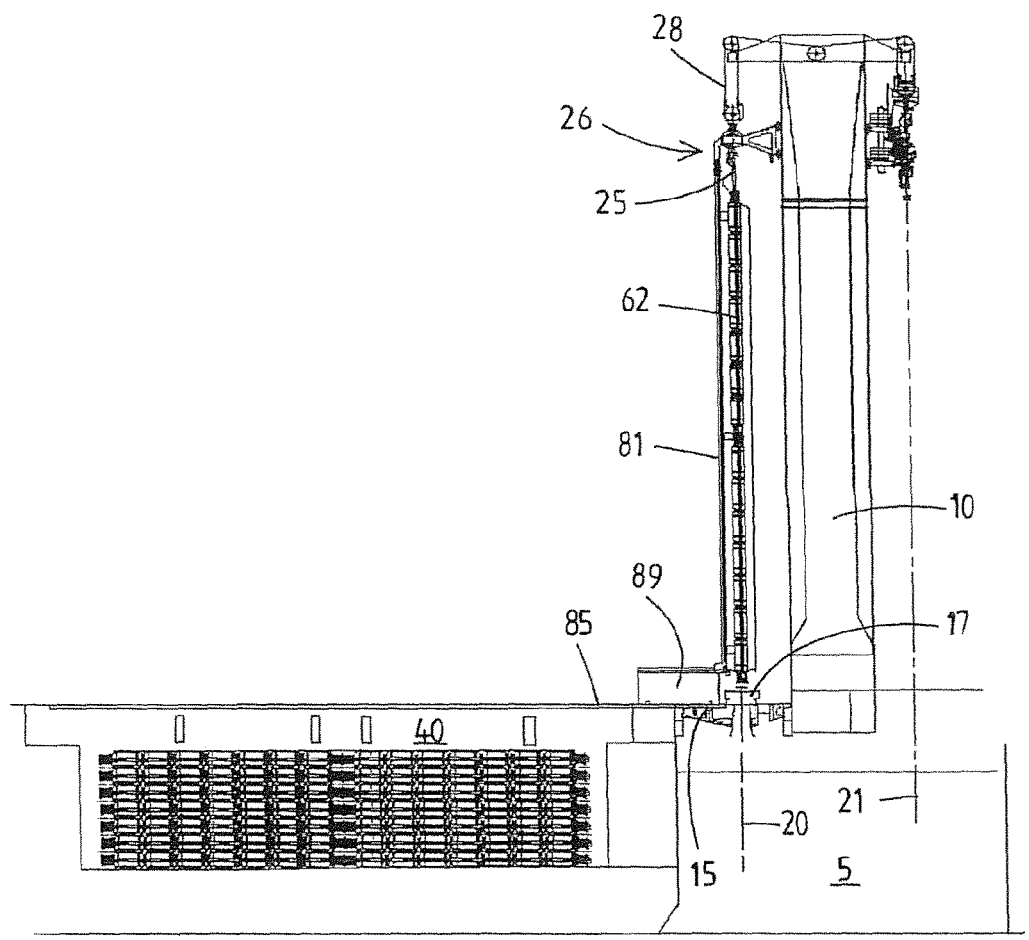
FIG. 10 shows schematically a seventh step in a riser stand upending process of the vessel of FIG. 1

In FIG. 10 the frame 81 is fully lifted to its vertical position, and the riser stand 62 is now vertical and aligned with the firing line 20. The lower end of the riser stand 62 is above the device 17, so above any riser string portion suspended already from the device 17.

It is in this example illustrated that the tool 25 is connected to the end of the riser stand 62 at this stage, so with the riser stand 62 upended. As explained, in another approach this connection can also be earlier.

In order to bring the connector fitting arrangement at the lower end of the upended riser 62 onto the top end fitting of the launched riser string the hanger device 26 is somewhat lowered, but in an alternative the subframe 87 is used to effect this motion of the riser stand 62. The connection to the deployed riser string can now be made, e.g. by application of bolts and nuts as is known in the art to interconnect flanges of the riser sections to be joined.

After the connection has been made and tested, the device 17 is released so that the entire riser string becomes suspended from the hanger device 26. Then the riser string is lowered by means of winch 29a and cable(s) 28 until the top end thereof can again be secured by means of device 17. In the process of this lowering of the riser string, the strongback 80 is moved towards its transfer position. Then the process of supplying and upending a riser stand can start anew.

It will also be possible to lower the riser string such that it can become suspended from the cart 35 within the moonpool 5. The string can then be shifted to the firing line 21, e.g. to perform drilling operations with a drill string driven by topdrive 31, with the drill string within the riser string.

In a preferred embodiment the cart 35 is provided with a gimballing riser string hanger device, to allow for relative motion between the riser string and the vessel.

At the front moonpool area 5a a riser tensioner system may be provided to suspend the riser string during drilling operations or the like that are conducted through the riser string.

In a slightly different sequence one can envisage that a new riser stand 62 is already moved upward through the opening 45 by means of the elevator 57 ahead of the strongback 80 being returned to its transfer position. So then the frame 81 moves over the riser stand 62 and then the stand 62 is secured to the frame. This approach may be used to save time in the assembly process of the riser string.

It will be appreciated that first a blow-out preventer can be positioned at the rear moonpool area 5b, so that the BOP is at the lower end of the riser string.

Figure 12:
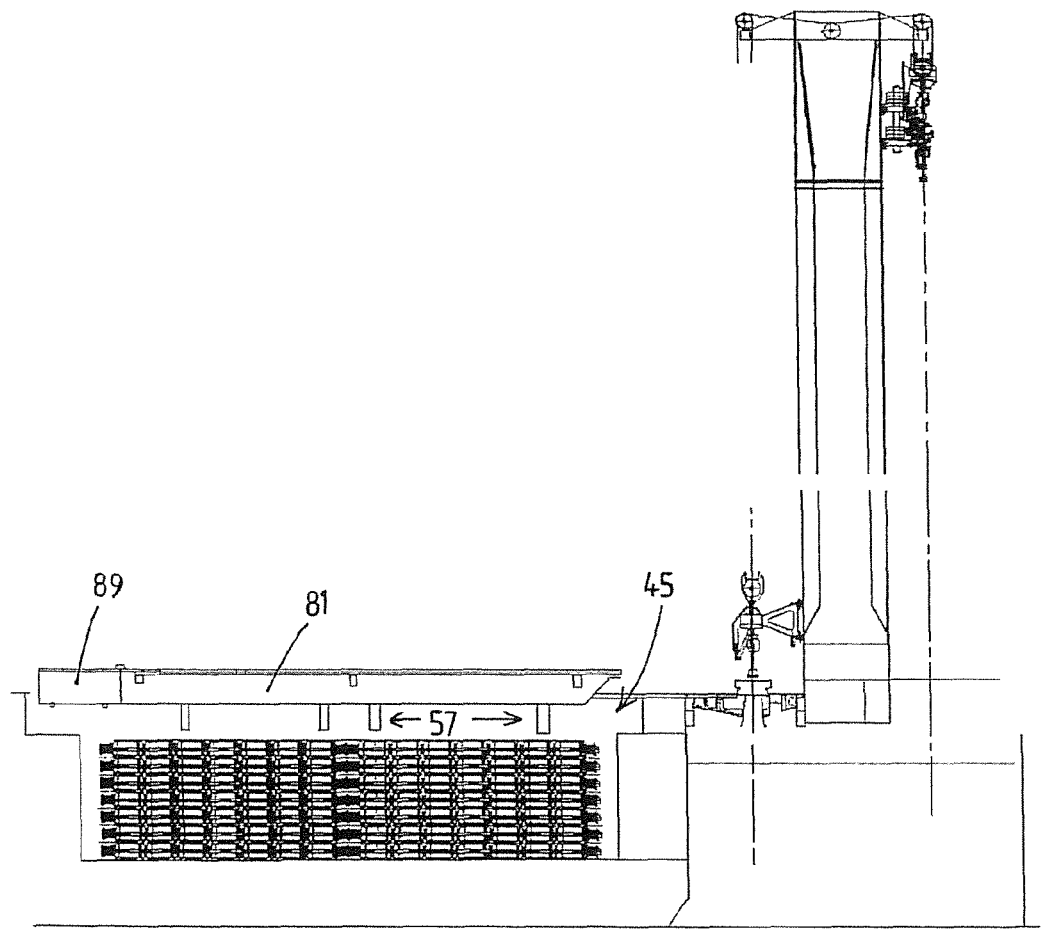
FIG. 12 shows schematically a first step in the storage of the strongback assembly of the vessel of FIG. 1.
Figure 13:
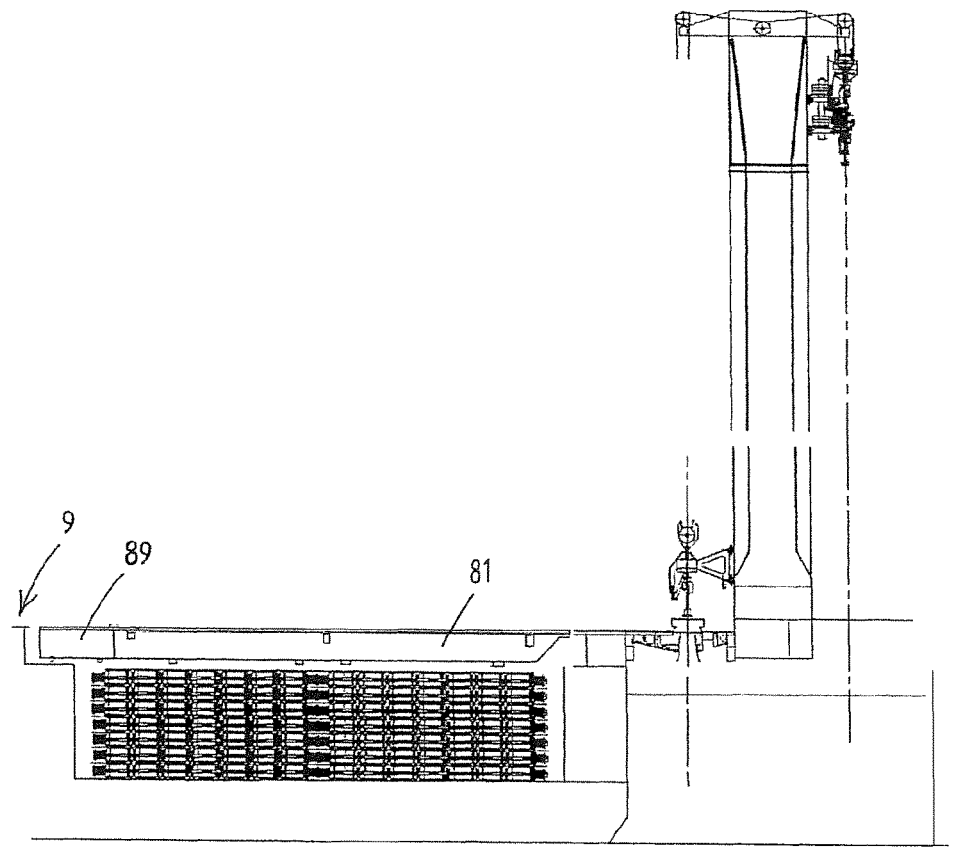
FIG. 13 shows schematically a second step in the storage of the strongback assembly of the vessel of FIG. 1.

Once riser handling is no longer required, the strongback frame 81 together with the travelling carriage 89 is lowered into the riser stand transfer opening 45 by means of the transfer elevator 57. This is shown in FIGS. 12 and 13.

The topside of the strongback frame, and here also of the carriage 89, is embodied as a deck portion that is flush with an adjacent deck area 9 when the strongback has been lowered into the opening 45 into its the docking position. This is best seen in FIG. 13.

It is envisaged that the vessel may be equipped with a mobile catwalk machine 135 that is embodied to handle single riser sections as is known in the art.

It is envisaged that, e.g. for handling a first riser section to be connected to the top of a blow-out preventer, this catwalk machine 135 can be positioned on top of the topside of the strongback frame in its docking position, so that the riser section or other tubular can be supplied to the firing line 20. For example the catwalk machine 135 is moved by means of crane 130, but one can also envisage that the machine 135 is placed "in line" with the rails 85 of the strongback and moved in said direction from a stern-side non-operative position to an operative position near the moonpool 5. For example the machine 135 is then moved over the same rails 85 as the strongback.

Figure 19:
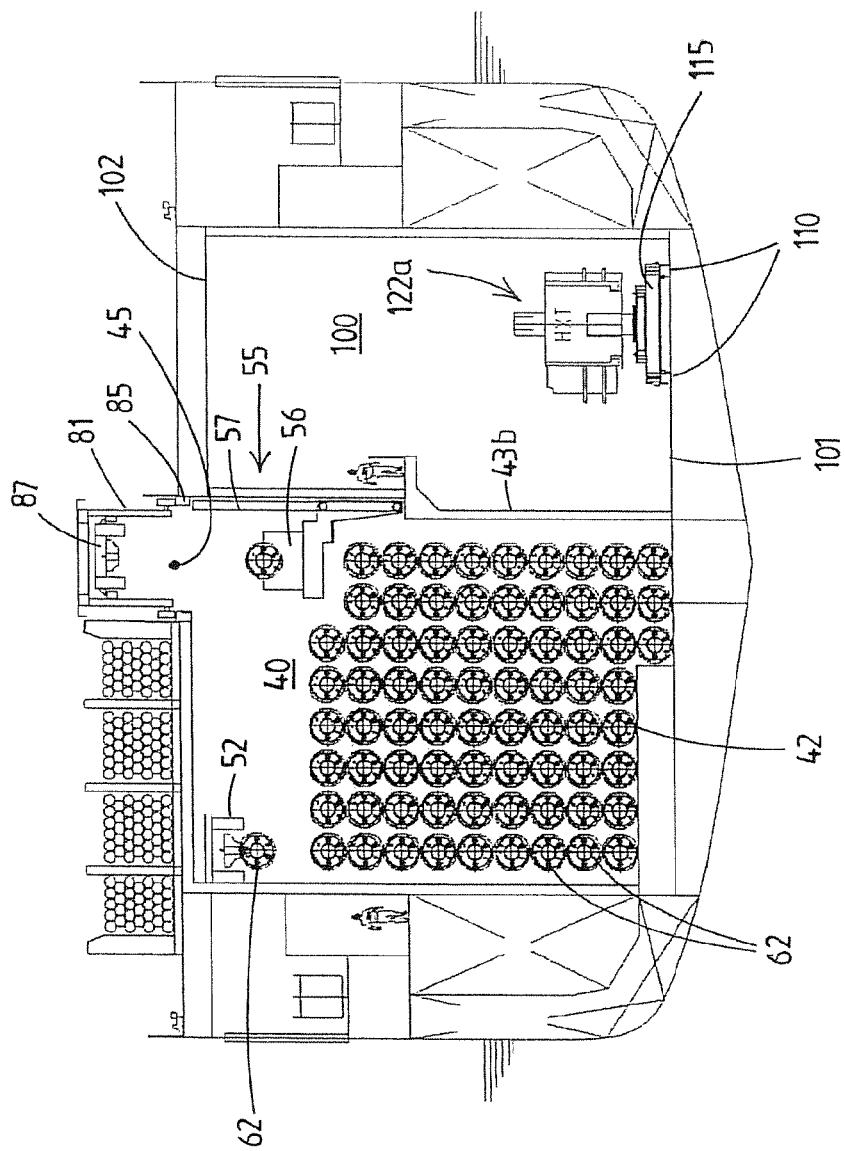
Figure 23:
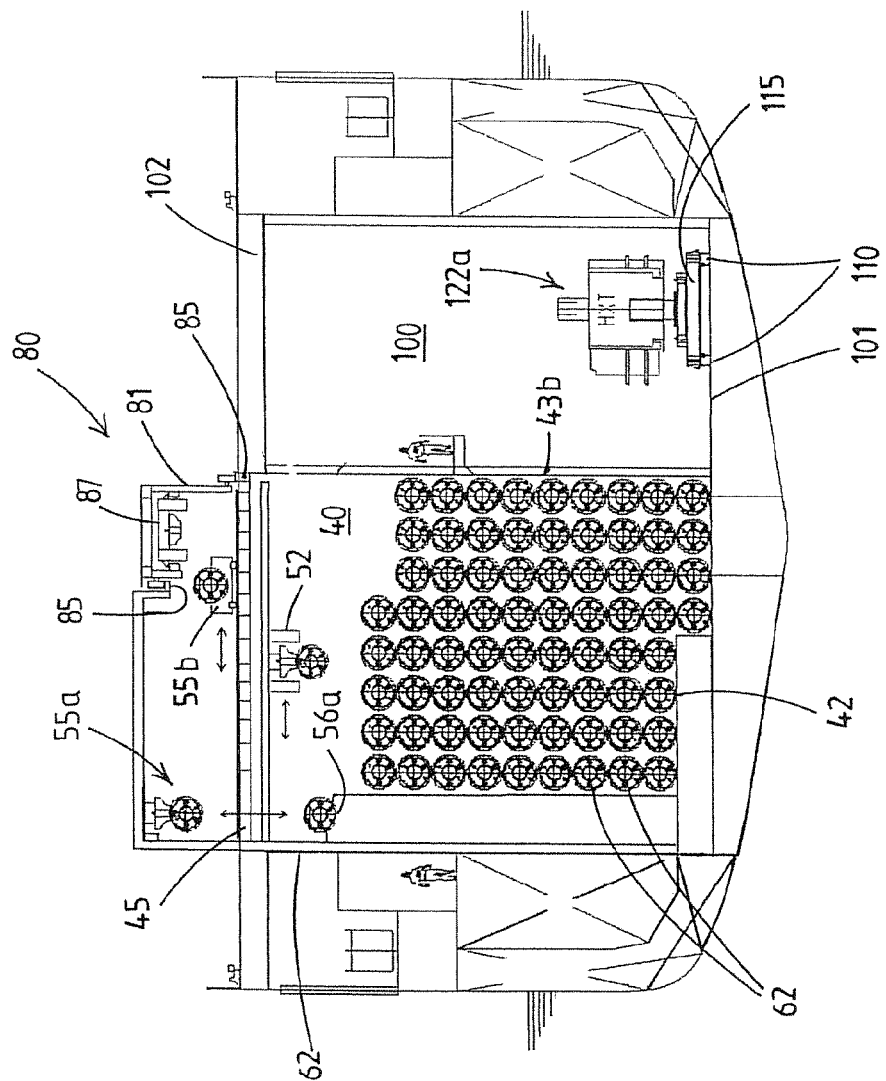
FIG. 23 illustrates in a view similar to FIG. 19 an alternative embodiment of the riser handling between the storage hold and a strongback.

FIG. 23 illustrates in a view similar to FIG. 19 an alternative embodiment of the riser handling between the storage hold 40 and a strongback 80.

The transfer station now includes a stationary riser stand support 56a onto which the crane 50 can place a riser stand 62. A transfer station crane 55a is arranged vertically above the support 56a allowing to raise the riser stand above the roof of the hold 40 through the opening 45. The crane 55 is laterally offset from the strongback 80 in its transfer position and it is envisaged that the riser stand 62 is introduced sideways into the strongback 80. Here a riser stand shuttle cart 55b is provided, which can be shuttled between a position to receive a riser stand from the crane 55a and a position within the cavity of the strongback frame 81.

The frame 81 now has an angle shape, with a top side frame member and one side frame member, but open from below and to the other side. This allows for sideways introduction of the riser stand 62 into the frame 81. As can be seen one or rails 85 now is arranged at a higher level than the other rail 85.

It is noted that the shuttle cart 55b could also be embodied to perform the mentioned linear displacement of the riser stand relative to the frame 81, so that the subframe 87 can be disposed with. For example the cart 55b could be arranged on rails that are diagonal, or the cart 55b could include a subframe similar to subframe 87 and associated drive 88.

As can be best seen in FIG. 19 the vessel is a monohull vessel, and—in transverse cross-section of the hull of the vessel—the riser storage hold 40 is arranged in majority to one side of the vessel, with a blow-out preventer BOP storage hold 100 on the other side of the vessel adjacent the riser storage hold and with a separating longitudinal bulkhead 43b of the hull in between forming a sidewall of the riser storage hold 40.

The blow-out preventer BOP storage 100 has a floor 101 and a roof 102 that includes one or more hatches 103, 104 (see FIG. 2). The hold 100 has a height between the floor 101 and the roof 102 of at least 15 meters, preferably between 15 and 25 meters.

The BOP storage hold 100 has on the floor thereof a skid rail system with one or more skid rails 110, and one or more skiddable blow-out preventer supports 115 are provided, each adapted to support thereon a blow-out preventer 120, 121, 122, 123, 124 or module thereof and skiddable over said skid rails system whilst supporting a blow-out preventer or blow-out preventer module. Here the skid rail system comprises rails 110 extending in longitudinal direction of the vessel. If desired a travelling beam crane can also be provided in the hold 100, e.g. to place modules 123, 124 on a test stump in the hold.

Figure 17:
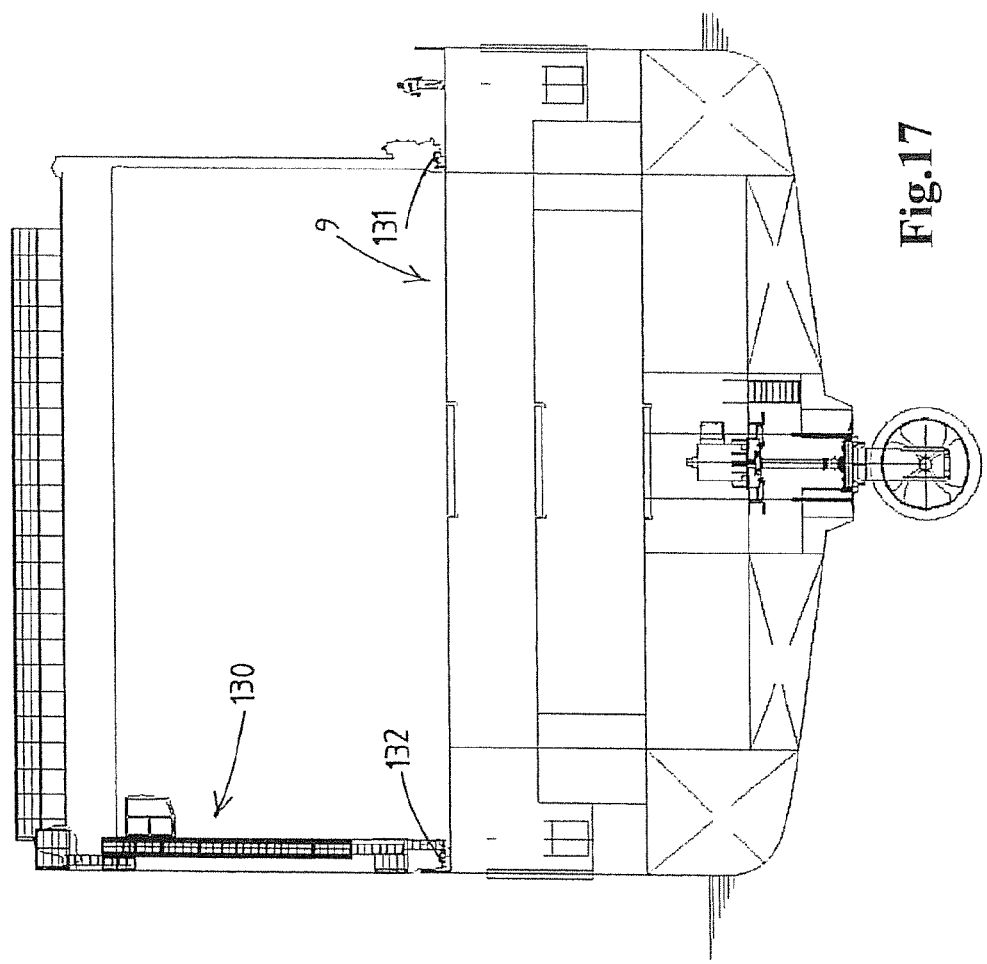
FIG. 17 shows a transverse section of the vessel of FIG. 1 near the stern, with the blow-out preventer capacity gantry crane visible.
Figure 18:
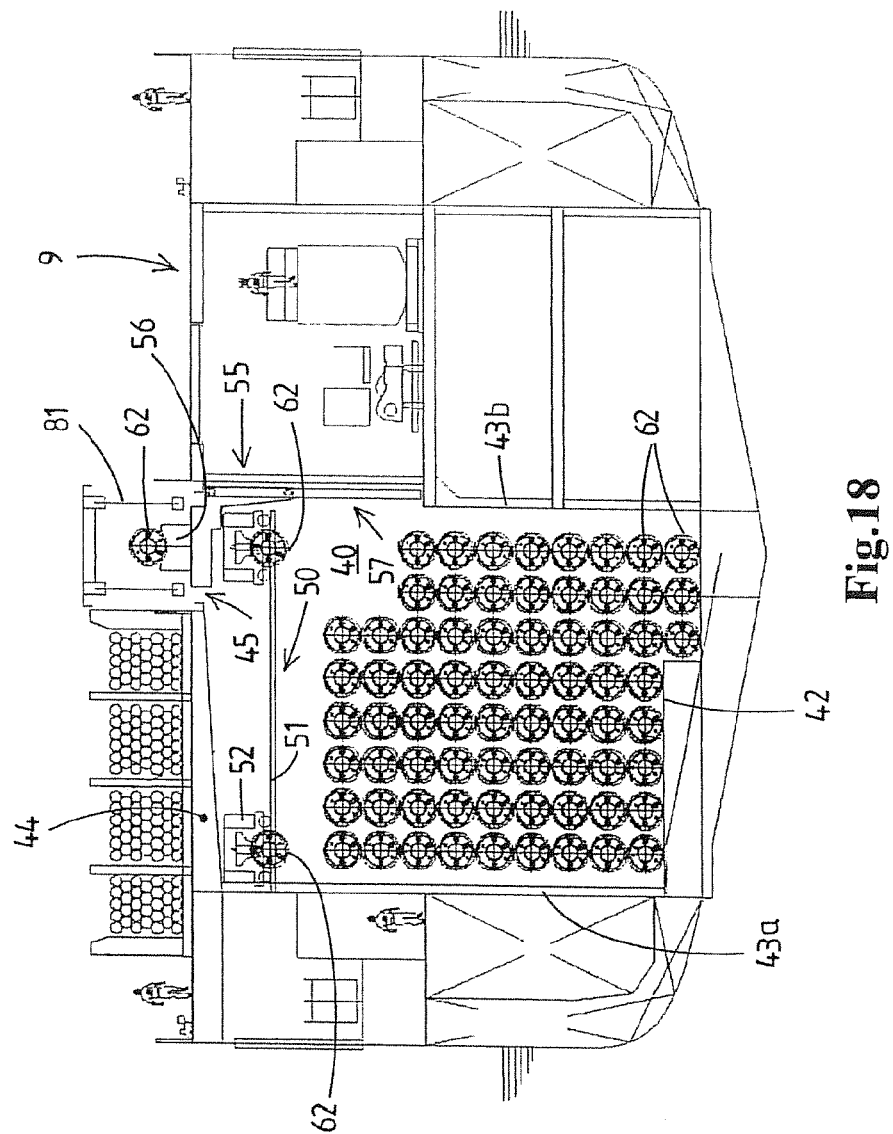
FIG. 18 shows a transverse section of the vessel of FIG. 1 showing the riser storage hold, the riser stand handling gantry crane in said storage hold, the transfer elevator, and the strongback assembly, FIG. 19. shows a transverse view at another longitudinal position of the vessel with a riser stand placed onto the elevator.
Figure 20:
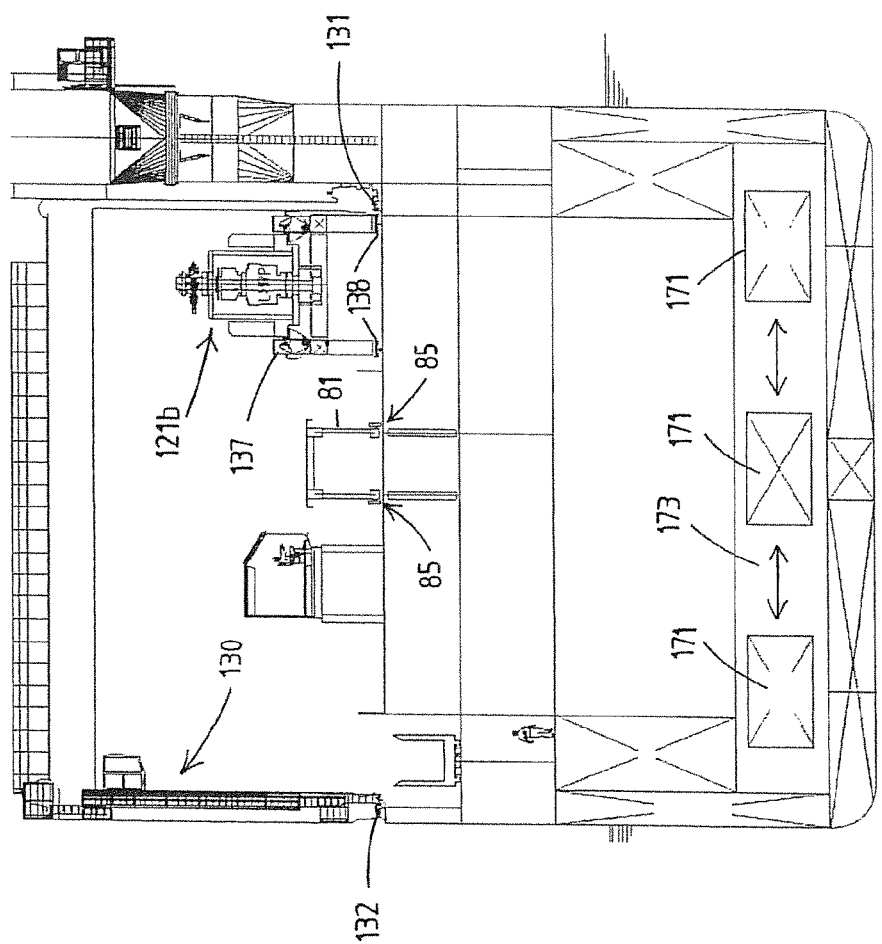
FIG. 20 shows a transverse view at a position between the riser storage hold and the moonpool, illustrating a possible location of a solid ballast device.

As illustrated in FIGS. 17 and 20 the vessel is provided with a gantry crane 130 which travels over the rear deck area 9 of the vessel along gantry crane rails 131, 132, as is preferred in longitudinal direction of the vessel. This crane 130 can reach a position above the rear moonpool area 5b. The crane 130 can also reach a position above the BOP storage hold 100, here above each hatch 103, 104 thereof, so as to allow for transfer of a blow-out preventer or blow-out preventer module between the storage hold and the rear moonpool area 5b. As explained, due to the enormous weight of the BOP and BOP modules, this requires a heavy lifting load capacity gantry crane 130.

Figure 21:
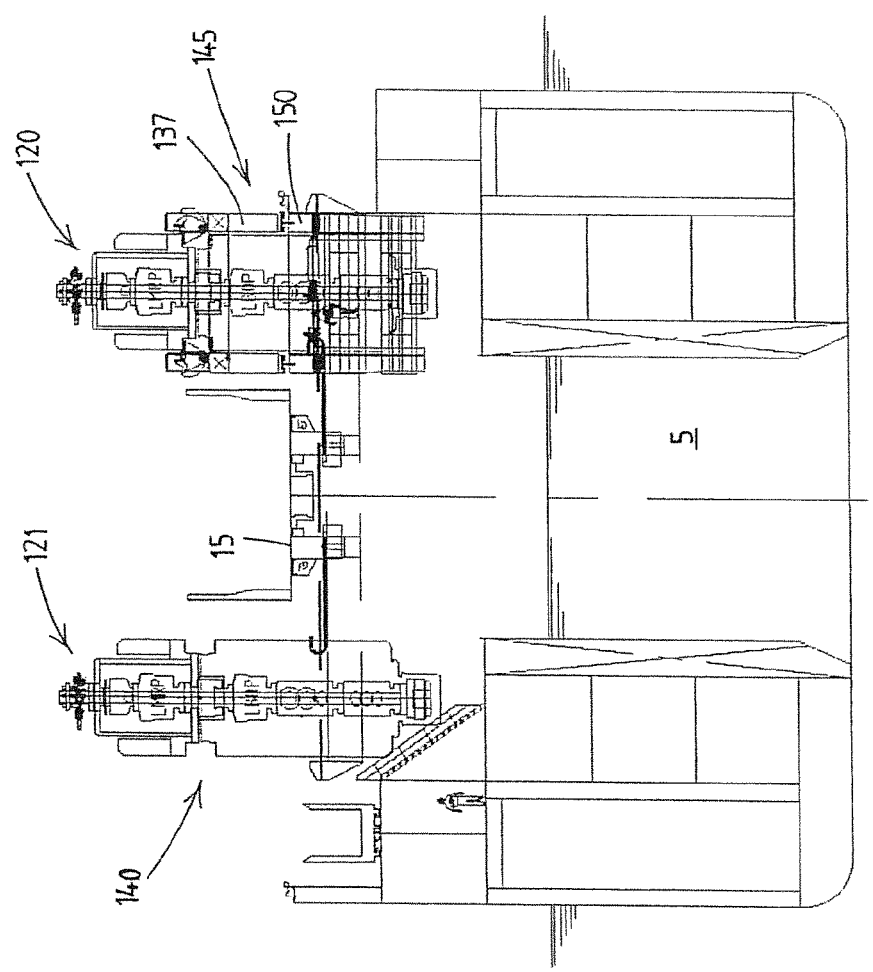
FIG. 21 shows a transverse view at the rear moonpool area

As can be seen in FIGS. 2 and 21 a first blow our preventer docking station 140 is present at a first, here port, side of moonpool 5 and second blow out preventer docking 145 station is present at an opposed second, here starboard, side of moonpool. This means that a BOP or at least a module thereof can be docked at either side of the moonpool 5, e.g. allowing to stack one module on top of another module at such a docking station by means of the crane 130.

The gantry crane 130 may be adapted to transfer a blow-out preventer or blow-out preventer module between the BOP storage hold 100 and each of the BOP docking stations 140, 145 as well as between the BOP docking stations 140, 145.

Figure 16:
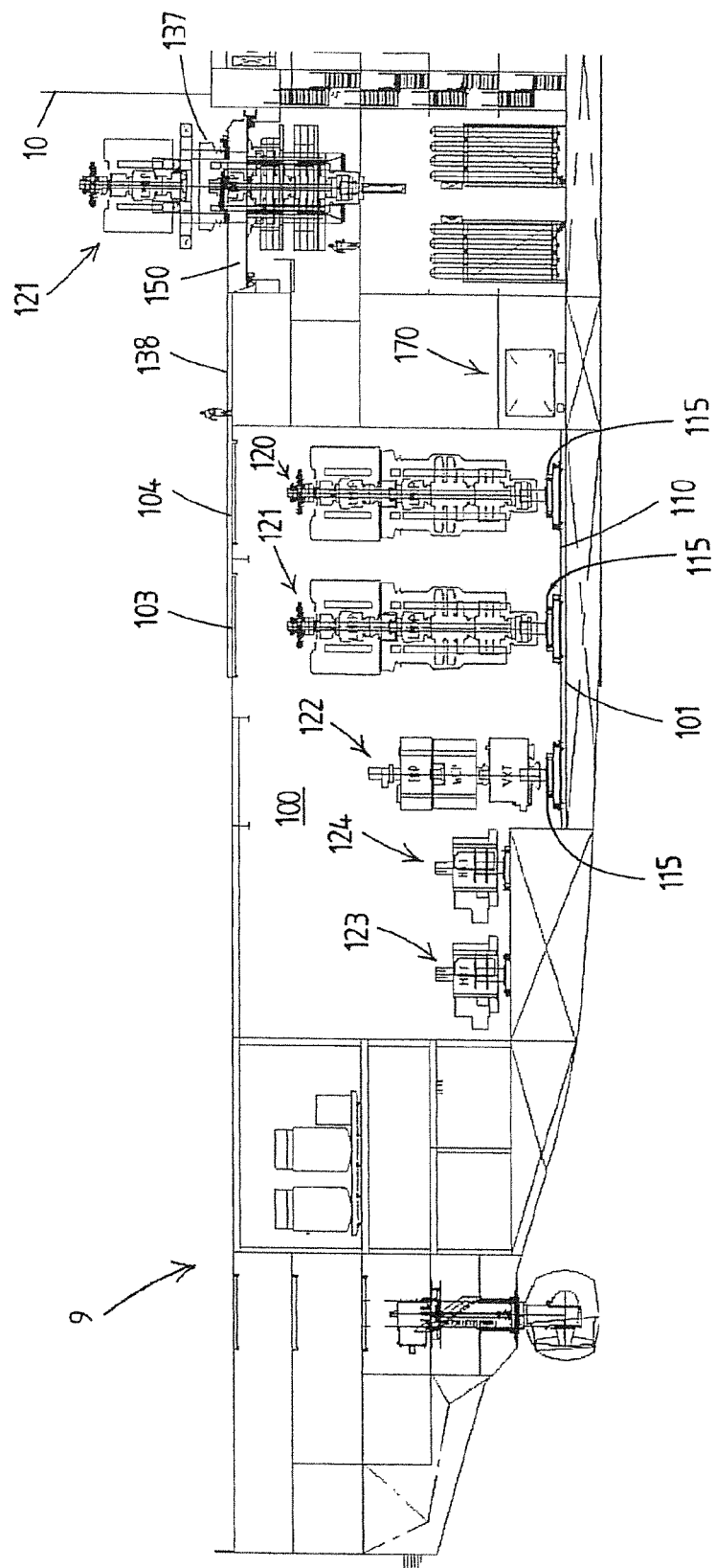
FIG. 16 shows a longitudinal section of the aft part of the vessel of FIG. 1, which sectional view extends through the blow-out preventer storage hold.

In the FIGS. 2 and 16 a BOP support cart 137 is shown which is displaceable on rails 138 extending between the one or more roof openings (with hatches 103, 104) of the BOP hold 100 on the one hand and docking station 145, generally in longitudinal direction of the vessel.

The cart 137 is embodied to support a BOP or module thereof. Preferably the cart 137 and rails 138 are embodied as a skid rail system.

The BOP or module can be retrieved from the hold by the crane 130 and then placed on the cart 137. The cart 137 with BOP or module thereon is then skidded to station 145.

Figure 15:
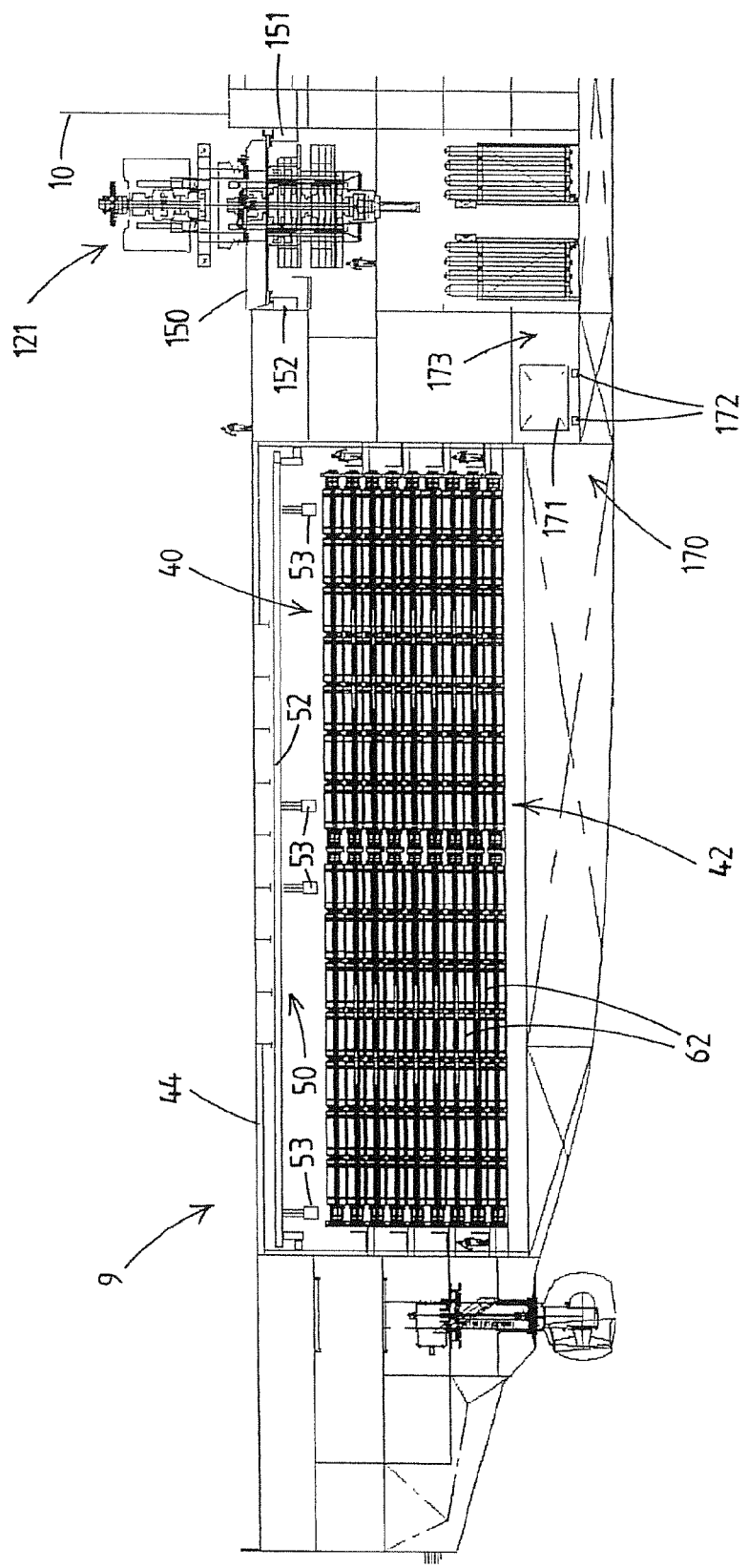
FIG. 15 shows a longitudinal section of the aft part of the vessel of FIG. 1, which sectional view extends through the riser storage hold.

Preferably a BOP support cart 150 (e.g. visible in FIG. 15) is provided to support a blow-out preventer or module thereon and to transfer the blow-out preventer or module between a docking station 140, 145 on the one hand and the firing line 20 that is located centrally between the docking stations 140, 145.

Here the BOP support cart 150 is supported on rails 151, 152 extending between the docking stations so that the support cart can be brought in each of said docking positions.

In more detail the cart 137 is moved onto the cart 150 as shown in FIG. 16.

The cart 137 may be provided with guides for the BOP or module thereof, in view of the passing of the BOP or module through the roof opening. The cart 137 is then secured in place, and the guides avoid any collision between the BOP or module and the sides of the roof opening. For example the guides are vertical beams.

The cart 35 herein not only is adapted to suspend a riser string, but is also embodied to support a blow-out preventer or blow-out preventer module thereon. This e.g. by means of mobile BOP support members on the cart, that can be put in a supporting position to support the BOP and a retracted position when not needed.

The possibility to place a BOP or module on the cart 35, which is preferably, as here, at a lower level than the cart 150, allows join a single riser section 60 to the top of the BOP by means of the hanger device 26, e.g. the riser section moved into the firing line 20 by another crane aboard the vessel, or by means of a catwalk machine. Once connected, the BOP can be released from the cart 35 and lowered into the sea. The deck 15 can in the process be lowered to its operative level and the riser secured to device 17. The riser stand 62 can be connected to the riser string as described herein.

The possibility to support a BOP or module thereof on the cart 35 also allows to stack modules onto one another in various sequences, similar to a tower of Hanoi game.

Figure 22:
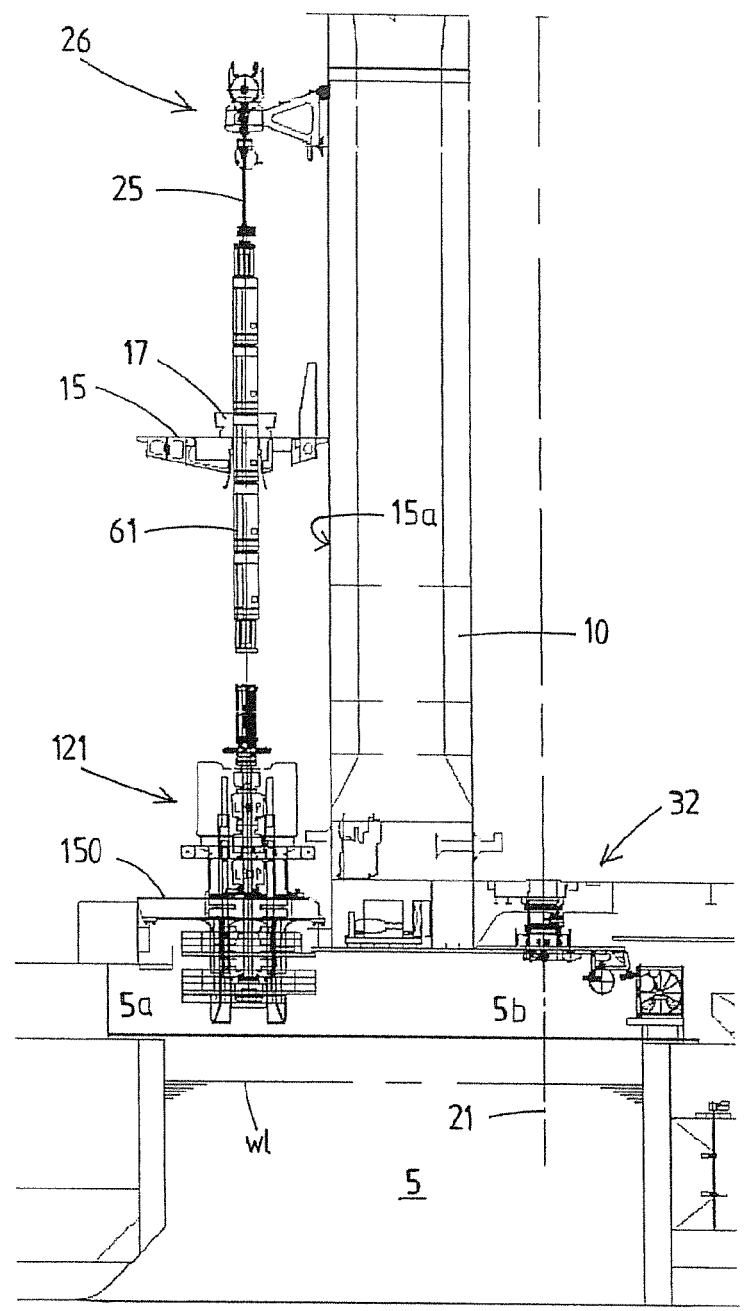
FIG. 22 shows a side view of the mast and the moonpool area, illustrating a BOP and first riser section to be connected thereto.

The vertical mobility of the working deck 15 is illustrated in FIG. 22, wherein it is shown that a BOP or module thereof can be shifted laterally from a docking station 140, 145 to the firing line 20. The deck 15 is then held so high along the mast 10, that the BOP or module moves underneath the raised deck 15. In advance of the raising of the deck a riser section 61 can be passed through the opening with device 17 in the deck 15. As is known in the art, the working deck 15 is guided along one or more vertical rails 15a mounted on the mast 10 so as to allow for vertical translatory motion of the working deck. Lifting and lowering can be done by a dedicated winch or other drive.

The vessel 1 also comprises a ballast device 170 allowing to compensate for mass of riser stands 62 stored in a riser storage hold 40 and for mass of blow out preventers stored in the BOP storage hold 100. Whilst this ballast system may include a water ballast system with one or more ballast tanks to be filled with water for balancing, it is envisaged that the ballast device here includes a solid ballast 171 which is movable in the transverse direction of the hull.

The solid ballast 171, e.g. of steel, e.g. steel plates or blocks, may have a total mass of at least 100 ton, preferably between 100 and 750 tons, e.g. a mass of between 200 and 400 tons.

The ballast 171 is formed by one or more solid masses that are mounted on and guided along rails 172 transverse to the hull of the vessel. The masses 171 may then be positioned to compensate for the weight of riser stands and/or blow-out preventer (modules) during assembly of a riser string. Three positions are shown in FIG. 20.

As shown here the riser storage hold 40 and BOP storage hold 100 are arranged aft of the moonpool 5 of the vessel and the solid ballast device 170 is arranged in the hull, here in a dedicated compartment 173, between these holds and the moonpool 5.

In an embodiment the same solid mass ballast device may be embodied to act—if desired—as active roll damping mechanism, the device further including:
  a sensor detecting the rolling motion of the hull, and
  a drive and control system operable to cause and control the movements of the solid ballast in response to the detections of the sensor to provide roll stabilization. For example a winch and cable arrangement is provided to move the ballast masses, either continuously in synchronization with sea-motion of the vessel or to a desired position to obtain a balancing moment.

Figure 24:
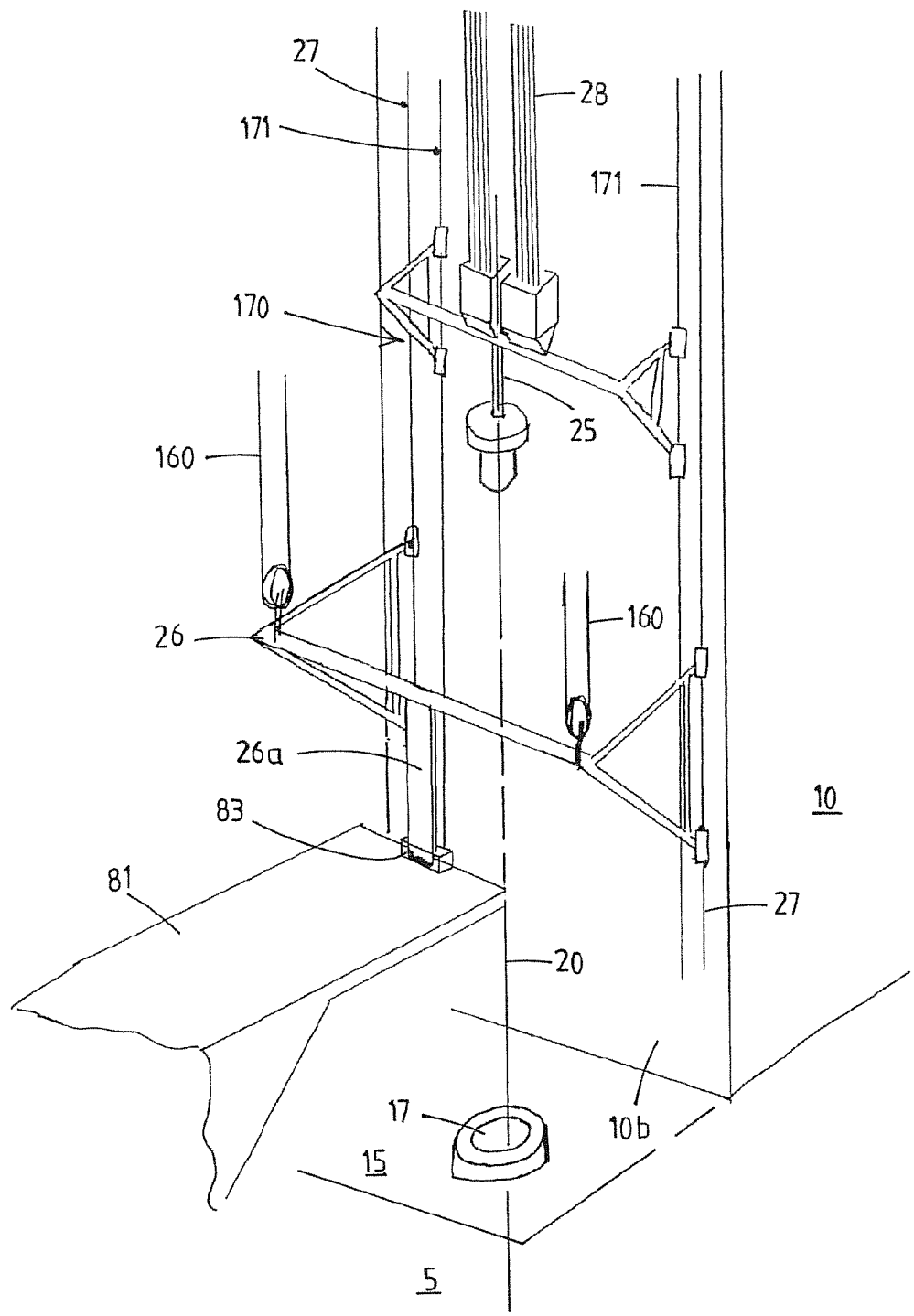
FIG. 24 illustrates schematically primarily the third aspect of the invention and shows an embodiment of the mast provided at the riser handling side thereof with a first travelling hanger device dedicated to lifting and lowering the strongback and a second travelling hanger device from which the riser lifting tool is suspended.

FIG. 24 illustrates schematically an embodiment of the mast 10 that provided at the riser handling side thereof, e.g. the rear side, with a first travelling hanger device 26 that is dedicated to lifting and lowering the strongback with frame 81 and a second travelling hanger device 170 from which the riser lifting tool 25 is suspended.

The hanger device 26 is guided on rails 27 to be movable up and down along a side of the mast 10. The frame lifting member 83 is connected to the lifting member 26a of the hanger device 26. For raising and lowering the hanger device 26 a dedicated hoisting device is provided, distinct from the riser string handling capacity hoisting device. Here hoisting cables 160 are shown from which the hanger device 26 is suspended. A dedicated winch for the cables 160 is provided, e.g. on or in the mast 10.

The hanger device 170 is suspended from cables 28 and is embodied to suspend therefrom the riser string. In practice the string may weigh well over 1000 tonnes. The hanger device 170 is movable up and down along the mast, guided by one or more vertical rails 171.

By providing independent travelling hanger devices 26 and 170 for the strongback and the riser string respectively, a versatile system is obtained. Again, as explained before, raising the strongback frame 81 by means of the hanger device 26 causes the riser stand 62 to be positioned vertically and aligned with the firing line. Then the tool 25 can be lowered to be connected to the riser stand still held by the strongback. Then the member 84 can be released, so that the riser stand becomes suspended from the tool 25. The frame 81 can now be lowered towards its transfer position, with the riser stand 62 still being held by tool 25 above the already launched part of the riser string held by device 17.

It will be appreciated that the hoisting device dedicated to the hanger 26 can now have a much smaller capacity than the riser string handling capacity hoisting device, e.g. as the combined weight of the riser stand and the strongback frame will in a practical embodiment be at most 100 tonnes.

With reference to FIGS. 25-32 now first the sixth aspect of the invention will be illustrated.

Figure 25:
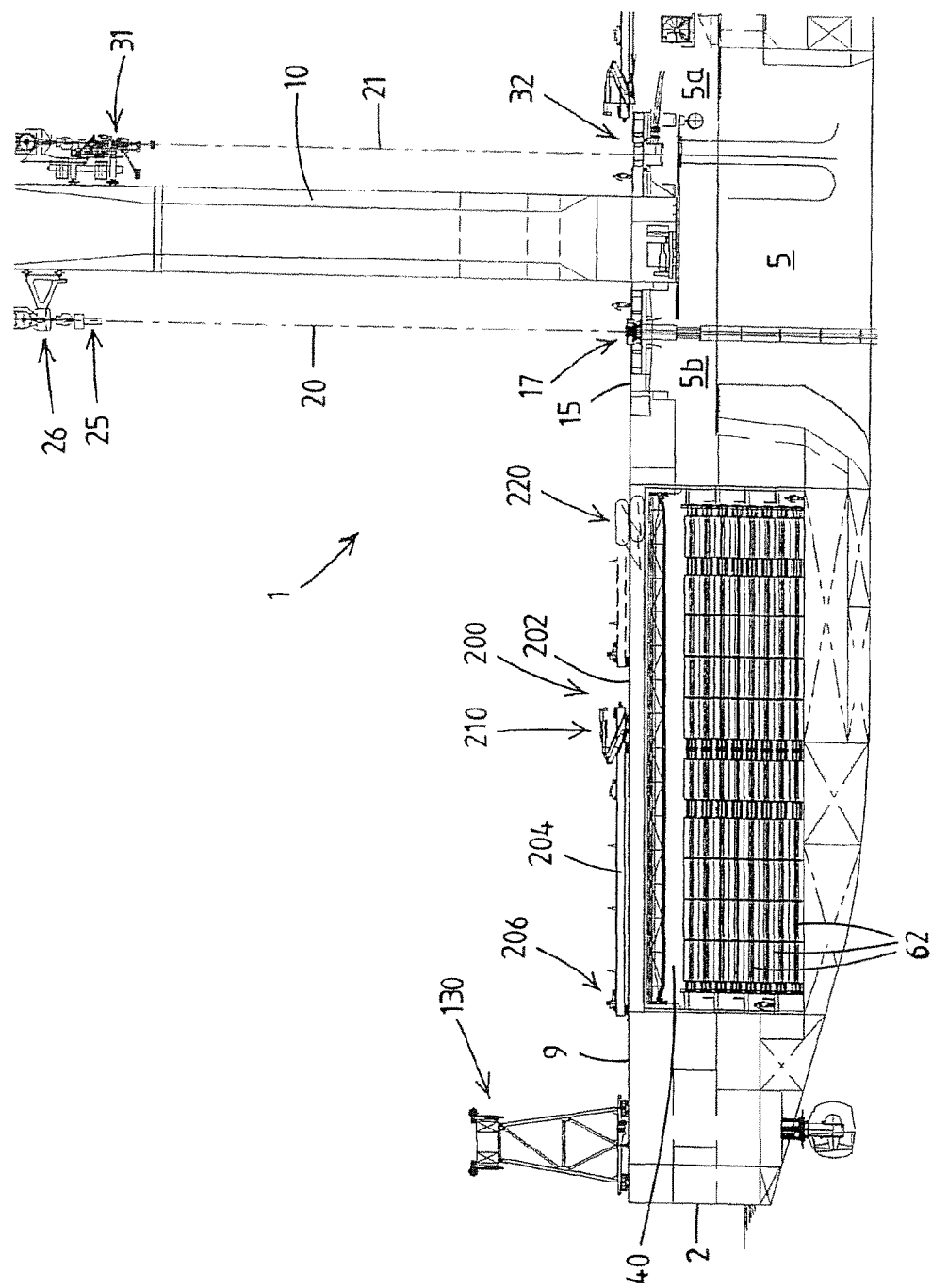
FIG. 25 shows schematically in longitudinal section a vessel according to the sixth aspect of the invention.

FIG. 25 shows a vessel 1 adapted to perform subsea wellbore related operations involving a riser string between the subsea wellbore and the vessel, e.g. drilling and/or wellbore intervention. The vessel comprises a hull 2, a riser storage 40, a moonpool 5, a tower 10, a and a riser handling system.

In the exemplary embodiment shown, the vessel hull 2 has a mono-hull type hull, with the moonpool 5 provided therein.

The riser storage hold 40 is provided within the hull of the vessel and is adapted to store therein multiple risers, e.g. individual riser sections 62a and/or pre-assembled riser stands 62. An individual riser section 62a may have a length that exceeds common riser sections, e.g. have a length of 150 ft. (45.72 m) or even more.

The tower 10 is arranged at the moonpool 5. A riser handling capacity hoisting device 26, 28 is adapted to raise and lower relative to said tower a riser string that is suspended from said riser handling capacity hoisting device in a firing line 20. The riser handling capacity hoisting device 26, 28 is provided with a riser string lifting tool 25 connectable to a riser, to enable raising and lowering of the riser.

The vessel further comprises a riser handling system having a catwalk machine 200. In the exemplary embodiment shown, the catwalk machine 200 is arranged on a deck 9 and above a roof 44 of the riser storage hold has a roof 44. The catwalk machine 200 comprises a pair of horizontal catwalk machine rails 202, an elongated catwalk machine frame 204 movable over the catwalk machine rails, and a skate 206 that is movable supported by the frame.

The catwalk machine frame 204 has a rear end and a front end, and is movable over the catwalk machine rails at least in a rearward loading position and a forward riser release position. In the rearward loading position a riser 62 in horizontal orientation can be loaded onto the catwalk machine, and in the forward riser release position a riser to be lifted is connectable to the riser string lifting tool.

The skate 206 comprises a riser end support to support thereon a rearward end of a riser 62a. The skate 206 is supported by the catwalk machine frame 204, and is movable by a drive motor along the length of the frame between a rearward skate position and a forward skate position.

According to the sixth aspect of the invention the riser handling system further comprises a riser forward section auxiliary support device 220, that is distinct from the catwalk machine 200.

The auxiliary support device 220 is arranged at a location along the catwalk machine rails 202 between the moonpool 5 and the catwalk machine frame 204, when in its rearward loading position.

The auxiliary support device 220 is movable between an operative position and a retracted position. Both positions are depicted in FIG. 25. The auxiliary support device 220 has been depicted in its operative position in full lines, and in its retracted position in dashed lines.

The riser forward section auxiliary support device 220 is adapted to, in its operative position, support a forward section of a riser 62, 62a that rest with its rear end on the skate 206 and that extends beyond the front end of the catwalk machine frame. This condition is shown in side view in FIG. 28, and in perspective view in FIG. 29.

The riser 62, 62a has been loaded in horizontal orientation onto the catwalk machine whilst the latter was in its rearward loading position. Thus, with a riser 62, 62a loaded onto the catwalk machine 200 and also supported by the riser forward section auxiliary support device 220, the catwalk machine frame is movable along said catwalk machine rails towards the auxiliary support device 220 in which advancing motion the forward riser section is supported by said auxiliary support device. In the particular embodiment shown, this is possible whilst maintaining its horizontal orientation.

The forward riser end can thus be brought near the riser string lifting tool 25 and allow for connection thereof to the forward riser end.

Figure 30:
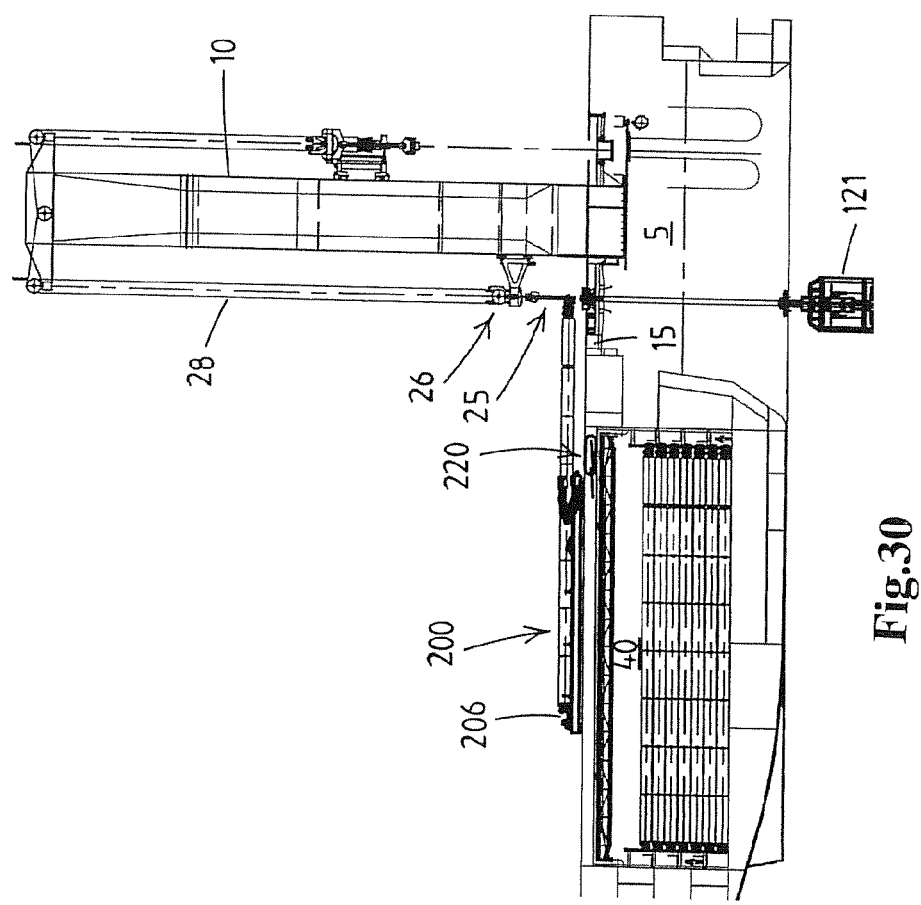
FIG. 30 illustrates a further step in the assembly process of a riser string with the vessel of FIG. 25.
Figure 31:
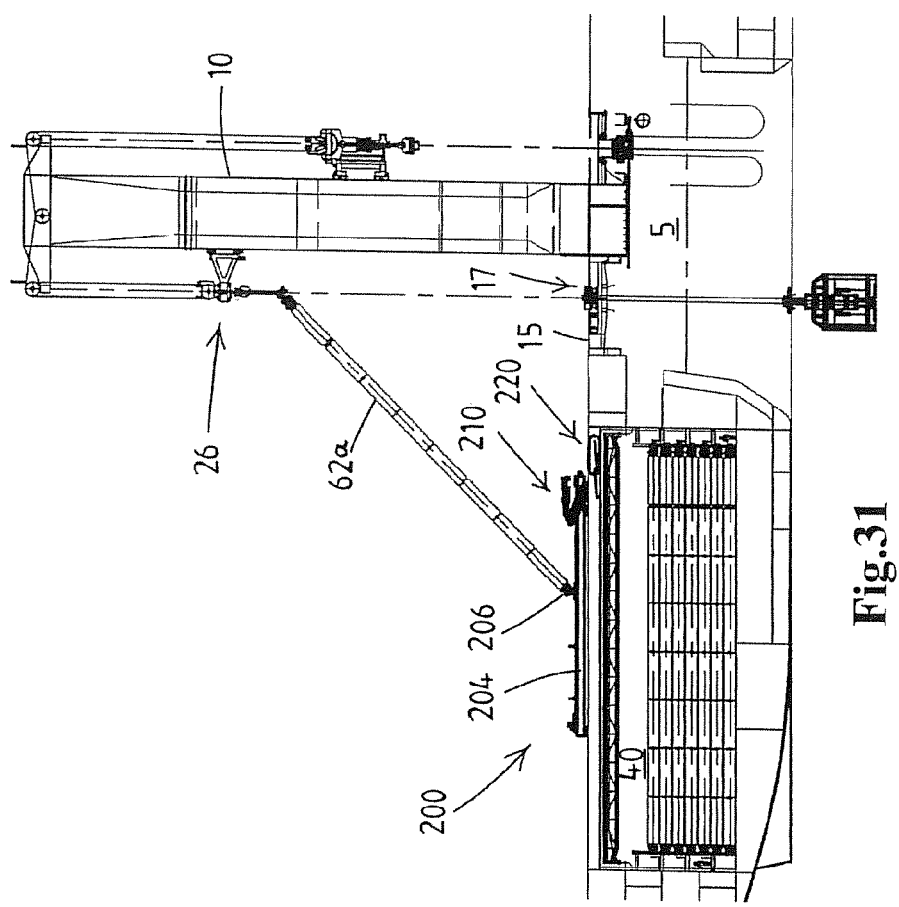
FIG. 31 illustrates a further step in the assembly process of a riser string with the vessel of FIG. 25.

The riser forward section auxiliary support device 220 can furthermore be moved into its retracted position, after connecting the forward riser end to the riser string lifting tool 25, which is shown in FIG. 30. Thus, the support device 220 disengages from the riser 62, 62a and allows the catwalk machine frame 204 to move further towards its forward position in the process of bringing the riser vertically into the firing line, wherein the forward end of the riser is lifted by the riser handling capacity hoisting device, which condition is shown in FIGS. 31 and 32.

Providing the riser forward section auxiliary support device 220 allows for the provision of a catwalk machine having a length suitable to handle 90 ft. (27.43 meters) risers on its own, and to employ this catwalk machine and the auxiliary support device 220 to handle risers 62, 62a of a length e.g. up to 180 ft., e.g. of 150 ft. Of the latter risers, the forward riser section or portion, having a length of e.g. 60 ft. or 90 ft., extends forward of the catwalk machine 200 and is—temporarily—supported by the retractable auxiliary support device 220.

If a "common length riser" of e.g. up to 90 ft. has to be handled, it is envisaged that only the catwalk machine 200 is used in its ordinary manner, with the riser forward section auxiliary support device 220 remaining in its retracted position. So the system of the invention allows for great versatility when it comes to handling different riser lengths, including lengths beyond the common maximum length of 90 ft. as seen nowadays.

It is envisaged that the measures according to the sixth aspect of the invention allow for handling of risers having a length of between 100 ft. (30.48 m) and 180 ft. (54.86 m), e.g. of 120 ft. (36.57 m) or 150 ft. (45.72 m), e.g. each riser 62 being a pre-assembled riser stand, e.g. assembled from two equal length riser sections, or a single riser section 62a of similar length.

Figure 29:
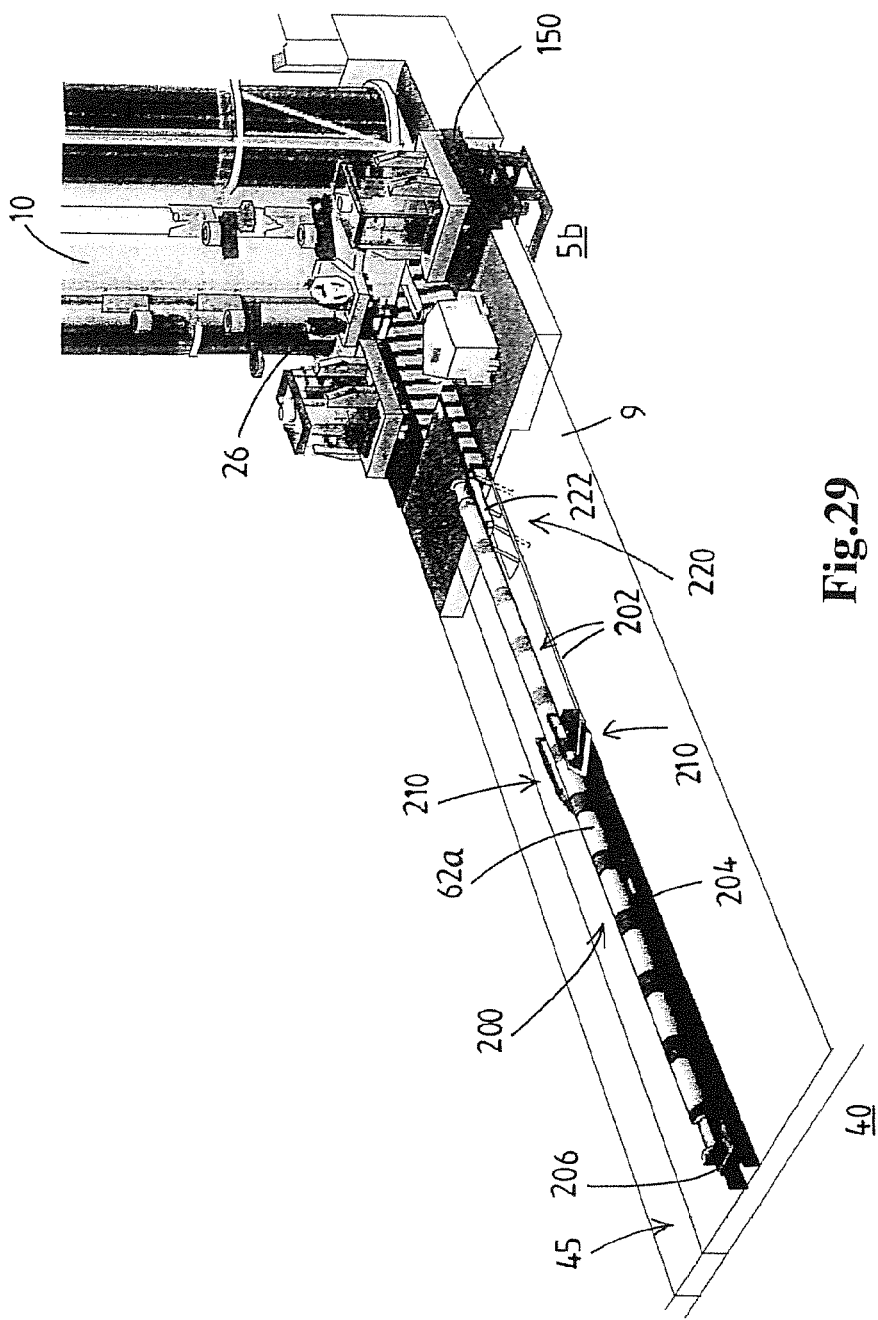
FIG. 29 illustrates the step of FIG. 28 with parts of the vessel in perspective view.

In the exemplary embodiment shown, the riser forward section auxiliary support device 220 is arranged at a location between the catwalk machine rails 202, see FIG. 29, and is movable between a raised operative position and a lowered retracted position so that the catwalk machine frame 202 can pass above the retracted auxiliary support device 220. The chassis of the exemplary embodiment shown includes pivotal parallel beams supporting the device at the front and rear end, e.g. with a hydraulic drive for the pivoting motion. As an alternative the chassis is for example built to move in a pure vertical direction, e.g. with one or more hydraulic jacks in vertical arrangement.

In the exemplary embodiment shown, the riser forward section auxiliary support device 220 furthermore comprises mobile riser guide members 222, which allow the riser—in its horizontal orientation—to slide over the auxiliary support device 220 as it is advanced forward by the forward advancing catwalk machine frame 204. In the embodiment shown, the mobile riser guide members 222 are provided in the form of motor driven tracks that are adapted to support the riser, and which are synchronized with the motion of the catwalk machine, to minimize the risk of damaging fragile buoyancy elements provided on the riser. In an alternative embodiment, the device comprises a non-driven endless belt or rollers.

Furthermore, a hatch is provided (not shown) to cover the riser forward section auxiliary support device 220 when in its retracted position below the deck 9 of the vessel.

In the preferred embodiment shown the catwalk machine 200 is provided with a tailing-in arm device 210 that is mounted at the forward end of the catwalk machine frame 202. The tailing-in arm device thus moves along with the catwalk machine, and therefore forms no obstacle near the firing line when the catwalk machine is retracted, e.g. when not in use. In an alternative the tailing-in arm device is supported on the vessel in a different manner, e.g. mobile in the tower.

Figure 26:
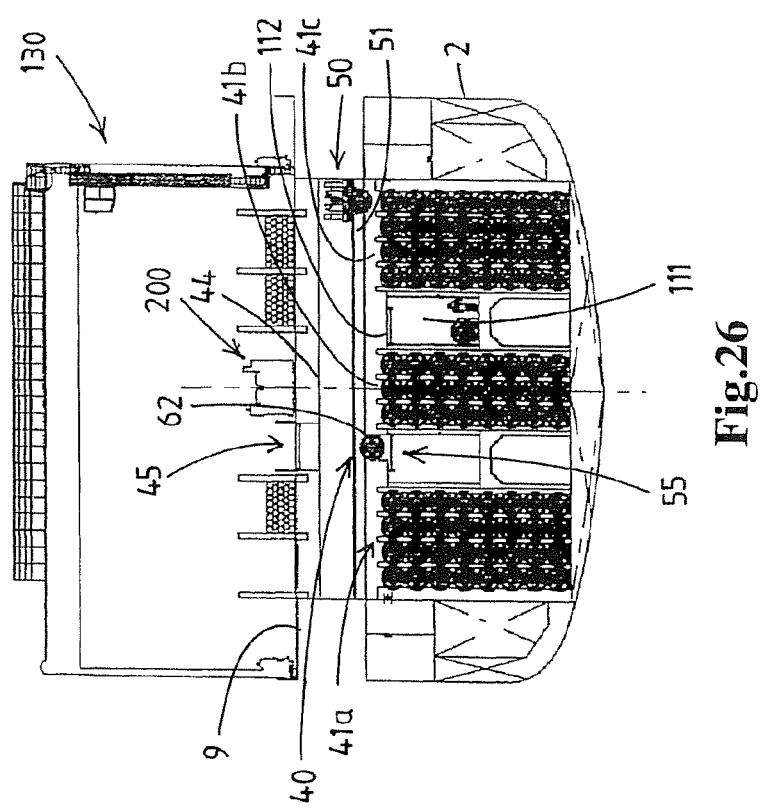
FIG. 26 shows the vessel of FIG. 25 in transverse section through the riser storage hold.
Figure 27:
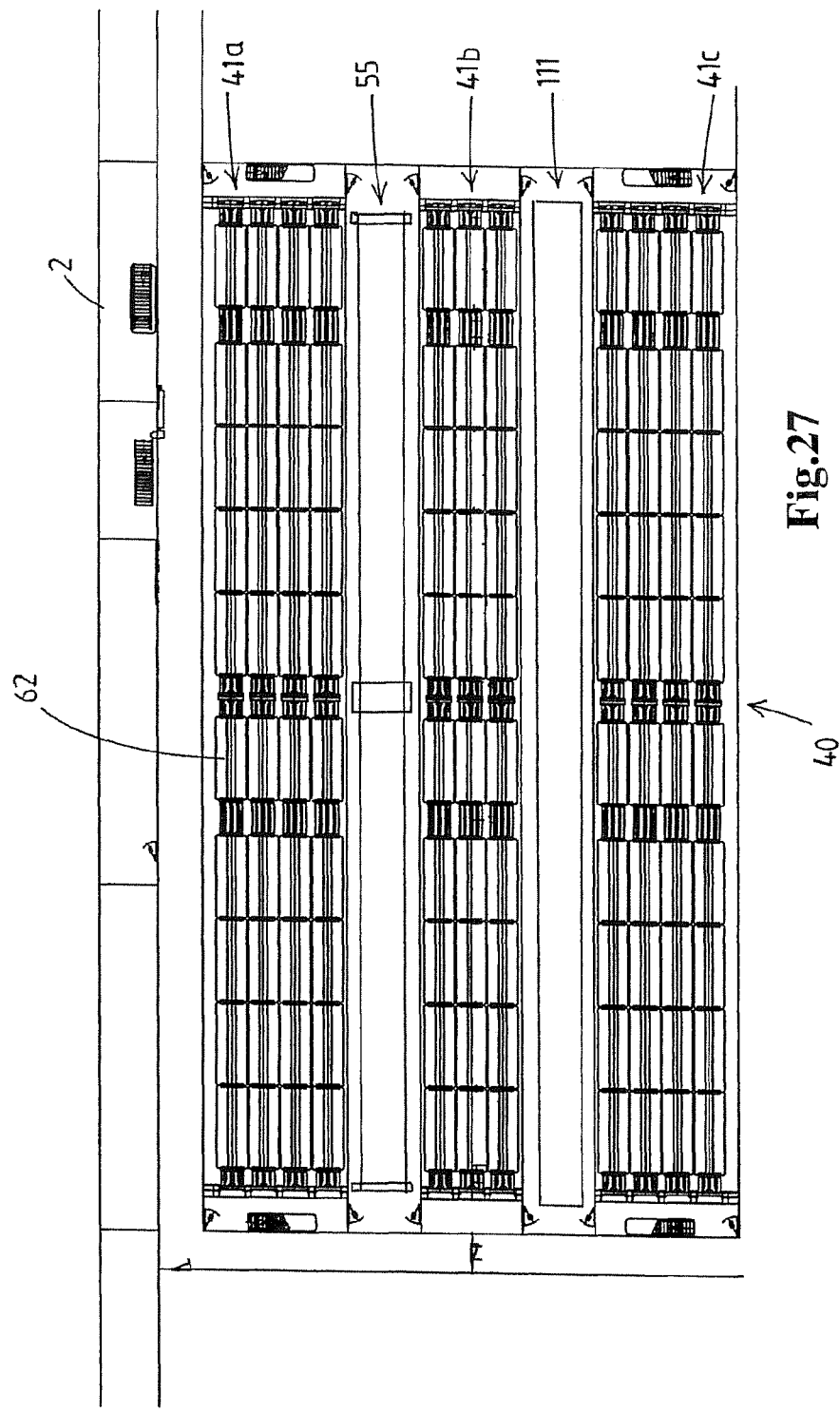
FIG. 27 shows the vessel of FIG. 26 in horizontal section through the riser storage hold, above the riser storage racks.
Figure 28:
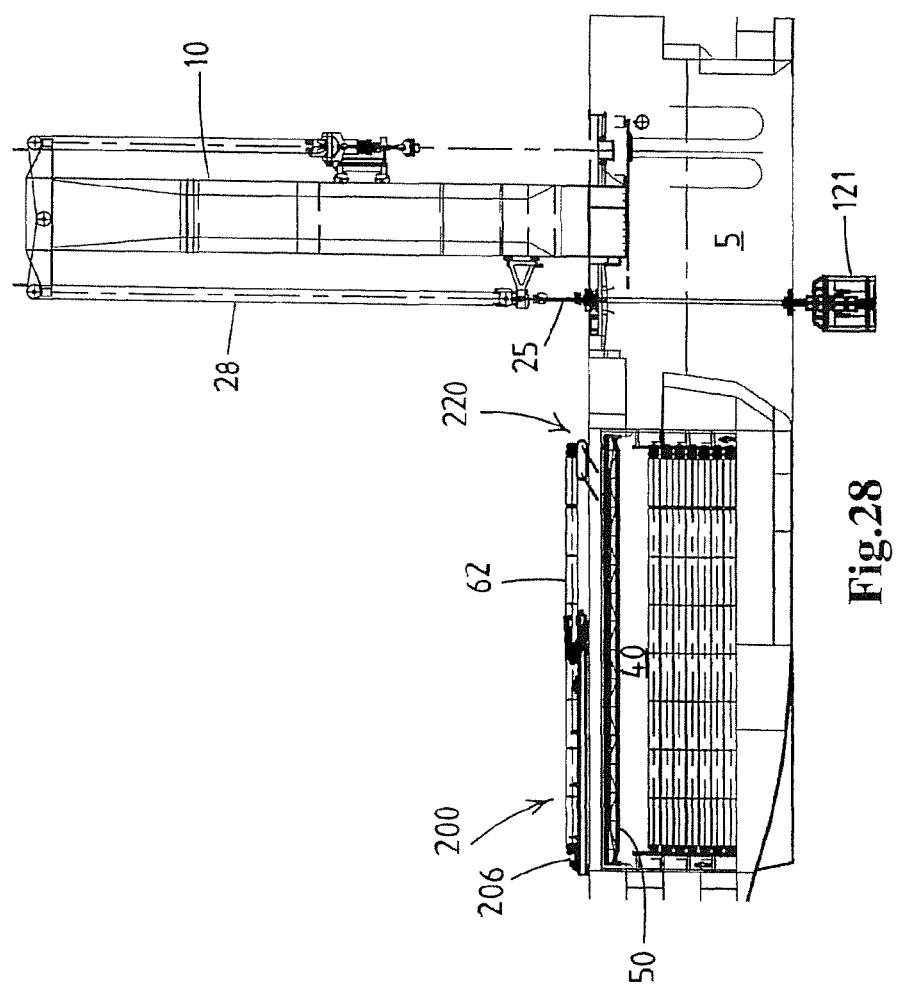
FIG. 28 illustrates a step in the assembly process of a riser string with the vessel of FIG. 25.

The vessel 1 has a riser storage hold 40 within the hull of the vessel which is adapted to store risers 62, 62a therein. FIG. 26 shows the vessel of FIG. 25 in transverse section through the riser storage hold 40. The hold has a roof 44, and the catwalk machine 200 is arranged on a deck 9 and above the roof 44.

In the exemplary embodiment shown, the riser storage hold 40 is adapted to store risers 62, 62a therein in horizontal orientation with the length of the risers parallel to the catwalk machine rails 202.

A riser stand handling crane, in the particular embodiment shown an overhead travelling beam crane 50 is provided in the hold, which riser stand handling crane can be moved along the roof 44 of the hold 40. The riser stand handling crane 50 is adapted for transverse transportation of a riser 62, 62a within the riser storage hold, to a transfer station 55 of the riser storage.

Above the transfer station 55, an elongated riser transfer opening 45 is provided between the deck 9 and the hold 40, the opening 45 having a length and a width so as to allow for transfer of a single riser in horizontal orientation via the riser transfer opening out of the riser storage hold and into the riser storage hold. The riser transfer opening is located alongside the rails 202 of the catwalk machine, which is shown in FIG. 29.

In the particular embodiment shown, the riser handling system 200,220 and the riser storage 40 are designed for risers 62, 62a having a length of between 100 ft. (30.48 m) and 180 ft. (54.86 m), e.g. of 120 ft. (36.57 m) or 150 ft. (45.72 m), e.g. each riser (62) being a pre-assembled riser stand, e.g. assembled from two equal length riser sections, or a very long single riser section 62a.

With reference to FIGS. 25-32 now the seventh aspect of the invention will be illustrated. The seventh aspect of the invention relates to a vessel adapted to perform subsea wellbore related operations involving a riser string between the subsea wellbore and the vessel, e.g. drilling and/or wellbore intervention.

The vessel has a riser storage hold 40 within the hull of the vessel with three riser storage racks 41 that are adapted to store therein multiple risers 62, 62a in horizontal orientation. Each storage rack is embodied with vertical columns between which risers are stacked in vertical stacks, wherein a riser is an individual riser section 62a or a pre-assembled riser stand 62.

The vessel is furthermore provided with a riser handling crane 50, which is adapted for removing a riser section 62a or riser stand 62 from a storage rack 41 and for placing a riser section 62a or riser stand 62 into a storage rack respectively, and for transverse transportation of a riser above the one or more storage racks.

According to the seventh aspect of the invention, the vessel is provided with a riser workshop 111, in the exemplary embodiment shown having a floor, walls and a roof 112. More in particular, in the exemplary embodiment shown, the riser storage hold 40 has a roof 44, and the vessel has a deck 9 above that roof, and the riser workshop 111 is within the riser storage hold. In the embodiment shown the storage hold 40 comprises two riser storage racks, each with multiple columns to store therein multiple stacks of risers side-by-side, and wherein the riser workshop is arranged between said two riser storage racks.

The workshop 111 is adapted to accommodate a riser 62, 62a in horizontal orientation, and provides a space, preferably an enclosure, for personnel performing work on the riser, e.g. maintenance and/or inspection of the riser.

In the exemplary embodiment shown, the riser handling crane 50 is an overhead travelling beam crane travelling above the racks within the hold, e.g. along the roof of the hold. The overhead travelling beam crane 50 is adapted to place a riser 62, 62a in the workshop 111 and remove a riser from the workshop. The workshop is therefore provided with roof 112 with a riser transfer opening therein. The opening is provided with a mobile roof cover (not shown), e.g. one or more hatches or a tarpaulin.

1. Vessel (1) adapted to perform subsea wellbore related operations involving a riser string between the subsea wellbore and the vessel, e.g. drilling and/or wellbore intervention, said vessel comprising:

a hull (2);

a riser storage adapted to store therein of multiple risers in horizontal orientation, characterized in that the riser storage (40) is adapted to store therein, or has stored therein, multiple pre-assembled riser stands (62), e.g. at least 25 riser stands, each riser stand being assembled from multiple riser sections (60,61) connected end-to-end, e.g. each riser stand consisting of two riser sections, each riser section comprising a riser pipe and optionally one or more satellite pipes on the outside of and along the riser pipe, each riser section comprising a connector fitting arrangement at each end thereof, and each riser section comprising preferably one or more buoyancy members, wherein in a riser stand the connector fitting arrangement of one riser section is connected to a connector fitting arrangement of another riser section.

2. Vessel according to clause 1, wherein the riser storage is embodied as a riser storage hold (40) within the hull of the vessel.

3. Vessel according to clause 1 or 2, wherein the riser storage comprises one or more riser storage racks (41) adapted to store therein multiple riser stands (62) in horizontal orientation, e.g. each storage rack being embodied to support a riser stand at end portions thereof as well as at an intermediate portion thereof at or near each connection between riser sections of the riser stand.

4. Vessel according to any one of clauses 1-3, wherein the riser storage (40) is adapted to store therein pre-assembled riser stands (62) each having a length of between 100 ft. (30.48 m) and 180 ft. (54.86 m), e.g. of 120 ft. (36.57 m) or 150 ft. (45.72 m).

5. Vessel according to any one of clauses 1-4, preferably at least clause 2, wherein the riser storage has a floor (42), side walls (43a, b), and a roof (44), and wherein the riser storage is provided with an elongated riser stand transfer opening (45) having a length and a width so as to allow for transfer of a single riser stand (62) in horizontal orientation via said riser stand transfer opening out of and into the riser storage.

6. Vessel according to clause 5, wherein a riser stand handling crane (50) is provided, arranged within the riser storage hold (40) in an embodiment according to clause 2, said riser stand handling crane (50) being adapted to lift and lower a riser stand (62), e.g. for removing a riser stand from a storage rack (41) and for placing a riser stand into a storage rack respectively, and said crane (50) being adapted for transverse transportation of a riser stand, e.g. within said riser storage hold, to a transfer station (55) of the riser storage, which transfer station is provided with one or more riser supports (56; 56a) adapted to support thereon the riser stand, preferably in a position aligned with the riser stand transfer opening (45).

7. Vessel according to clause 5 and 6, wherein the riser stand transfer opening (45) is above the riser supports, e.g. vertically above, and wherein the transfer station (55) comprises a transfer elevator (57; 55a) that is adapted to raise and lower a riser stand in horizontal orientation thereof so as to pass the riser stand (62) through the riser stand transfer opening.

8. Vessel according to any one of clauses 1-7, wherein the hull of the vessel has a moonpool (5),
wherein a tower (10) is arranged at said moonpool,
wherein a riser string hanger (17) is provided that is adapted to suspended therefrom a riser string in a firing line (20),
wherein a hoisting device (26, 28, 29, 29a; 26, 160) is provided, said hoisting device comprising a hanger device (26) that is movable up and down relative to the tower (10), preferably said hoisting device comprising at least one winch (29a) and at least one cable (28; 160), wherein the hanger device (26) of the hoisting device is suspended from said at least one cable (28; 160),
wherein—if present—the riser stand transfer opening (45) is orientation with its length towards the moonpool (5), preferably along a central axis of the vessel if the vessel (1) is a monohull vessel,
wherein the vessel is further provided with a riser stand strongback assembly (80) comprising:
  a strongback having an elongated strongback frame (81; 81a, 81b) provided with one or more retaining members (84) adapted to retain a riser stand (62) relative to the strongback frame, wherein the strongback frame has a leading end and a trailing end,
wherein the strongback frame (81) is provided with a lifting member (83) at the leading end thereof, and wherein the hanger device (26) of the hoisting device is provided with a lifting member (26a) adapted to be connected to the lifting member (83) at the leading end of the strongback frame (81), wherein the strongback frame (81)—if its lifting member (83) is connected to the lifting member (26a) of the hanger device (26)—is movable between a substantially horizontal transfer position and a vertical firing line position by operation of the hoisting device,
wherein in said transfer position of the strongback frame (81), the strongback frame is positioned so as to bring a riser stand (62) in horizontal orientation thereof from the riser storage (40) to the strongback frame (81) and so as to release the riser stand from the strongback frame and return the riser stand in horizontal orientation thereof into the riser storage, e.g. aligned with the riser stand transfer opening (45) when present,
wherein in said vertical firing line position of the strongback frame, the riser stand (62) retained by the strongback is aligned with the firing line (20) so as to allow for interconnection of said riser stand to a riser string suspended from the riser string hanger (17) in said firing line (20).

9. Vessel according to clause 8, wherein the hanger device (26) is embodied as a travelling hanger device (26) that is movable up and down along one or more vertical rails (27) mounted on the tower (10), e.g. a wheeled travelling hanger device having wheels engaging said one or more vertical rails.

10. Vessel according to clause 8 or 9, wherein the hoisting device (26, 28, 29, 29a) is a riser string handling capacity hoisting device, and wherein the hanger device (26) is also provided with a riser string lifting tool (25) that is adapted to connect to an end of a riser section (61), preferably of a riser stand (62) whilst retained by the strongback assembly (80), and is embodied to support the weight of a riser string in the firing line (20) when released by the riser string hanger (17).

11. Vessel according to any of clauses 8-10, wherein the strongback assembly (80) further comprises:
  one or more rails, e.g. substantially horizontal rails (85), e.g. extending along the riser stand transfer opening (45) if present,
  a travelling carriage (89), e.g. a wheeled travelling carriage, that travels over said one or more rails (85) and that supports the strongback frame, preferably at or near the trailing end thereof, possibly a carriage drive motor being provided to drive the travelling carriage along the one or more rails,
so that upon raising the hanger device (26) of the hoisting device, the leading end of the strongback frame (81) is lifted whilst the strongback frame (81) remains supported by the travelling carriage (89) which then travels over said one or more rails (85) towards the tower, until the strongback frame and riser stand (62) retained thereby are upended into the vertical firing line position with the riser stand aligned with the firing line (20).

12. Vessel according to clause 10, wherein the lifting member (26a) of the hanger device (26) and the lifting member (83) of the strongback frame (81) are embodied to remain connected to one another whilst then allowing for the interconnection and disconnection of the riser string lifting tool (25) and an end of a riser section belonging to a riser stand (62) retained by the strongback.

13. Vessel according to at least clause 8, wherein the strongback frame (81) defines a receiving cavity for the riser stand (62) which cavity is open at a bottom side thereof when said transfer position to allow for passage of the riser stand into and out of said receiving cavity.

14. Vessel according to clause 13, wherein in said transfer position the strongback frame (81) is positioned above a riser stand transfer opening (45), preferably of a riser storage hold (40) in the hull of the vessel.

15. Vessel according to clause 14, wherein in said transfer position the strongback frame (81) is offset from the riser stand transfer opening (45) towards the moonpool (5) when seen in longitudinal direction of said riser stand transfer opening (45), and wherein a transfer elevator (57) is provided that is adapted to raise and lower a riser stand (62) in horizontal orientation thereof so as to pass the riser stand through the riser stand transfer opening into the receiving cavity with a portion of the riser stand (62) extending rearward beyond the trailing end of the strongback frame (81), and wherein a riser stand linear displacement device (87,88) is provided, e.g. as part of the strongback (80) or integrated with the transfer elevator or with a riser transfer shuttle cart (55*b*), said riser stand linear displacement device allowing to displace the riser stand (62) in longitudinal direction whilst in the receiving cavity of the strongback, e.g. so as to compensate the offset of the strongback frame in the transfer position thereof.

16. Vessel according to at least clause 8, wherein the strongback frame (81), preferably provided with the travelling carriage (89) of clause 11 and in combination with said travelling carriage, is dimensioned so as to be movable into a riser stand transfer opening (45) and to remain therein in a docking position.

17. Vessel according to clause 16, wherein the riser stand transfer opening (45) is provided in a deck (9) of the vessel, and wherein the strongback frame (81), preferably provided with the travelling carriage (89) of clause 11 and in combination with said travelling carriage, is dimensioned so as to be lowered into the riser stand transfer opening (45) and to remain therein in a docking position.

18. Vessel according to clause 17, wherein the strongback frame (81) comprises a topside and at least one sidewall, defining a receiving cavity for the riser stand, and wherein the topside is embodied as a deck portion that is flush with an adjacent deck area (9) when the strongback frame is lowered into the riser stand transfer opening (45) into its the docking position.

19. Vessel according to at least clauses 7 and 17, wherein the transfer elevator (57) is adapted to engage on the strongback frame (81), preferably also on the travelling carriage (89) of clause 11 when present, and adapted to raise and lower said strongback frame and possible travelling carriage through the riser stand transfer opening (45) between the transfer position and the docking position.

20. Vessel according to at least clause 11, wherein two parallel rails (85) for the travelling carriage are mounted along opposite longitudinal sides of a riser stand transfer opening (45).

21. Vessel according to at least clause 7, wherein the strongback frame is embodied to adjust the length thereof, e.g. assembled from modules interconnected in series or having a telescopic strongback frame, e.g. allowing to adjust the length thereof to handle a single riser section.

22. Vessel according to at least clause 10, wherein the riser string lifting tool comprises a riser section end engaging portion, that is connected via a hinge to a hanger device engaging portion of the lifting tool.

23. Vessel according to at least clauses 2 and 7, wherein the riser storage hold (40) is aft of the moonpool (5).

24. Vessel according to any one of clauses 1-23, wherein the vessel (1) is a monohull vessel, and wherein the riser storage is embodied to store the pre-assembled riser stands (62) therein parallel to a longitudinal axis of the vessel.

25. Vessel according to any one of clauses 1-24, wherein the vessel (1) is a monohull vessel, and wherein—in transverse cross-section of the hull of the vessel—a riser storage hold (40), preferably according to clause 2, is arranged in majority to one side of the vessel, with a blow-out preventer BOP storage hold (100) on the other side of the vessel adjacent the riser storage hold (40) and with a separating longitudinal bulkhead (43*b*) of the hull in between forming a sidewall of the riser storage hold.

26. Vessel according to any one of clauses 1-25, wherein the vessel (1) is provided with a blow-out preventer BOP storage hold (100) which has a floor (101) and a roof (102) that includes one or more hatches (103,104), wherein the hold (100) has a height between said floor and the roof of at least 15 meters, preferably between 15 and 25 meters.

27. Vessel according to clause 25 or 26, wherein the BOP storage hold (100) has on the floor thereof a skid rail system with one or more skid rails (110), and one or more skiddable blow-out preventer supports (115) are provided, each adapted to support thereon a blow-out preventer or module (120,121,122,123,124) and skiddable over said skid rails system whilst supporting a blow-out preventer or blow-out preventer module, e.g. said skid rail system comprising rails extending in longitudinal direction of the vessel.

28. Vessel according to any one of clauses 25-27, wherein the vessel (1) has a moonpool, e.g. a monohull vessel, and wherein the vessel is provided with a gantry crane (130) which travels over gantry crane rails (131,132), e.g. in longitudinal direction of the vessel, at least into a position above the moonpool (5*b*) and into a position above the BOP storage hold (100), so as to allow for transfer of a blow-out preventer or blow-out preventer module between said storage hold (100) and the moonpool.

29. Vessel according to any one of clauses 25-28, wherein the vessel (1) has a moonpool, e.g. a monohull vessel, and wherein a first blow our preventer docking station (140) is present at a first, e.g. port, side of moonpool and second blow out preventer docking station (145) is present at an opposed second, e.g. starboard, side of moonpool, and wherein the vessel has a gantry crane (130) that is adapted to transfer a blow-out preventer or blow-out preventer module between the BOP storage hold (100) and each of said BOP docking stations (140,145) as well as between said BOP docking stations.

30. Vessel according to clause 29, wherein at the moonpool a BOP support cart (150) is provided that is adapted to support a blow-out preventer and to transfer said blow-out preventer between a docking station (140,145) and a firing line (20) that is located centrally between said docking stations, preferably said support cart being supported on rails (151,152) extending between the docking positions so that the support cart can be brought in each of said docking stations.

31. Vessel according to any one of clauses 1-30, wherein the vessel (1) has a moonpool, and wherein the vessel is provided with a riser string support cart (35) that is displaceable within the moonpool, e.g. between two firing lines (20, 21), and wherein, preferably, in a vessel according to clause 30, the riser support cart (35) is embodied to support a blow-out preventer or blow-out preventer module thereon.

32. Vessel according to at least clause 7, wherein the vessel comprises a working deck (15), e.g. a mobile working deck (15), extending above the moonpool, said working deck being provided with a riser string hanger (17) adapted to support a riser string there from in the firing line 20), e.g. the working deck being guided along one or more vertical rails (15a) mounted on the tower so as to allow for vertical translatory motion of the working deck.

33. Vessel according to any one of clauses 1-32, wherein the vessel comprises a ballast device (170), e.g. allowing to compensate for mass of riser stands (62) stored in a riser storage (40) and/or for mass of blow out preventers stored in a BOP storage hold (100) when present.

34. Vessel (1) adapted to perform subsea wellbore related operations involving a riser string between the subsea wellbore and the vessel, e.g. drilling and/or wellbore intervention, said vessel comprising:
a hull (2);
a riser storage (40) adapted to store therein multiple risers sections and/or pre-assembled riser stands (62),
a moonpool (5) in said hull,
a tower (10) arranged at said moonpool,
wherein a riser handling capacity hoisting device (26,28,29, 29a; 170,28,29,29a) is provided having a riser hanger device (26; 170) and adapted to raise and lower relative to said tower a riser string that is suspended from said riser hanger device in a firing line (20),
characterized in that
the vessel has a BOP storage hold (100), preferably within said hull (2), said BOP storage hold being adapted to store therein one or more blow-out preventers (120,121,122,123, 124), which BOP storage hold has a floor (101) and a roof (102) that includes one or more hatches (103,104), wherein the BOP storage old (100) has a height between said floor and the roof of at least 15 meters, preferably between 15 and 25 meters,
and in that the vessel is provided with a crane, e.g. a gantry crane (130) which travels over gantry crane rails (131,132), said crane at least being adapted to raise and lower a blow-out preventer or blow-out preventer module out of and into the BOP storage hold.

35. Vessel according to clause 34, wherein the crane (130) is embodied to move a blow-out preventer or blow-out preventer module at least between a position above the moonpool (5b) and a position above the BOP storage hold (100), so as to allow for transfer of a blow-out preventer between said BOP storage hold and the moonpool.

36. Vessel according to clause 34 or 35, wherein the BOP storage hold (100) has on the floor thereof a skid rail system with one or more skid rails (110), and one or more skiddable blow-out preventer supports (115) are provided, each adapted to support thereon a blow-out preventer and skiddable over said skid rails system whilst supporting said blow-out preventer, e.g. said skid rail system comprising rails extending in longitudinal direction of the vessel.

37. Vessel according to at least clause 35, wherein a first blow our preventer docking station (140) is present at a first, e.g. port, side of moonpool and second blow out preventer docking station (145) is present at an opposed second, e.g. starboard, side of moonpool, and
wherein the crane (130) that is adapted to transfer a blow-out preventer or blow-out preventer module between the BOP storage hold (100) and each of said BOP docking stations (140,145) as well as between said BOP docking stations.

38. Vessel according to any of clauses 34-37, wherein at the moonpool a BOP support cart (150) is provided that is adapted to support a blow-out preventer and to transfer said blow-out preventer between a docking station (140,145) and a firing line (20) that is located centrally between said docking stations, preferably said BOP support cart (150) being supported on rails (151,152) extending between the docking stations so that the support cart can be brought in each of said docking positions.

39. Vessel according to any one of clauses 34-38, wherein the vessel is provided with a riser string support cart (35) that is displaceable within the moonpool (5), e.g. between two firing lines (20,21), and wherein, preferably, the riser support cart is embodied to support a blow-out preventer or blow-out preventer module thereon.

40. Vessel according to clause 39, wherein the crane (130) is adapted to lower and raise a blow-out preventer or blow-out preventer module between a position thereof supported on the riser string support cart and a raised position.

41. Vessel according to any one of clauses 34-40, wherein the vessel is a monohull vessel, and wherein—in transverse cross-section of the hull of the vessel—a riser storage hold (40), preferably according to clause 2, is arranged in majority to one side of the vessel, with the BOP storage hold (100) on the other side of the vessel adjacent the riser storage hold and with a separating longitudinal bulkhead of the hull in between forming a sidewall of the riser storage hold.

42. Vessel (1) adapted to perform subsea wellbore related operations involving a riser string between the subsea wellbore and the vessel, e.g. drilling and/or wellbore intervention, said vessel comprising:
a hull (2);
a riser storage (40) adapted to store therein multiple risers sections and/or pre-assembled riser stands (62),
a moonpool (5) in said hull,
a tower (10) arranged at said moonpool,
wherein a riser handling capacity hoisting device (170,28, 29,29a) is provided having a riser hanger device (170) and adapted to raise and lower relative to said tower a riser string that is suspended from said riser hanger device in a firing line (20),
wherein a strongback hoisting device (26, 28, 29, 29a; 26, 160) is provided, said hoisting device comprising a strongback hanger device (26) that is movable up and down relative to the tower (10) and that is distinct from the riser hanger device (170),
preferably said strongback hoisting device comprising at least one winch and at least one cable (160), wherein the strongback hanger device (26) is suspended from said at least one cable (160),
wherein the vessel is further provided with a riser strongback assembly (80) comprising:
a strongback having an elongated strongback frame (81; 81a, 81b) provided with one or more retaining members (84) adapted to retain a riser section (62a) or a riser stand (62) relative to the strongback frame, wherein the strongback frame has a leading end and a trailing end,
wherein the strongback frame (81) is provided with a lifting member (83) at the leading end thereof, and wherein the strongback hanger device (26) is provided with a lifting member (26a) adapted to be connected to the lifting member (83) at the leading end of the strongback frame (81),
wherein the strongback frame (81)—if its lifting member (83) is connected to the lifting member (26a) of the hanger device (26)—is movable between a substantially horizontal transfer position and a vertical firing line position by operation of the strongback hoisting device,
wherein in said transfer position of the strongback frame (81), the strongback frame is positioned so as to bring a riser section or riser stand (62) in horizontal orientation thereof from the riser storage (40) to the strongback frame (81) and so as to release the riser section or riser stand from the strongback frame and return the riser stand in horizontal orientation thereof into the riser storage, e.g. aligned with the riser stand transfer opening (45) when present, wherein in said vertical firing line position of the strongback frame, the riser section or riser stand (62) retained by the strongback is aligned with the firing line (20) so as to allow for interconnection of said riser section or riser stand to a riser string suspended from the riser string hanger (17) in said firing line (20).

43. Vessel according to clause 42, wherein the strongback hanger device (26) is embodied as a travelling hanger device (26) that is movable up and down along one or more vertical rails (27) mounted on the tower (10), e.g. a wheeled travelling hanger device having wheels engaging said one or more vertical rails.

44. Vessel (1) adapted to perform subsea wellbore related operations involving a riser string between the subsea wellbore and the vessel, e.g. drilling and/or wellbore intervention, said vessel comprising:

a hull (2);
a riser storage adapted to store therein of multiple riser sections or pre-assembled riser stand in horizontal orientation, wherein the riser storage is embodied as a riser storage hold (40) within the hull of the vessel,
wherein the riser storage hold has a floor (42), side walls (43a, b), and a roof (44), e.g. said roof forming a deck of the vessel, and wherein the roof of the riser storage hold is provided with an elongated riser transfer opening (45) having a length and a width so as to allow for transfer of a single riser section or a single riser stand (62) in horizontal orientation via said riser transfer opening out of and into the riser storage hold,
wherein the hull of the vessel has a moonpool (5),
wherein a tower (10) is arranged at said moonpool,
wherein a riser string hanger (17) is provided that is adapted to suspended therefrom a riser string in a firing line (20),
wherein a hoisting device (26, 28, 29, 29a; 26, 160) is provided, said hoisting device comprising a hanger device (26) that is movable up and down relative to the tower (10),
wherein the riser transfer opening (45) is orientation with its length towards the moonpool (5), preferably along a central axis of the vessel if the vessel (1) is a monohull vessel,
wherein the vessel is further provided with a riser strongback assembly (80) comprising:

a strongback having an elongated strongback frame (81; 81a, 81b) provided with one or more retaining members (84) adapted to retain a riser section (62a) or riser stand (62) relative to the strongback frame, wherein the strongback frame has a leading end and a trailing end, wherein the strongback frame (81) is provided with a lifting member (83) at the leading end thereof, and wherein the hanger device (26) of the hoisting device is provided with a lifting member (26a) adapted to be connected to the lifting member (83) at the leading end of the strongback frame (81),
wherein the strongback frame (81)—if its lifting member (83) is connected to the lifting member (26a) of the hanger device (26)—is movable between a substantially horizontal transfer position and a vertical firing line position by operation of the hoisting device,
wherein in said transfer position of the strongback frame (81), the strongback frame is positioned above the riser transfer opening in the roof so as to bring a riser section or a riser stand (62) in horizontal orientation thereof from the riser storage hold (40) to the strongback frame (81) and so as to release the riser section or riser stand from the strongback frame and return the riser section or riser stand in horizontal orientation thereof into the riser storage hold, wherein in said vertical firing line position of the strongback frame, the riser section or riser stand (62) retained by the strongback is aligned with the firing line (20) so as to allow for interconnection of said riser stand to a riser string suspended from the riser string hanger (17) in said firing line (20).

45. Vessel (1) adapted to perform subsea wellbore related operations involving a riser string between the subsea wellbore and the vessel, e.g. drilling and/or wellbore intervention, said vessel comprising:

a hull (2); e.g. a mono-hull type hull,
a riser storage (40) adapted to store therein multiple risers sections (62a) and/or pre-assembled riser stands (62),
a moonpool (5) in said hull,
a tower (10) arranged at said moonpool,
a deck extending adjacent the moonpool, e.g. aft of the moonpool, wherein a riser handling capacity hoisting device (26,28,29, 29a; 170,28,29,29a) is provided having a riser hanger device (26; 170) and adapted to raise and lower relative to said tower a riser string that is suspended from said riser hanger device in a firing line (20), a mobile working deck (15) arranged in operative position above at least a portion of the moonpool, e.g. liftable to such a height that a blow-out preventer can be brought and held underneath the working deck in raised position thereof at an elevated position relative to the tower or slidable sideways to uncover the moonpool, a riser string assembly hanger (17) that is adapted to suspended therefrom a riser string in a firing line into the sea during the riser assembly and disassembly process, preferably said riser string hanger being mounted on the working deck (15), wherein the vessel has a BOP storage hold (100) within the hull (2) below said deck, said BOP storage hold being adapted to store therein one or more blow-out preventers (120,121,122,123,124), which BOP storage hold has a floor (101) and a roof (102), preferably forming said deck, that includes one or more hatches (103,104), wherein the BOP storage hold (100) has a height between said floor and the roof of at least 15 meters, preferably between 15 and 25 meters, and wherein the vessel is provided with a BOP handling capacity crane, e.g. a gantry crane (130) which travels over gantry crane rails (131,132), said crane at least being adapted to raise and lower a blow-out preventer or blow-out preventer module out of and into the BOP storage hold, preferably the crane being adapted to transport said BOP or BOP module to a position above the moonpool, e.g. to a position underneath a lifted mobile working deck (15) when present.

46. A method for performing one or more subsea wellbore related operations, e.g. riser string assembly, subsea drilling, well intervention, etc., wherein in use is made of a vessel according to one or more of the preceding clauses.

47. Vessel (1) adapted to perform subsea wellbore related operations involving a riser string between the subsea wellbore and the vessel, e.g. drilling and/or wellbore intervention, said vessel comprising:

a hull (2); e.g. a mono-hull type hull,
a riser storage (40) adapted to store therein multiple risers, e.g. individual riser sections (62a) and/or pre-assembled riser stands (62),
a moonpool (5) in said hull, a tower (10) arranged at said moonpool, wherein a riser handling capacity hoisting device (26,28) is provided having a riser string lifting tool (25) connectable to a riser, which riser handling capacity hoisting device is adapted to raise and lower relative to said tower a riser string that is suspended from said riser handling capacity hoisting device in a firing line (20), wherein the vessel further comprises a riser handling system, said riser handling system comprising a catwalk machine (200) which comprises:

a pair of horizontal catwalk machine rails (202), an elongated catwalk machine frame (204) having a rear end, a front end, wherein the frame is movable over the catwalk machine rails at least in a rearward loading position and a forward riser release position, wherein—in the rearward loading position—a riser (62) in horizontal orientation can be loaded onto the catwalk machine, and wherein—in the forward riser release position—a riser to be lifted is connectable to the riser string lifting tool, a skate (206) which is supported by the frame and is movable by a drive motor along the length of the frame between a rearward skate position and a forward skate position, wherein the skate comprises a riser end support to support thereon a rearward end of a riser, characterized in that the riser handling system further comprises a riser forward section auxiliary support device (220), that is distinct from the catwalk machine (200), which riser forward section auxiliary support device (220) is arranged at a location along the catwalk machine rails (202) between the moonpool (5) and the catwalk machine frame (204), when in its rearward loading position, which riser forward section auxiliary support device (220) is movable between an operative position and a retracted position, which riser forward section auxiliary support device (220) is adapted to support—in the operative position thereof—a forward section of a riser (62, 62a) that rest with its rear end on the skate (206) and that extends beyond the front end of the catwalk machine frame when loaded in horizontal orientation onto the catwalk machine whilst in the rearward loading position thereof, so that—with a riser (62, 62a) loaded onto the catwalk machine (200) and also supported by the riser forward section auxiliary support device—the catwalk machine frame is movable along said catwalk machine rails towards the auxiliary support device (220) in order to bring the forward riser end, preferably whilst maintaining its horizontal orientation, near the riser string lifting tool (25) and allow for connection thereof to the forward riser end, in which advancing motion the forward riser section is supported by said auxiliary support device, and so that—after connecting the forward riser end to the riser string lifting tool (25)—the riser forward section auxiliary support device (220) is movable to the retracted position thereof thereby disengaging from the riser (62, 62a) and allowing the catwalk machine frame (204) to move further towards its forward position in the process of bringing the riser vertically into the firing line wherein the forward end of the riser is lifted by the riser handling capacity hoisting device.

48. Vessel according to clause 47, wherein the riser forward section auxiliary support device (220) is arranged at a location between the catwalk machine rails (202) and is movable between a raised operative position and a lowered retracted position so that the catwalk machine frame (202) can pass above the retracted auxiliary support device (220).

49. Vessel according to clause 47 or 48, wherein the riser forward section auxiliary support device (220) comprises one or more mobile riser guide members (222) allowing the riser—in its horizontal orientation—to slide over the auxiliary support device (220) as it is advanced forward by the forward advancing catwalk machine frame (204).

50. Vessel according to any one of the clauses 47-49, wherein the riser forward section auxiliary support device comprises one or more endless tracks (222) that are adapted to support the riser thereon, e.g. an endless belt.

51. Vessel according to any one of the clauses 47-50, wherein a hatch is provided to cover the retracted riser forward section auxiliary support device, e.g. wherein the retracted position is below a deck of the vessel, 52. Vessel according to any one of the clauses 47-51, wherein the catwalk machine is provided with a tailing-in arm device (210) that is mounted at the forward end of the catwalk machine frame (204).

53. Vessel according to any one of the clauses 47-52, wherein the vessel has a riser storage hold (40) within the hull of the vessel which is adapted to store risers (62, 62a) therein, which hold has a roof (44), and wherein the catwalk machine (200) is arranged on a deck and above said roof, wherein the riser storage hold is adapted to store riser therein in horizontal orientation with the length of the risers parallel to the catwalk machine rails, wherein a riser stand handling crane, e.g. as an overhead travelling beam crane (50) moving along the roof of the hold, is provided in said hold and is adapted for transverse transportation of a riser within the riser storage hold, to a transfer station (55) of the riser storage, wherein, above the transfer station (55), an elongated riser transfer opening (45) is provided between the deck (9) and the hold (40), the opening (45) having a length and a width so as to allow for transfer of a single riser in horizontal orientation via the riser transfer opening out of and into the riser storage hold, wherein the riser transfer opening is located alongside the rails (202) of the catwalk machine.

54. Vessel according to clause 53, wherein the riser handling system (200,220) and the riser storage (40) are designed for risers (62, 62a) having a length of between 100 ft. (30.48 m) and 180 ft. (54.86 m), e.g. of 120 ft. (36.57 m) or 150 ft. (45.72 m), e.g. each riser (62) being a pre-assembled riser stand, e.g. assembled from two equal length riser sections.

55. A method for assembly of a riser string, wherein use is made of a vessel according to one or more of the preceding clauses.

56. Vessel (1) adapted to perform subsea wellbore related operations involving a riser string between the subsea wellbore and the vessel, e.g. drilling and/or wellbore intervention, said vessel comprising:

a hull (2);

a riser storage (40)

the vessel has a riser storage with one or more riser storage racks that are adapted to store therein multiple risers in horizontal orientation, each storage rack being embodied with vertical columns between which risers are stacked in vertical stacks, wherein a riser is an individual riser section (62a) or a pre-assembled riser stand (62), wherein the vessel has a riser handling crane, which is adapted for removing a riser stand from a storage rack and for placing a riser stand into a storage rack respectively, and for transverse transportation of a riser above the one or more storage racks, characterized in that the vessel is provided with a riser workshop having a floor, preferably also walls and a roof, the workshop being adapted to accommodate at least one riser in horizontal orientation, and the workshop providing a space, preferably an enclosure, for personnel performing work on the riser, e.g. maintenance and/or inspection of the riser.

57. Vessel according to clause 56, wherein the riser handling crane is adapted to place a riser in the workshop and remove a riser from the workshop, e.g. the workshop having a roof with a riser transfer opening therein, preferably said opening being provided with a mobile roof cover, e.g. one or more hatches or a tarpaulin.

58. Vessel according to clause 56 or 57, wherein the riser storage is a riser storage hold within the hull of the vessel, e.g. wherein the hold has a roof, wherein the vessel has a deck and above said roof, and wherein the riser workshop is within the riser storage hold.

59. Vessel according to clause 56 or 57, wherein the riser handling crane is an overhead travelling beam crane travelling above the one more racks within the hold, e.g. along the roof of the hold.

60. Vessel according to clause 58, wherein the hold comprises two riser storage racks, each with multiple columns to store therein multiple stacks of risers side-by-side, and wherein the riser workshop is arranged between said two riser storage racks.

61. A method for assembly of a riser string, wherein use is made of a vessel according to one or more of the clauses 56-60.

What is claimed is:

1. A mono-hull vessel adapted to perform subsea wellbore related operations involving a riser string between the subsea wellbore and the vessel, said vessel comprising:
    a mono-hull hull having a longitudinal axis, wherein the hull of the vessel has a moonpool;
    deck structure forming a main deck of the vessel;
    a tower arranged at said moonpool, wherein the tower is provided with one or more vertical rails;
    a hoisting device comprising a travelling hanger device that is movable up and down relative to the tower along said one or more vertical rails on the tower;
    a mobile working deck, arranged above the moonpool, said working deck being provided with a riser string hanger that is adapted to support a riser string therefrom in a firing line, wherein the mobile working deck is guided so as to allow for vertical translatory motion of the mobile working deck between an elevated position and a lowered operative position in which the mobile working deck is level with an adjacent area of the main deck of the vessel,
    wherein the travelling hanger device is provided with a riser string lifting tool that is adapted to connect to an end of a riser section and is embodied to support a weight of a riser string in said firing line when released by the riser string hanger; and
    a riser storage hold within the hull of the vessel below said deck structure, wherein the riser storage hold comprises riser storage racks adapted to store therein, or has stored therein, in horizontal orientation and parallel to said longitudinal axis, multiple individual riser sections or multiple pre-assembled riser stands, wherein each riser stand is pre-assembled from the multiple riser sections connected end-to-end,
    wherein the riser storage hold has a floor, side walls, and a roof, wherein the roof of the riser storage hold is formed by said deck structure,
    wherein said deck structure is provided with an elongated transfer opening therein, parallel to said longitudinal axis, said transfer opening having a length and a width dimensioned to allow for transfer of one of the riser sections or one of the pre-assembled riser stands in horizontal orientation via said transfer opening out of and into the riser storage hold, and
    wherein the riser storage hold is provided with a transfer station comprising a transfer elevator including a vertical guide and a riser support, the vertical guide being provided within the riser storage hold, and being configured to guide the riser support, the transfer elevator being provided within the hold and being adapted to raise and lower one of the riser sections or one of the pre-assembled riser stands in horizontal orientation thereof with said riser support so as to pass the one riser section or the one pre-assembled riser stand through said transfer opening.

2. The mono-hull vessel according to claim 1, wherein said riser storage racks are adapted to store therein the multiple individual riser sections, each individual riser section having a length of at least 150 ft. (45.72 m) or the pre-assembled riser stands, each pre-assembled riser stand having a length of at least 150 ft. (45.72 m).

3. The mono-hull vessel according to claim 1, wherein at least one of the storage racks is configured to support a first pre-assembled riser stand of the multiple pre-assembled riser stands at end portions thereof and at an intermediate portion thereof at or near each connection between riser sections of the first pre-assembled riser stand.

4. The mono-hull vessel according to claim 1, wherein a riser stand handling crane is provided within the riser storage hold, said riser stand handling crane being adapted to lift and lower an individual riser section of the multiple individual riser sections or a pre-assembled riser stand of the multiple pre-assembled riser stands for removing the individual riser section or the pre-assembled riser stand from a respective one of the storage racks and for placing the individual riser section or the pre-assembled riser stand into the respective storage rack, and said riser stand handling crane being adapted for transverse transportation of the individual riser section or the re-assembled riser stand to said transfer station.

5. The mono-hull vessel according to claim 1, wherein the transfer opening is oriented with a length thereof towards the moonpool, and
    wherein the vessel further comprises a riser handling system, said riser handling system comprising a catwalk machine, the catwalk machine comprising:
    a pair of horizontal catwalk machine rails;
    an elongated catwalk machine frame having a rear end and a front end, wherein the elongated catwalk machine frame is movable over the catwalk machine rails at least in a rearward loading position and a forward riser release position, wherein in the rearward loading position, an individual riser section of the multiple individual riser sections or a pre-assembled riser stand of the multiple pre-assembled riser stands provided in a horizontal orientation can be loaded onto the catwalk machine, and wherein in the forward riser release position, the individual riser section or pre-assembled riser stand to be lifted is connectable to the riser string lifting tool; and a skate which is supported by the elongated catwalk machine frame and is movable by a drive motor along a length of the frame between a rearward skate position and a forward skate position, wherein the skate comprises a riser end support to support thereon a rearward end of a riser.

6. The mono-hull vessel according to claim 5, wherein the riser handling system further comprises a riser forward section auxiliary support device, that is distinct from the catwalk machine,
  wherein the riser forward section auxiliary support device is arranged at a location along the catwalk machine rails between the moonpool and the catwalk machine frame, when in a rearward loading position,
  wherein the riser forward section auxiliary support device is movable between an operative position and a retracted position, and
  wherein the riser forward section auxiliary support device is adapted to support, in the operative position thereof, a forward section of the individual riser section or the pre-assembled riser stand that rests with a rear end thereof on the skate and that extends beyond the front end of the catwalk machine frame when loaded in the horizontal orientation onto the catwalk machine while in the rearward loading position thereof, so that, with the individual riser section or the pre-assembled riser stand loaded onto the catwalk machine and also supported by the riser forward section auxiliary support device, the catwalk machine frame is movable along said catwalk machine rails towards the auxiliary support device in order to bring the forward riser end, while maintaining a horizontal orientation, near the riser string lifting tool and allow for connection thereof to the forward end, in which advancing motion the forward riser section is supported by said auxiliary support device, and so that, after connecting the forward riser end to the riser string lifting tool, the riser forward section auxiliary support device is movable to the retracted position thereof thereby disengaging from the individual riser section or the pre-assembled riser stand and allowing the catwalk machine frame to move further towards a forward position thereof in the process of bringing the riser vertically into the firing line wherein the forward end of the riser is lifted by the riser handling capacity hoisting device.

7. The mono-hull vessel according to claim 6, wherein the horizontal catwalk machine rails are parallel to one another and are mounted along opposite longitudinal sides of said riser stand transfer opening, and
  wherein the riser forward section auxiliary support device is arranged at a location between the catwalk machine rails and is movable between a raised operative position and a lowered retracted position so that the catwalk machine frame can pass above the retracted auxiliary support device.

8. The mono-hull vessel according to claim 6, wherein the riser forward section auxiliary support device comprises one or more mobile riser guide members allowing the riser, in a horizontal orientation, to slide over the auxiliary support device as it is advanced forward by the forward advancing catwalk machine frame.

9. The mono-hull vessel according to claim 6, wherein the riser forward section auxiliary support device comprises one or more endless tracks that are adapted to support the riser thereon.

10. The mono-hull vessel according to claim 6, wherein a hatch is provided to cover the retracted riser forward section auxiliary support device.

11. The mono-hull vessel according to claim 5, wherein the horizontal catwalk machine rails are parallel to one another and are mounted along opposite longitudinal sides of said riser stand transfer opening.

12. The mono-hull vessel according to claim 5, wherein the catwalk machine is provided with a tailing-in arm device that is mounted at the forward end of the catwalk machine frame.

13. The mono-hull vessel according to claim 1, wherein the riser storage hold is aft of the moonpool.

14. The mono-hull vessel according to claim 1, wherein a riser workshop is arranged within the riser storage hold, said riser workshop providing a space that allows personnel to perform work on an individual riser section of the multiple individual riser sections or on a pre-assembled riser stand of the multiple pre-assembled riser stands, said riser workshop having a floor, walls, and a roof with a riser transfer opening therein, the workshop being adapted to accommodate therein at least one individual riser section or pre-assembled riser stand in horizontal orientation thereof, and wherein an overhead travelling beam crane is provided in the riser storage hold, adapted to travel above the riser storage racks and above the riser workshop allowing to move the individual riser section or the pre-assembled riser stand between the workshop and the storage racks with the individual riser section or the pre-assembled riser stand being lifted from or lowered into the workshop via the riser transfer opening in the roof of the workshop.

15. The mono-hull vessel according to claim 14, wherein the riser transfer opening in the roof of the workshop is provided with a mobile roof cover.

16. The mono-hull vessel according to claim 1, wherein, in a transverse cross-section of the hull of the vessel, said riser storage hold is arranged in majority to one side of the vessel, and wherein a blow-out preventer BOP storage hold is arranged on the other side of the vessel adjacent the riser storage hold with a separating longitudinal bulkhead of the hull in between forming a sidewall of the riser storage hold.

* * * * *

UNITED STATES PATENT AND TRADEMARK OFFICE
CERTIFICATE OF CORRECTION

PATENT NO.        : 10,457,357 B2
APPLICATION NO.   : 16/374379
DATED             : October 29, 2019
INVENTOR(S)       : Joop Roodenburg et al.

Page 1 of 1

It is certified that error appears in the above-identified patent and that said Letters Patent is hereby corrected as shown below:

On the Title Page

Item (30), please correct the Foreign Application Priority Data from:
"Mar. 12, 2013 (NL)....... 2010627" to --Apr. 12, 2013 (NL)....... 2010627--.

Signed and Sealed this
Fourteenth Day of January, 2020

Andrei Iancu
*Director of the United States Patent and Trademark Office*